United States Patent
Land et al.

(10) Patent No.: US 7,155,676 B2
(45) Date of Patent: Dec. 26, 2006

(54) SYSTEM AND METHOD FOR MULTIMEDIA AUTHORING AND PLAYBACK

(75) Inventors: Michael Z. Land, Berkeley, CA (US); Peter N. McConnell, Berkeley, CA (US); Michael J. McMahon, Fairfax, CA (US)

(73) Assignee: Coolernet, Berkeley, CA (US)

(*) Notice: Subject to any disclaimer, the term of this patent is extended or adjusted under 35 U.S.C. 154(b) by 633 days.

(21) Appl. No.: 10/027,430

(22) Filed: Dec. 19, 2001

(65) Prior Publication Data

US 2002/0112180 A1    Aug. 15, 2002

(51) Int. Cl.
*H04N 5/783*    (2006.01)
(52) U.S. Cl. .................. 715/731; 715/704
(58) Field of Classification Search ........ 345/730–732, 345/704, 707–710, 717–723, 853–855, 765, 345/771, 780, 716
See application file for complete search history.

(56) References Cited

U.S. PATENT DOCUMENTS

| | | | |
|---|---|---|---|
| 5,267,155 A | 11/1993 | Buchanan et al. | 364/419 |
| 5,542,024 A | 7/1996 | Balint et al. | 395/161 |
| 5,619,636 A * | 4/1997 | Sweat et al. | 715/500.1 |
| 5,621,880 A | 4/1997 | Johnson | 395/326 |
| 5,657,447 A | 8/1997 | Leung et al. | 395/601 |
| 5,724,503 A | 3/1998 | Kleinman et al. | 395/185.1 |
| 5,737,736 A | 4/1998 | Chang | 707/102 |
| 5,787,450 A | 7/1998 | Diedrich et al. | 707/513 |
| 5,801,687 A * | 9/1998 | Peterson et al. | 715/500.1 |
| 5,819,043 A * | 10/1998 | Baugher et al. | 709/222 |
| 5,819,282 A | 10/1998 | Hooper et al. | 707/103 |
| 5,832,507 A | 11/1998 | Harper et al. | 707/200 |
| 5,835,758 A | 11/1998 | Nochur et al. | 395/613 |
| 5,855,013 A | 12/1998 | Fisk | 707/3 |
| 5,862,379 A | 1/1999 | Rubin | 395/702 |
| 5,892,507 A * | 4/1999 | Moorby et al. | 715/500.1 |
| 5,899,990 A | 5/1999 | Maritzen et al. | 707/4 |
| 5,907,704 A * | 5/1999 | Gudmundson et al. | 717/100 |
| 5,950,214 A | 9/1999 | Rivette et al. | 707/512 |
| 5,960,411 A | 9/1999 | Hartman et al. | 705/26 |

(Continued)

OTHER PUBLICATIONS

Microsoft Press Computer Dictionary, Microsoft Press, Redmond, Washington, 1997, p. 36.*

(Continued)

*Primary Examiner*—Stephen Sax
(74) *Attorney, Agent, or Firm*—Dergosits & Noah LLP

(57) ABSTRACT

A system and method for authoring and playback of multimedia content together with sharing, interconnecting and navigating the content using a computer network is disclosed. Creation, presentation and sharing of multimedia content and applications takes place within an active authoring environment, where data is always "live," and any piece of content can be played alongside any other piece of content at any time. In this environment, there are no formal delineations between one "presentation" and another based on such things as file boundaries, other data storage constructs or the like. Instead, any piece of content can potentially be part of the "current" presentation at any time simply by being "started." As a result, three factors become critically important: (1) the framework in which content is organized, stored and distributed; (2) the control mechanisms by which content is played and presented, and (3) as with any authoring system, the methods and means by which users create and edit content. In each of these areas, the present invention makes significant innovations which are highly complementary, resulting in a new type of software application that seamlessly integrates authoring, playback and networking in an active, shared, rich media environment optimized for personal communications.

7 Claims, 53 Drawing Sheets

U.S. PATENT DOCUMENTS

| | | | |
|---|---|---|---|
| 5,960,421 A | 9/1999 | Cline et al. | 707/2 |
| 5,963,952 A | 10/1999 | Smith | 707/102 |
| 5,973,694 A | 10/1999 | Steele et al. | 345/349 |
| 5,974,407 A | 10/1999 | Sacks | 707/2 |
| 5,974,411 A | 10/1999 | McCool et al. | 707/3 |
| 5,983,176 A * | 11/1999 | Hoffert et al. | 704/233 |
| 5,983,245 A | 11/1999 | Newman et al. | 707/513 |
| 5,987,501 A * | 11/1999 | Hamilton et al. | 709/203 |
| 6,002,401 A | 12/1999 | Baker | 345/349 |
| 6,031,527 A | 2/2000 | Shoji et al. | 345/333 |
| 6,044,368 A | 3/2000 | Powers | 707/2 |
| 6,054,986 A | 4/2000 | Kato | 345/348 |
| 6,055,537 A | 4/2000 | LeTourneau | 707/101 |
| 6,061,696 A | 5/2000 | Lee et al. | 707/513 |
| 6,085,185 A | 7/2000 | Matsuzawa et al. | 707/2 |
| 6,085,223 A | 7/2000 | Carino, Jr. et al. | 709/203 |
| 6,108,010 A | 8/2000 | Boezeman et al. | 345/438 |
| 6,111,590 A | 8/2000 | Boezeman et al. | 345/474 |
| 6,188,396 B1 | 2/2001 | Boezeman et al. | 345/302 |
| 6,222,532 B1 * | 4/2001 | Ceccarelli | 715/723 |
| 6,237,025 B1 * | 5/2001 | Ludwig et al. | 709/204 |
| 6,263,486 B1 | 7/2001 | Boezeman et al. | 717/1 |
| 6,317,795 B1 * | 11/2001 | Malkin et al. | 709/246 |
| 6,356,708 B1 * | 3/2002 | Krause et al. | 386/109 |
| 6,570,837 B1 * | 5/2003 | Kikuchi et al. | 369/275.1 |
| 6,573,907 B1 * | 6/2003 | Madrane | 715/719 |
| 6,630,934 B1 * | 10/2003 | Hoddie et al. | 345/473 |
| 6,640,304 B1 * | 10/2003 | Ginter et al. | 713/193 |
| 6,751,800 B1 * | 6/2004 | Fukuda et al. | 725/40 |
| 6,792,607 B1 * | 9/2004 | Burd et al. | 719/316 |
| 2002/0180803 A1 * | 12/2002 | Kaplan et al. | 345/810 |
| 2002/0193895 A1 * | 12/2002 | Qian et al. | 700/94 |
| 2003/0043191 A1 * | 3/2003 | Tinsley et al. | 345/762 |

OTHER PUBLICATIONS

European Patent Office Supplementary Partial European Search Report, dated Sep. 26, 2005 in EPO Application 02798540.7-2205 PCT/US0240623.

Muriel Jourdan, Cecile Roisin, Laurent Tardif and Lionel Villard authors of "Authoring SMIL Documents by Direct Manipulations During Presentation,"OPERA Project, INRIA Rhone-Alpes, 655 avenue de l'Europe, 38330 Montbonnot, France, Baltzer Science Publishers BV, World Wide Web 2 (1999) 179-190.

Apple Computer, Inc., "Quick Time VR Authoring Studio, User Manual,"copyright 1997 Apple Computer, Inc.

Ryuichi Ogawa, Kazuo Yanoo and Daigo Taguchi, authors of "Template-Based, Format-Extensible Authoring for BS Digital Data Broadcast Service," Internet Systems Research Laboratories, NEC Res. & Develop., vol. 42, No. 3 Jul. 2001.

* cited by examiner

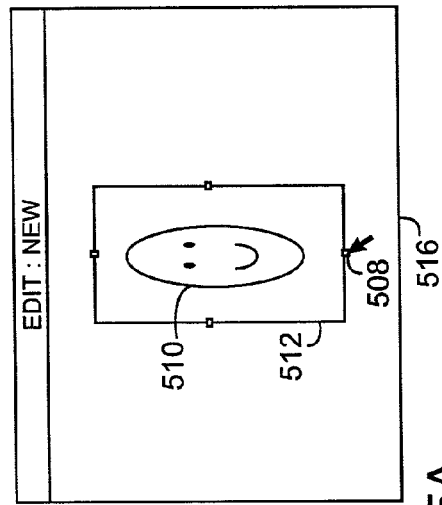
FIG. 5A
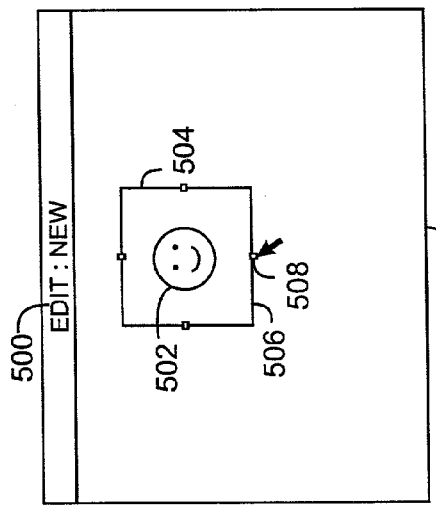
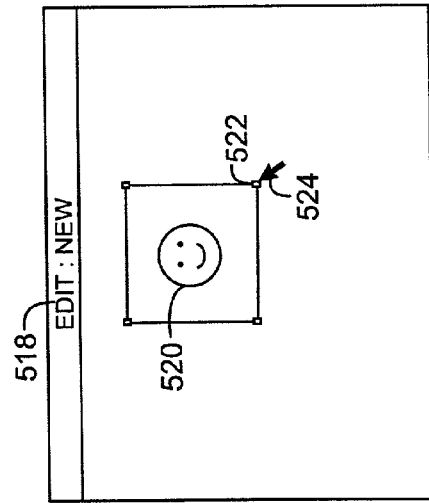
FIG. 5B

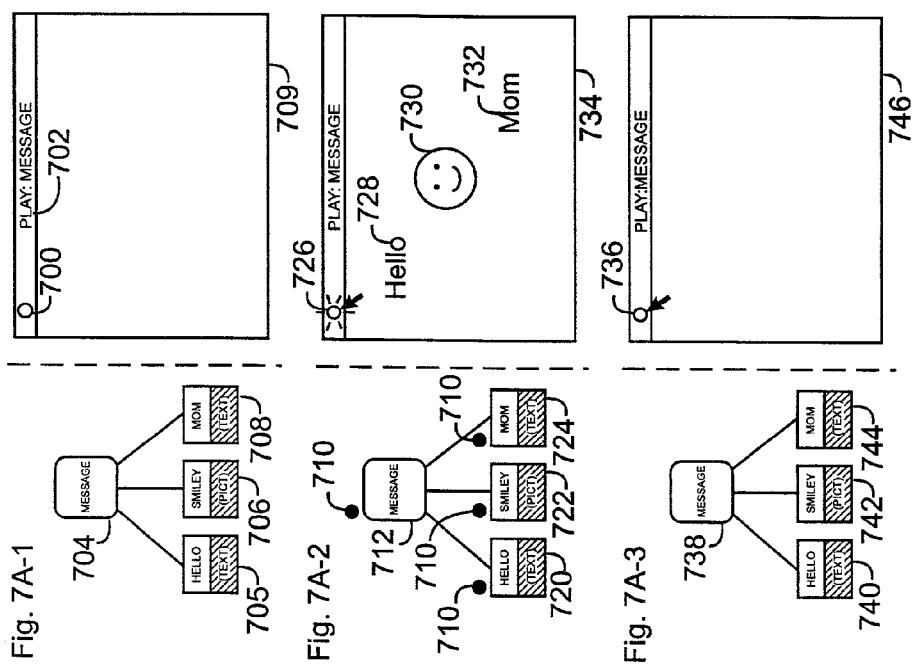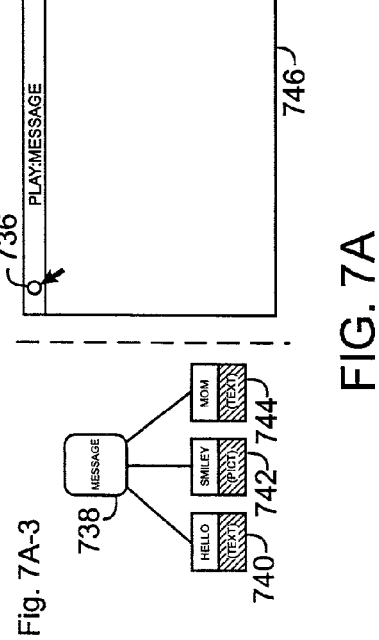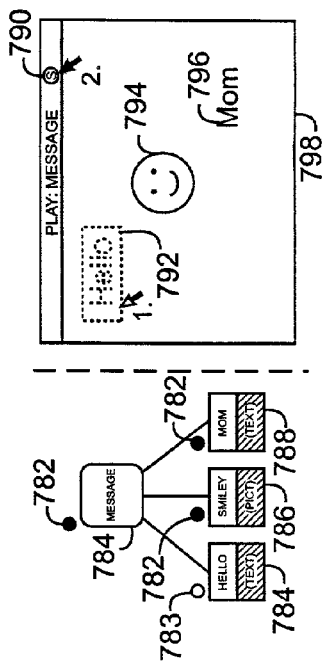
FIG. 7A
FIG. 7B
FIG. 7C

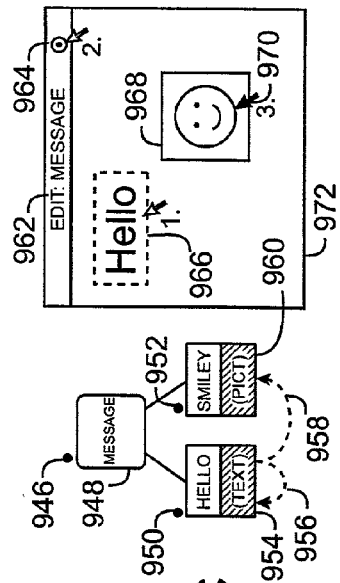
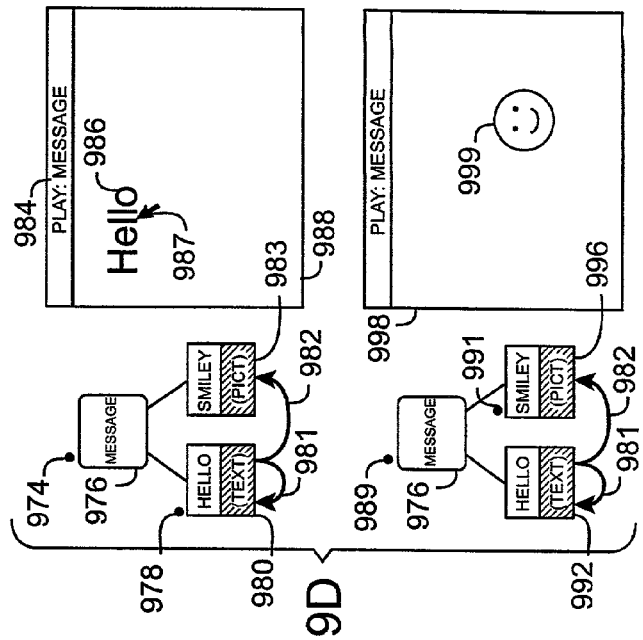
FIG. 9C
FIG. 9D
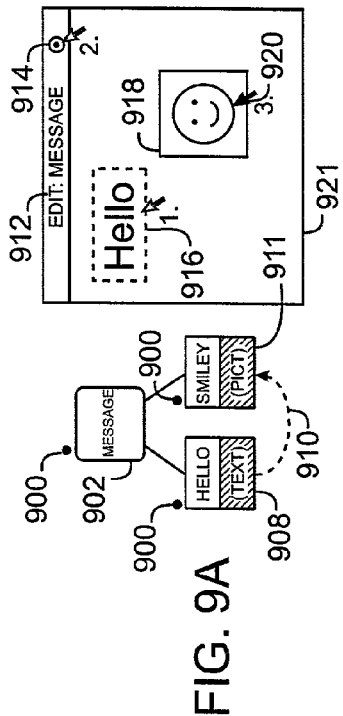
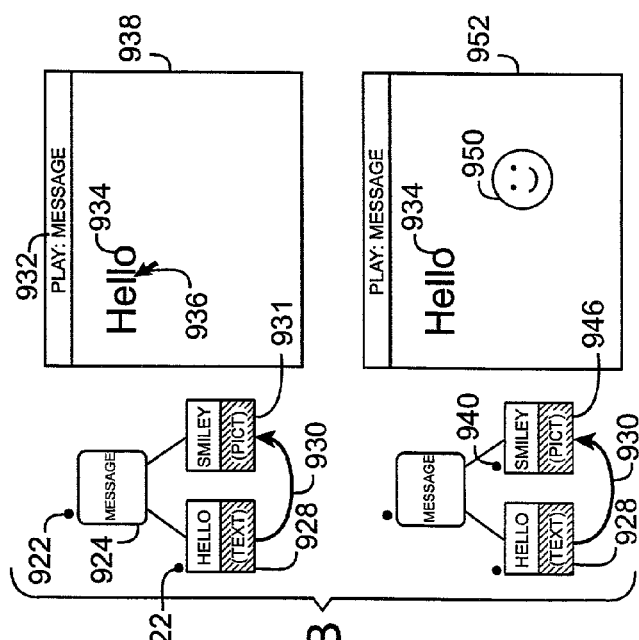
FIG. 9A
FIG. 9B

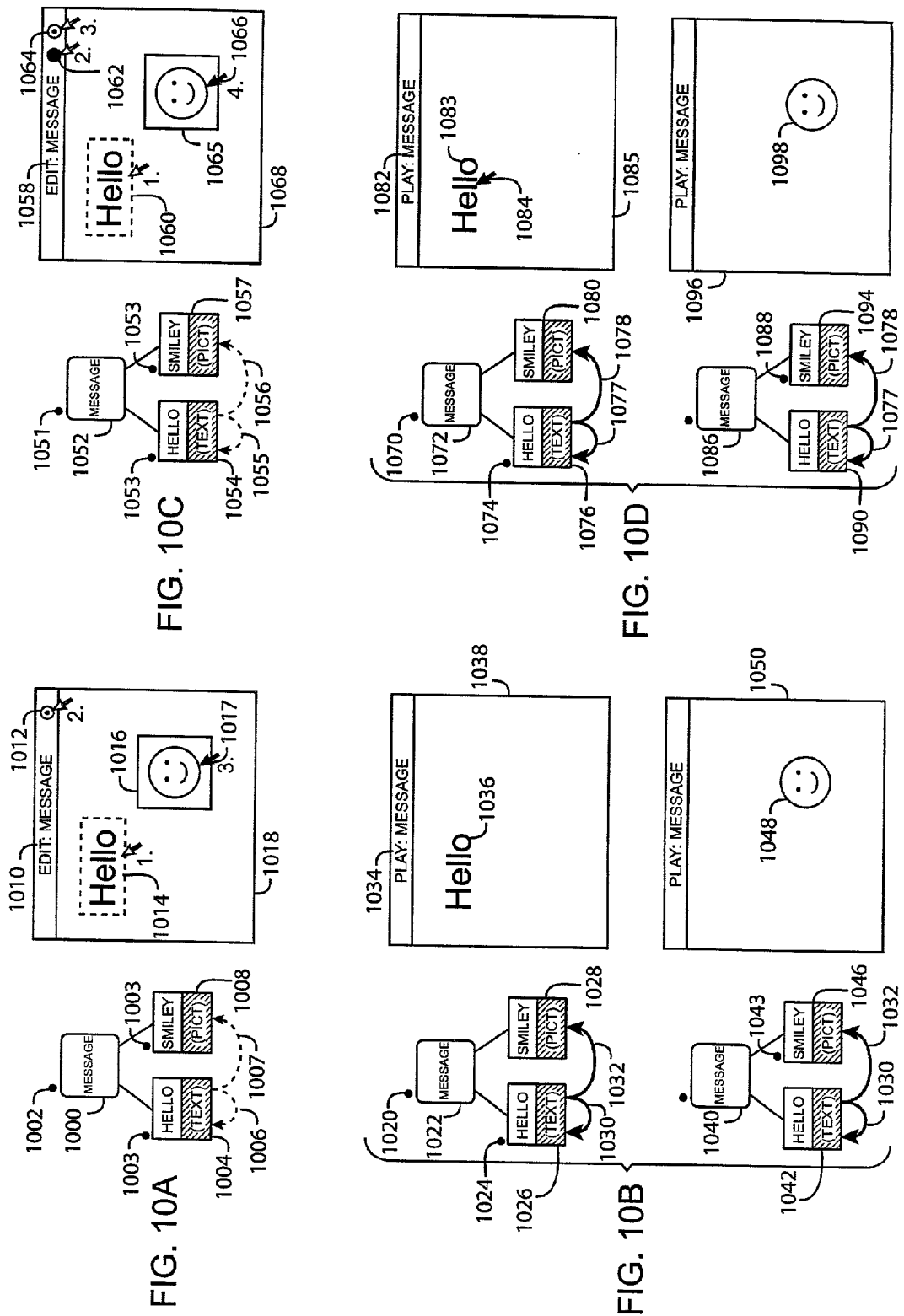

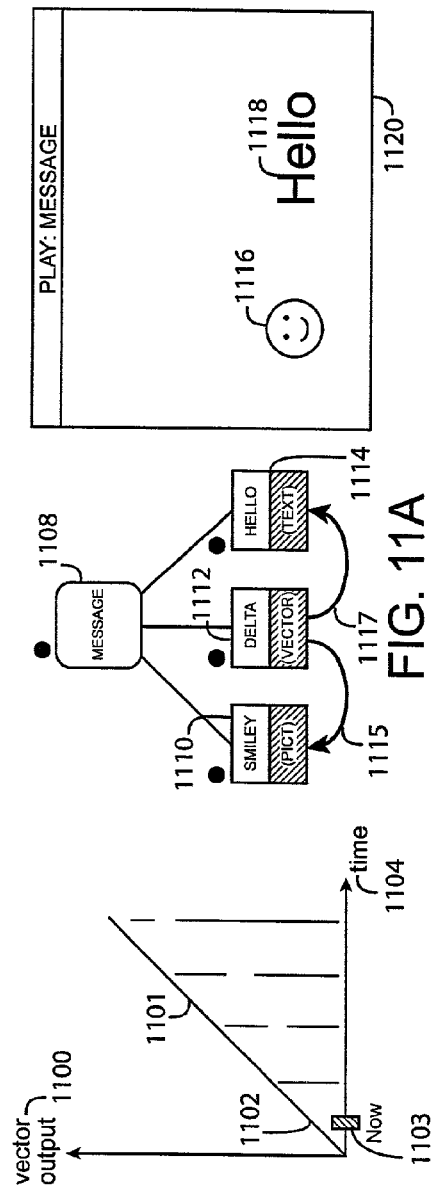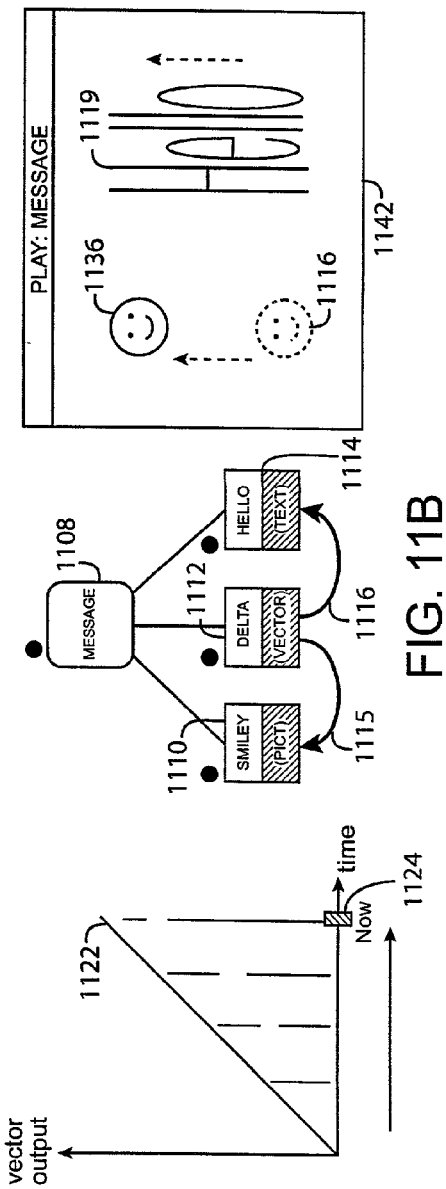

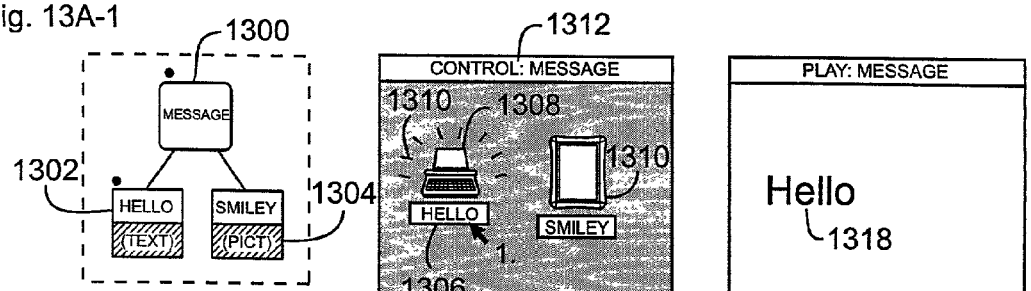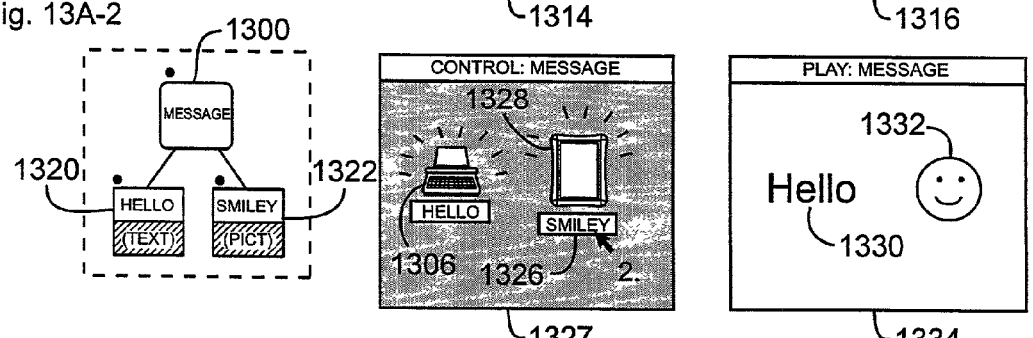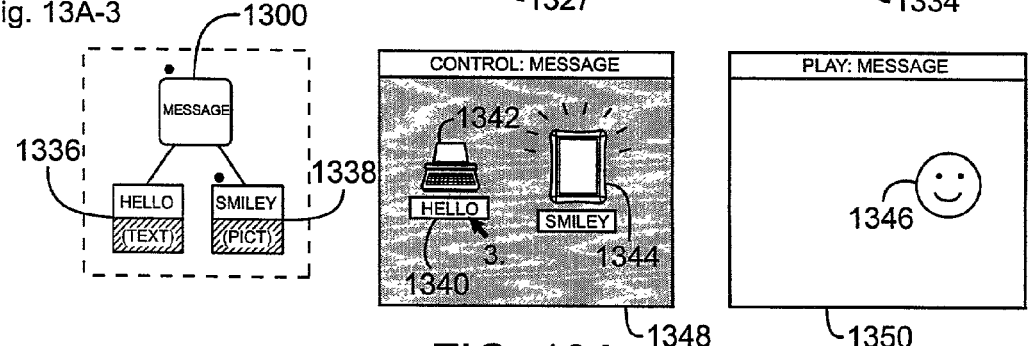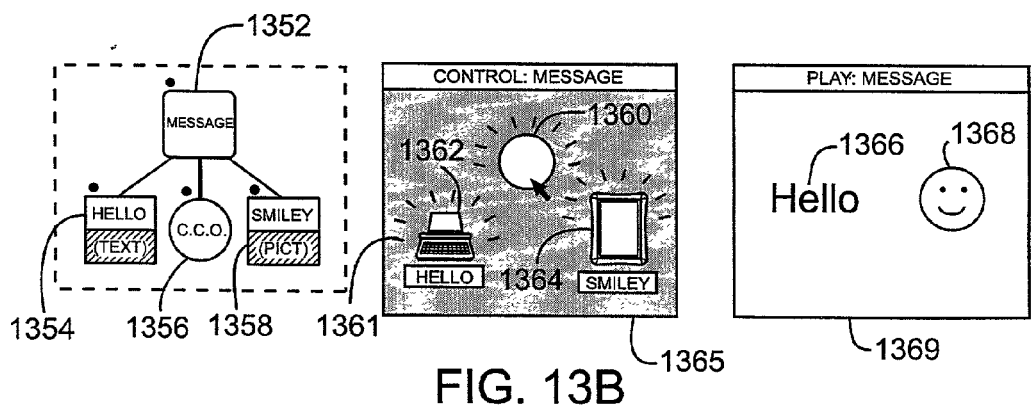

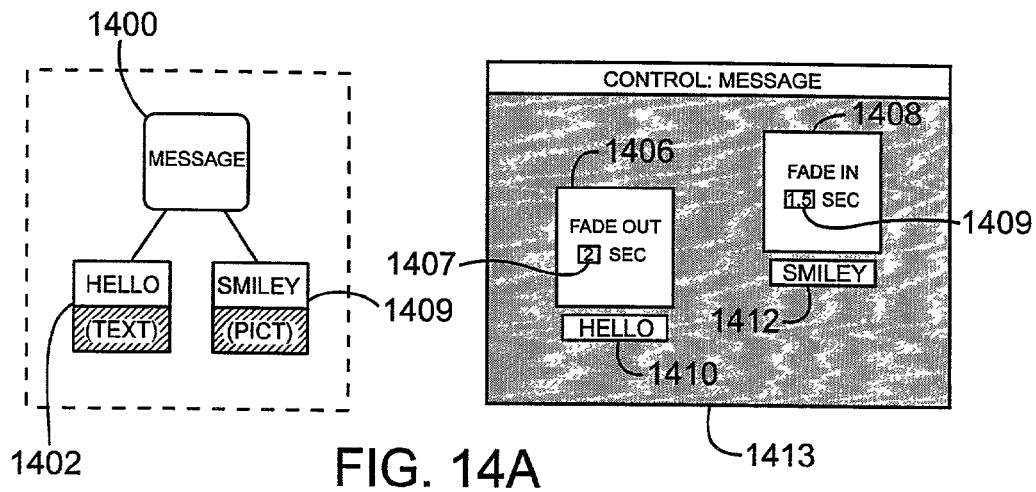
FIG. 14A
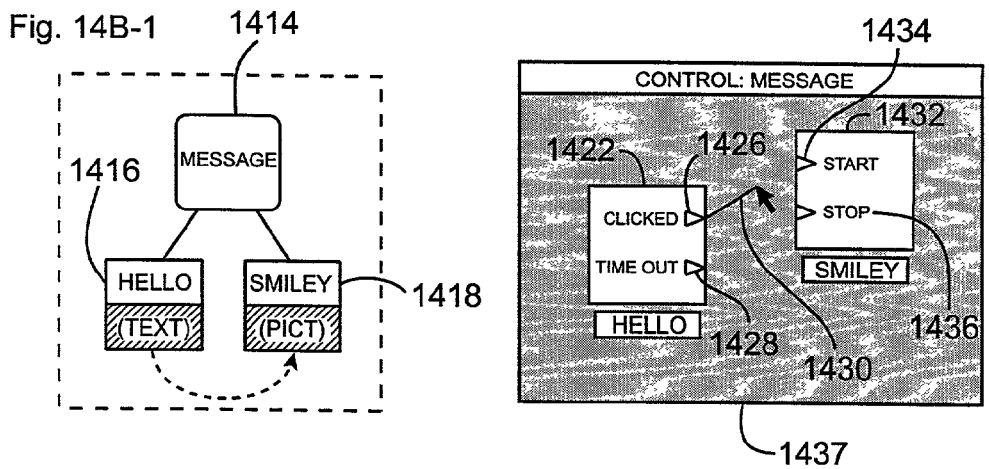
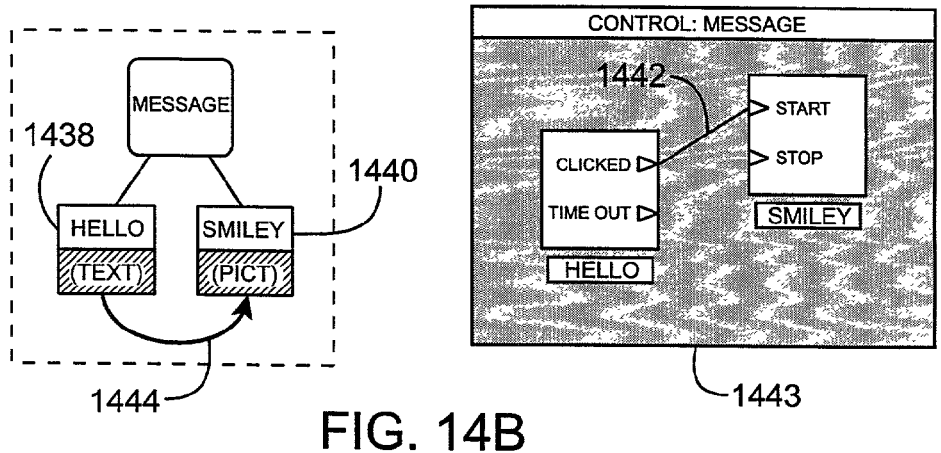
FIG. 14B

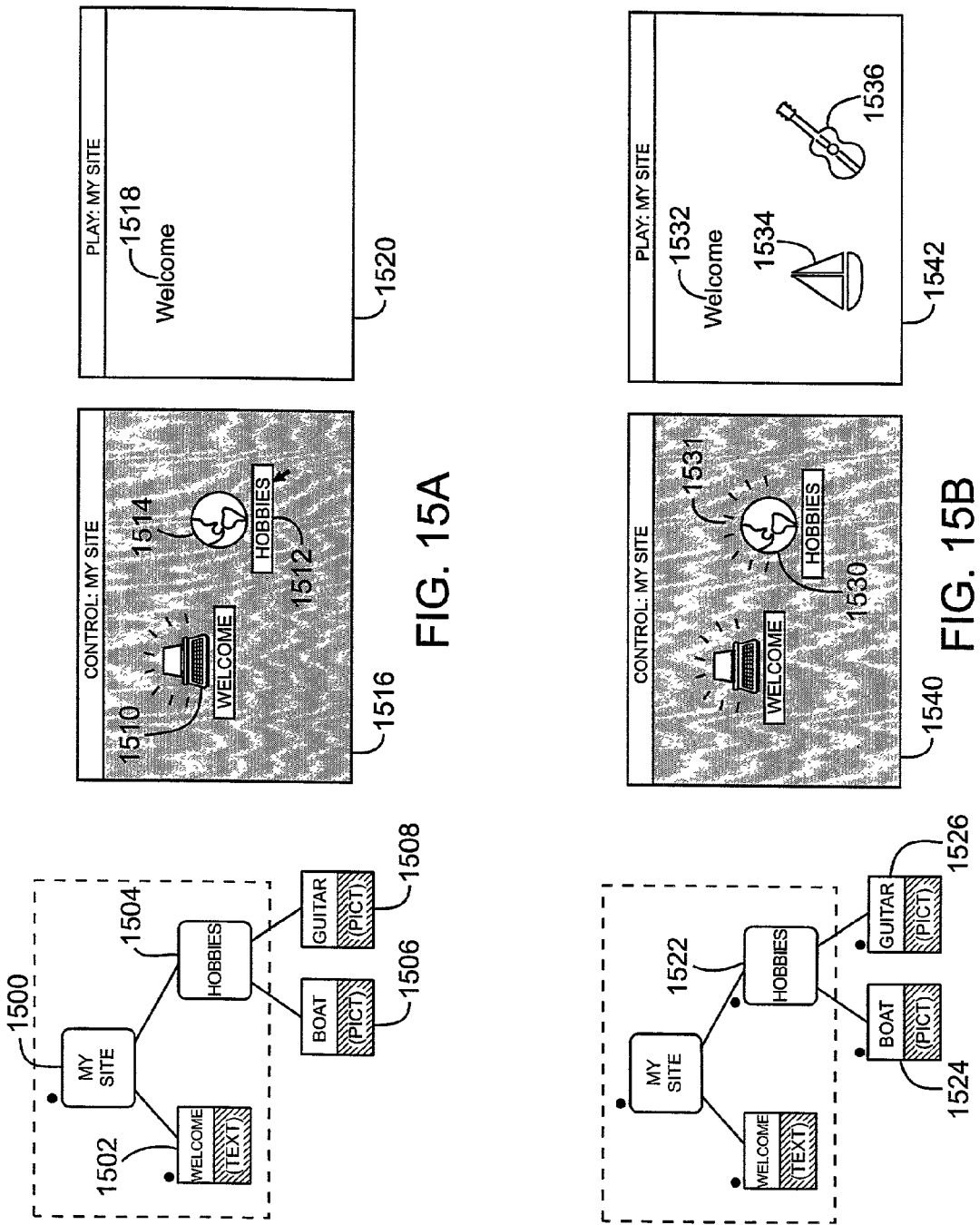

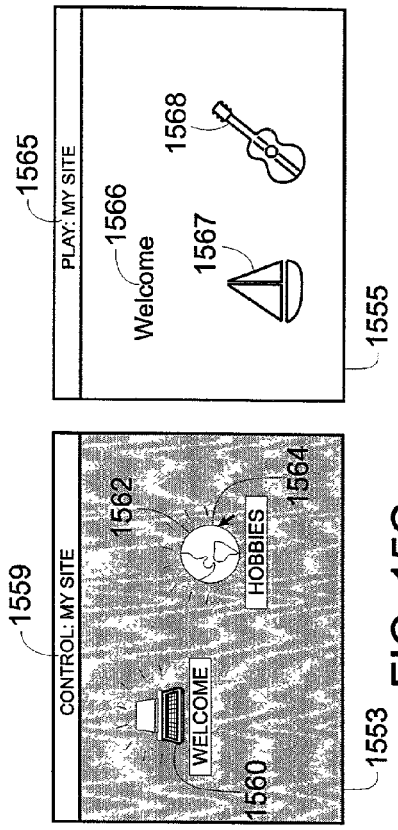
FIG. 15C
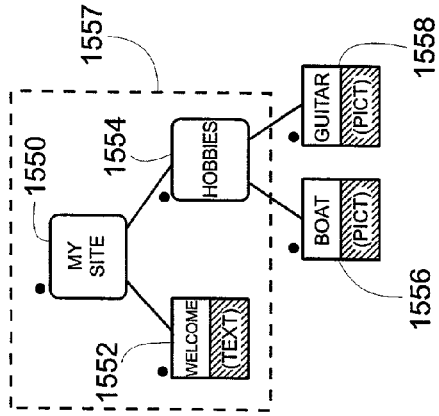
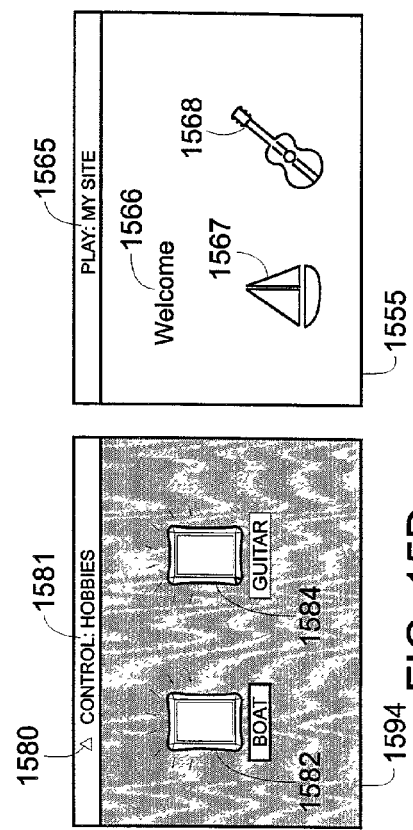
FIG. 15D
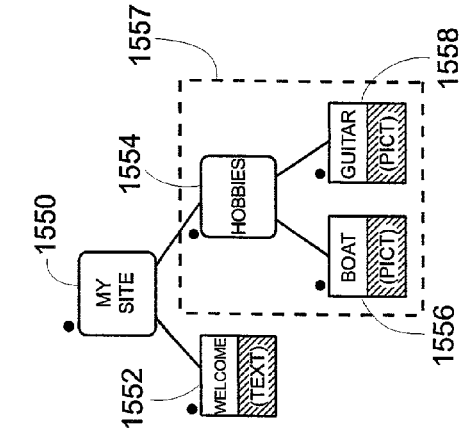

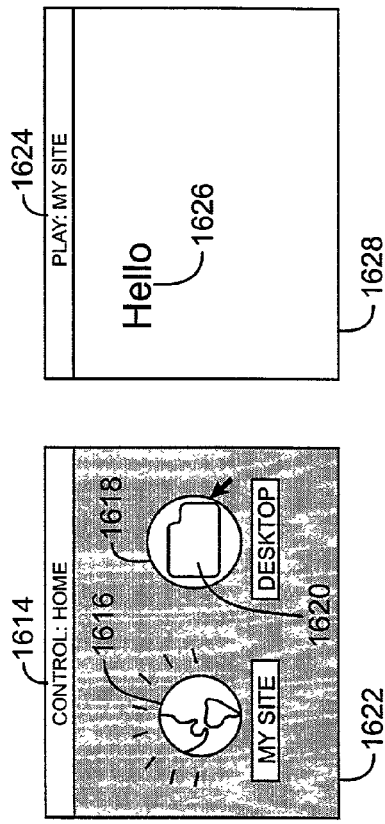
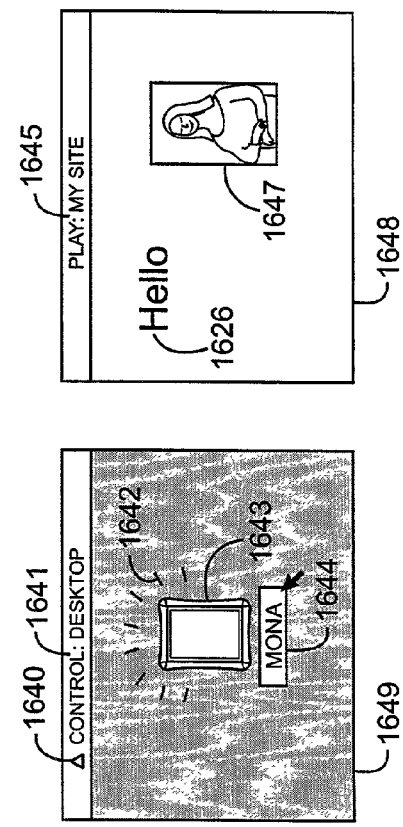
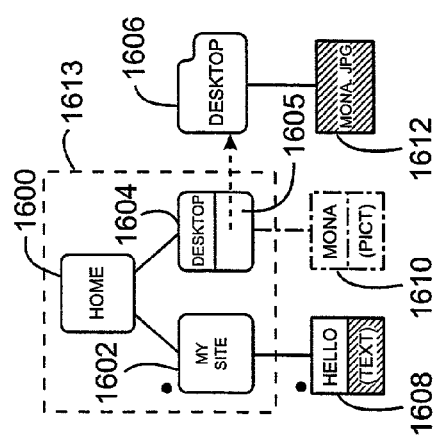
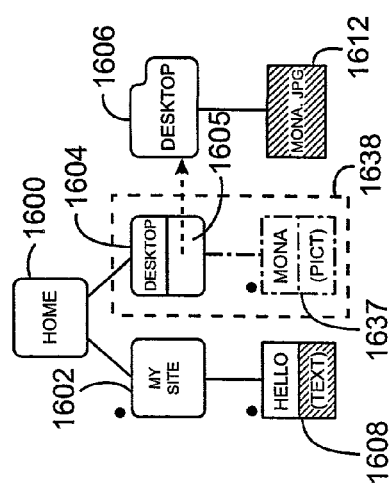
FIG. 16A
FIG. 16B

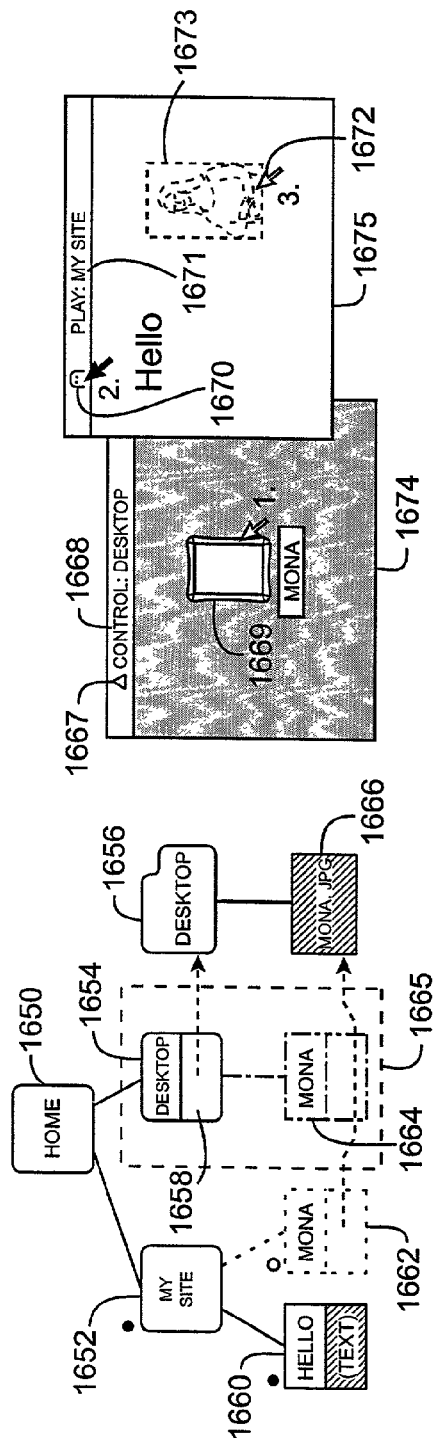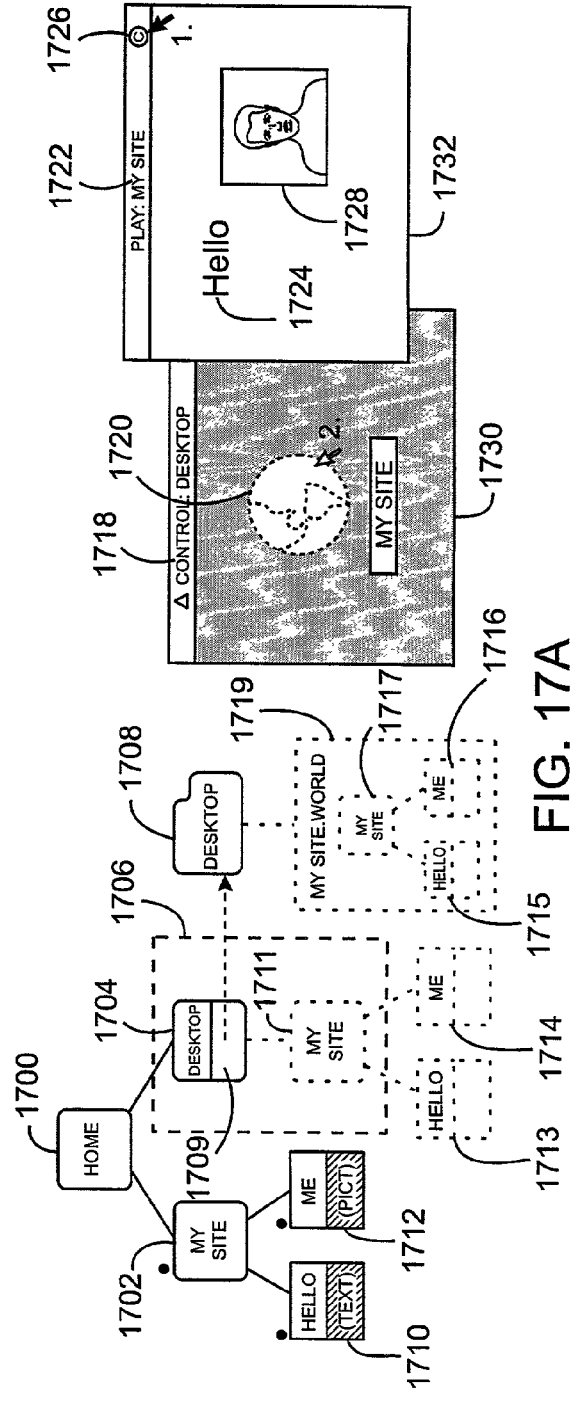

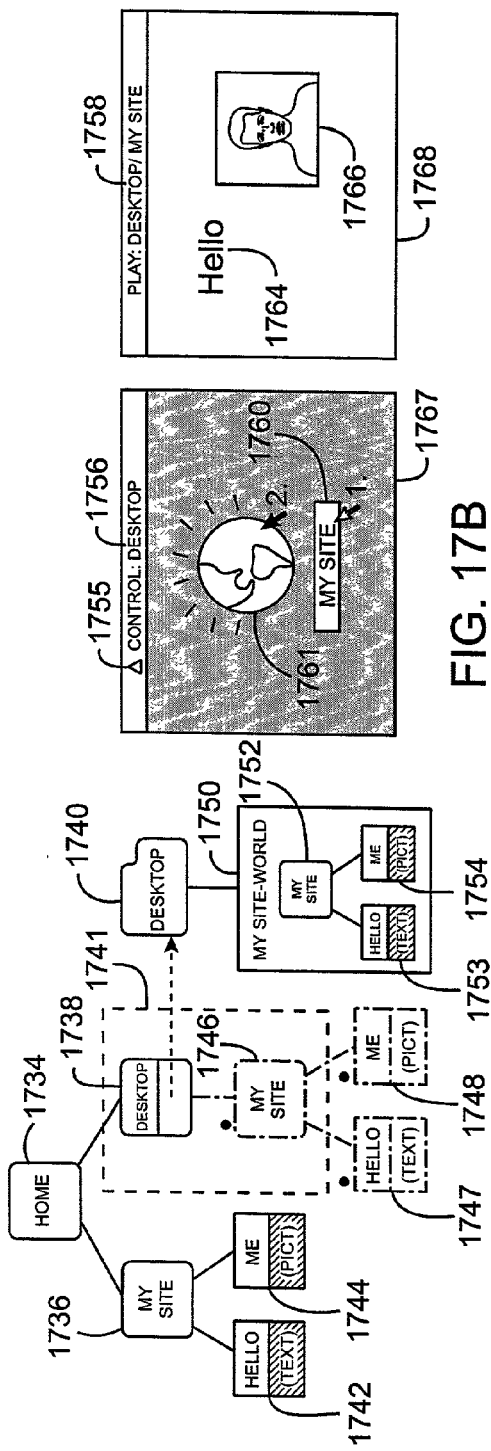
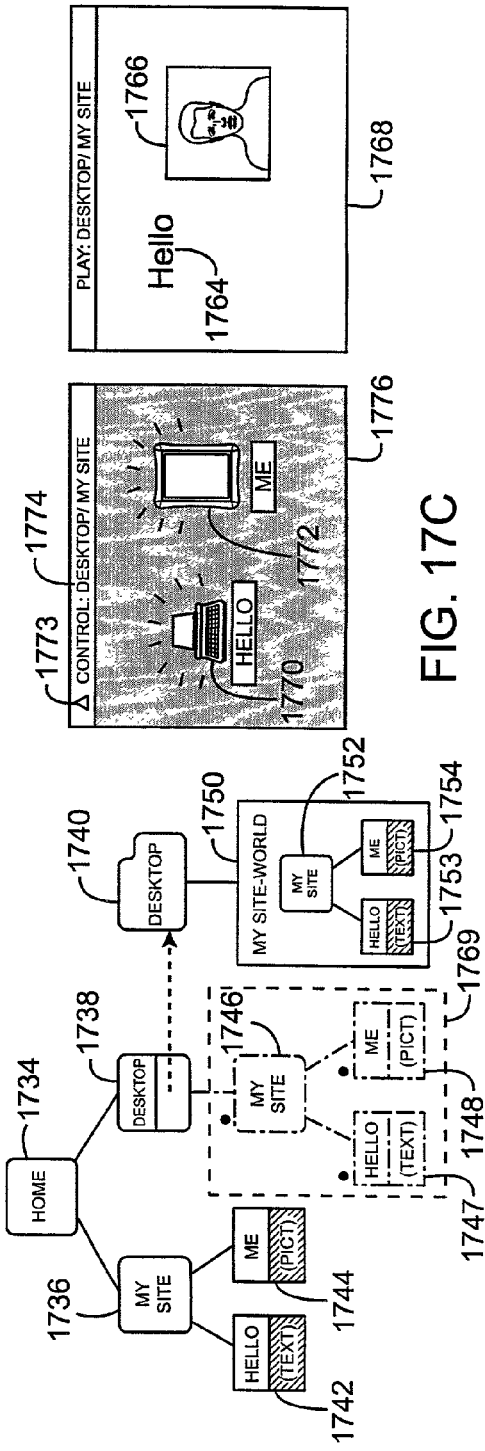
FIG. 17B
FIG. 17C

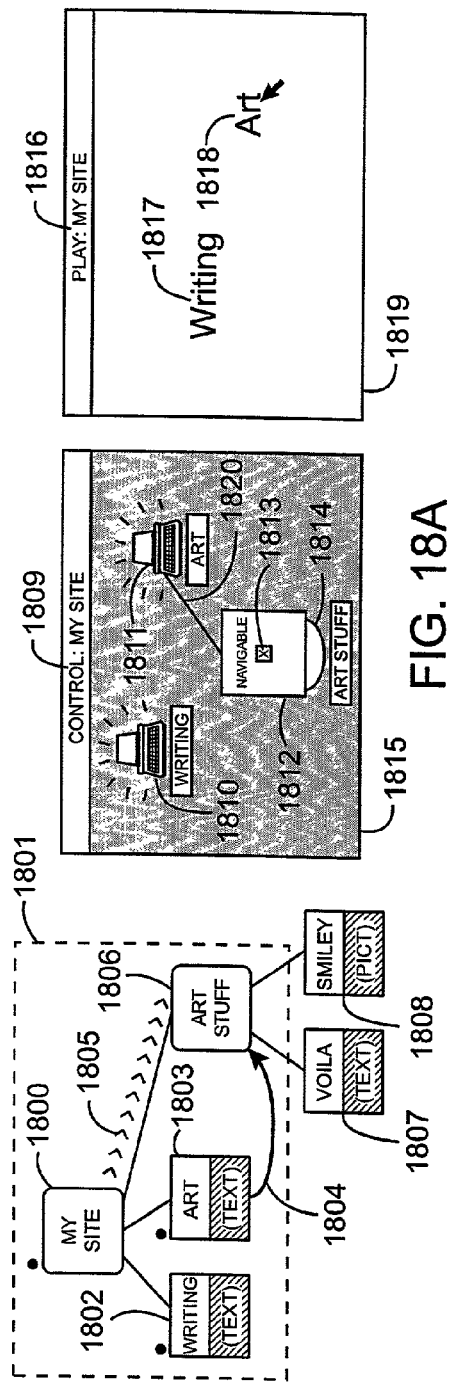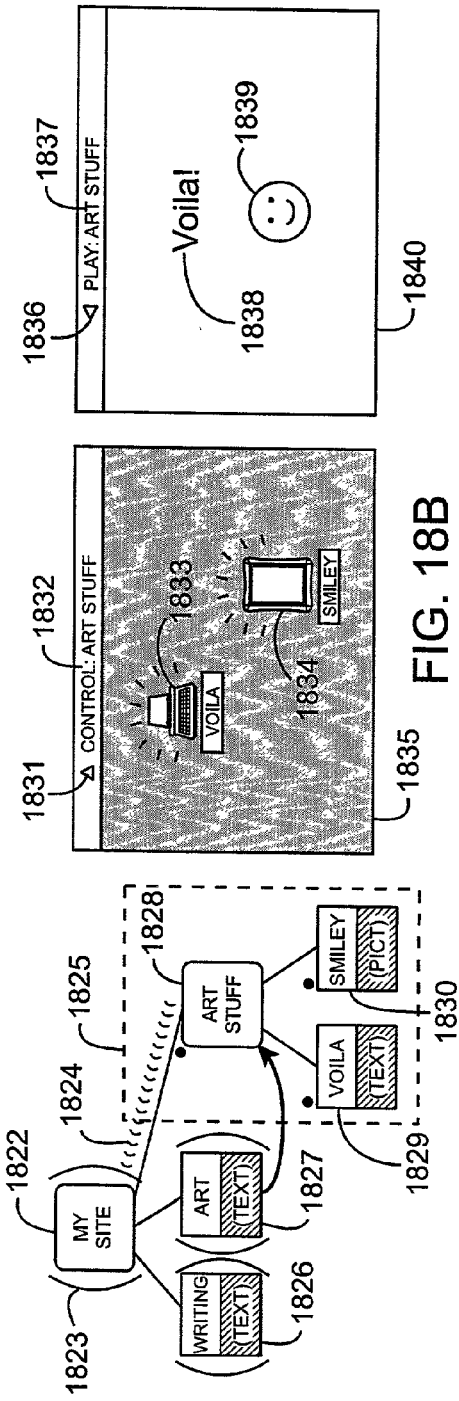

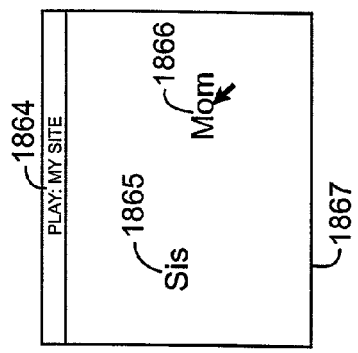
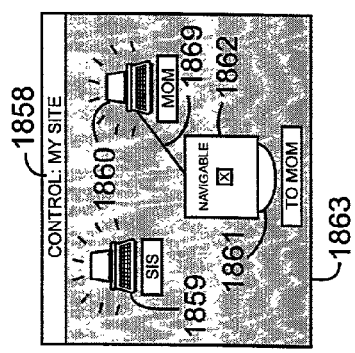
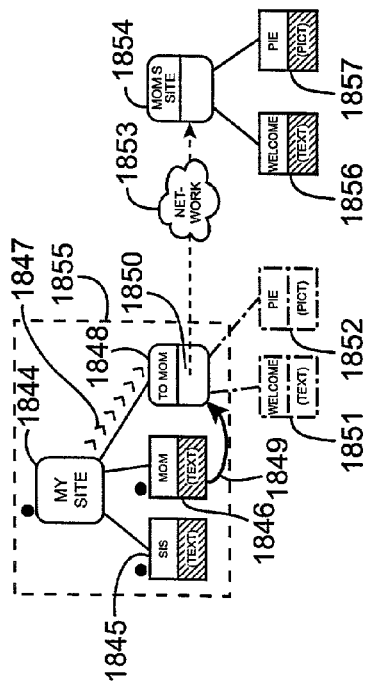
FIG. 18C
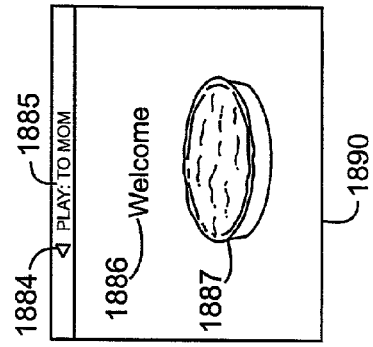
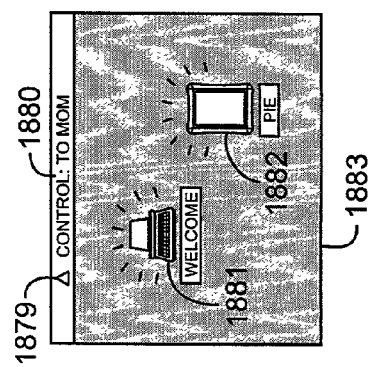
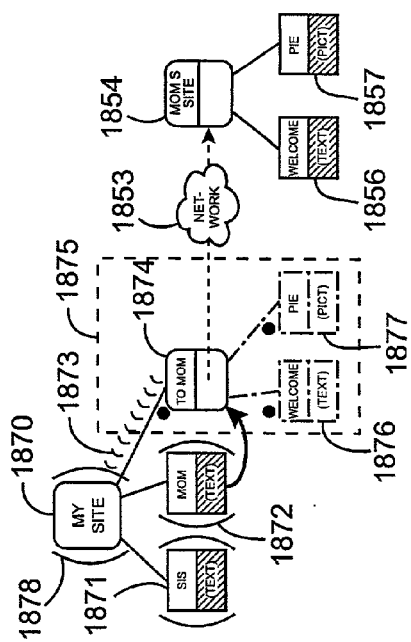
FIG. 18D

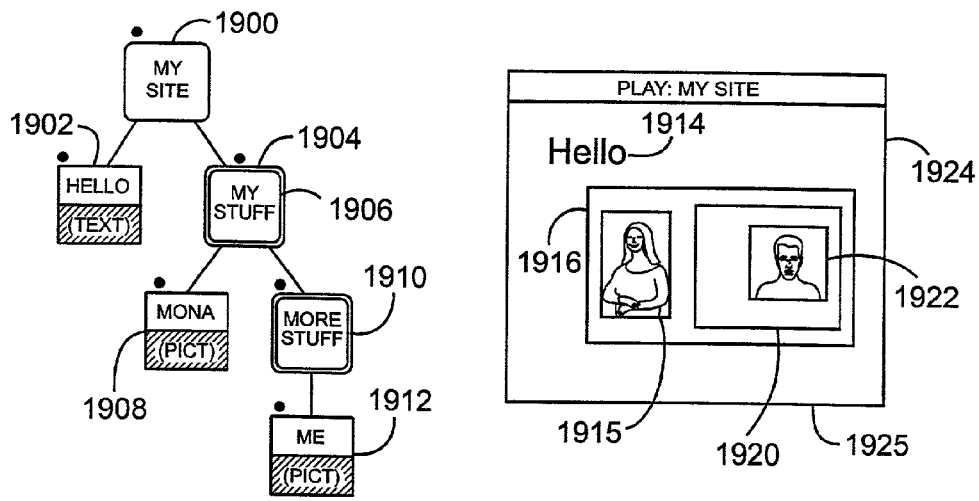
FIG. 19A
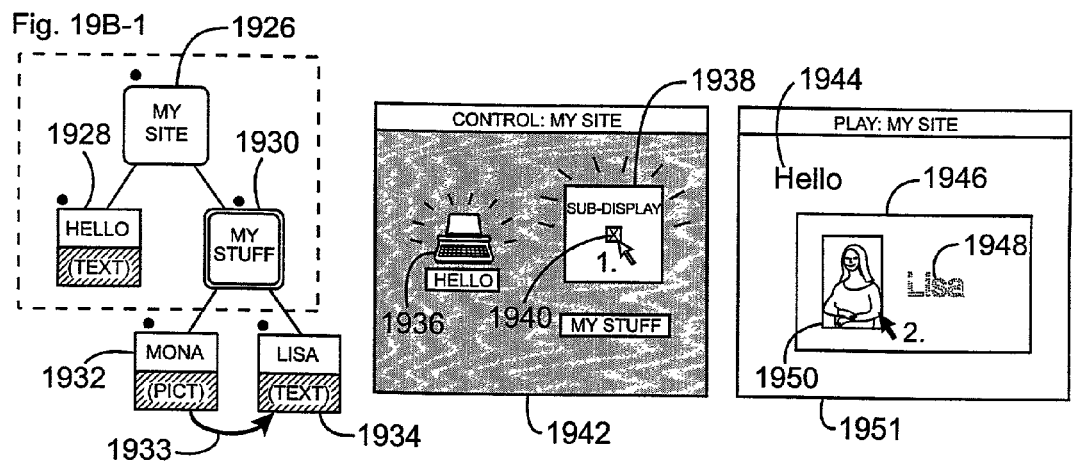
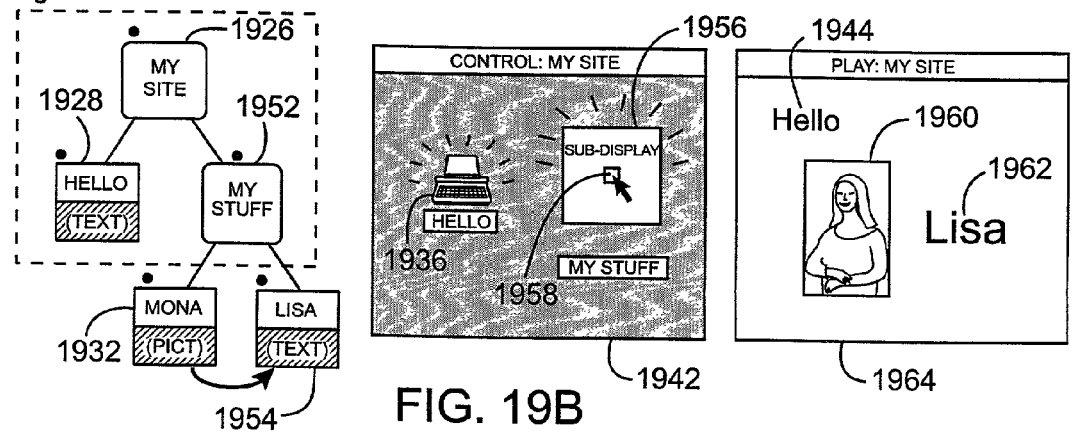
FIG. 19B

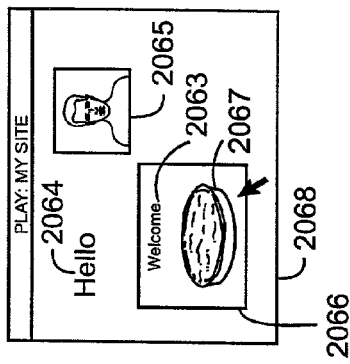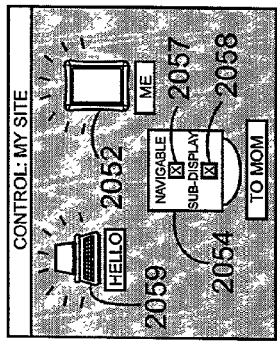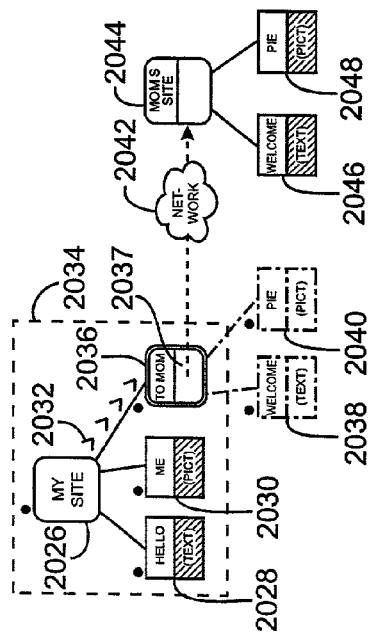
FIG. 20B
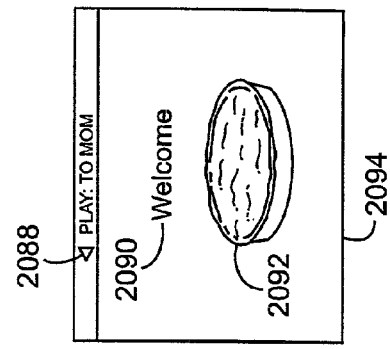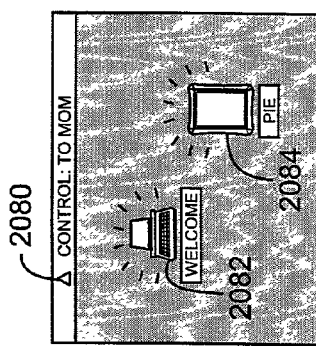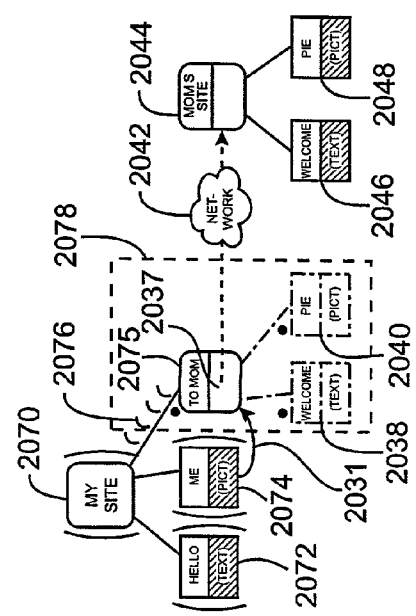
FIG. 20C

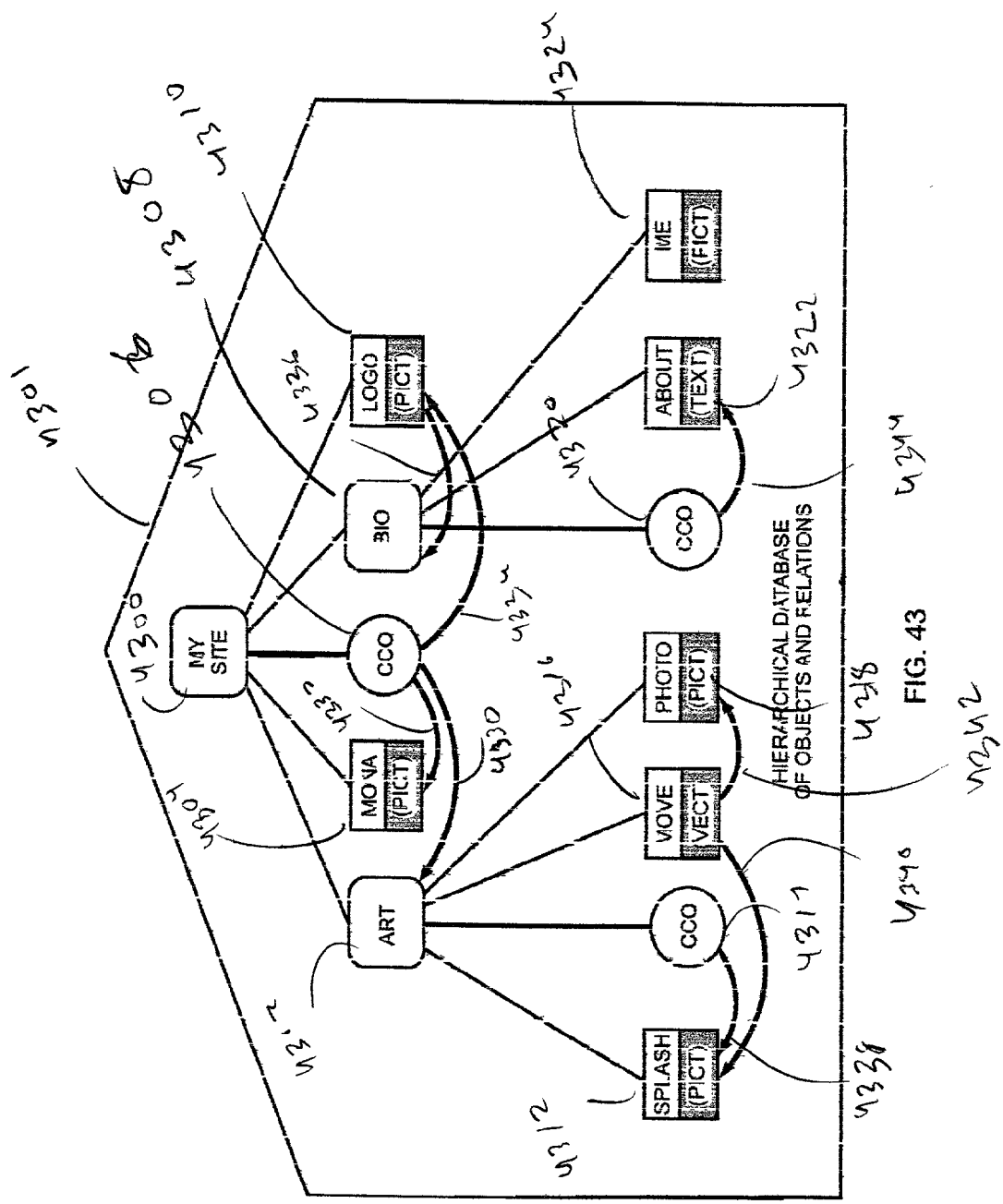

SYSTEM AND METHOD FOR MULTIMEDIA AUTHORING AND PLAYBACK

FIELD OF THE INVENTION

The present invention relates generally to the creation and development of multimedia content and applications, presentations, electronic greetings, web-sites and other forms of computer-based audio-visual content, and more specifically to an interactive authoring and playback system with improved features for the creation and presentation of multimedia content.

BACKGROUND OF THE INVENTION

Since the early 1990's, as the processing power of computers has increased, so has their ability to produce and present high-quality audio-visual content in the form of games, multimedia, animations, presentations and the like. With the Internet explosion of the late 90's, the ability of computers to share this content over a network and present it on websites has become increasingly important. Yet the tools for authoring, viewing, publishing and sharing of this content have evolved from disparate sources and specialized needs, and bring with them individual legacies and collective incompatibilities. Furthermore, the evolution of these tools has failed to keep pace with the growing mass market of computer users. In particular, many of the authoring tools were initially designed for professional use, and attempts to "dumb them down" for non-professional users have lead to mixed results.

In general, multimedia tools typically provide certain basic authoring and control features. Thes include means for importing and/or creating media objects (which can include images, sound, video, animated graphics, text and other data representative of audio-visual information), tools for editing the media objects, methods for enabling the author to specify the playback behavior of individual media objects within the overall presentation, and means for outputting finished multimedia content that can then be stored on Internet-enabled servers and linked together via the World Wide Web. All of these features vary from system to system, and the effective authoring and control of the applicable data invariably depends upon their successful implementation.

Regardless of the system involved, however, these features must be implemented according to the expected use of the system if they are to achieve the intended results. For example, the author may want to specify the circumstances under which a given media object starts and stops playing, its on-screen size and location, time-based or event-driven changes to its size and location, and various other playback behaviors appropriate to the object. The means by which this is done needs to be tailored to the expected skill level of the author. The features of an authoring system therefore vary greatly depending on how sophisticated the author is assumed to be.

In some systems, the author is assumed to be sophisticated. For example, if a professional web developer needs to create a cutting-edge, science-fiction-style user interface for a major entertainment website, extremely detailed control over the playback behavior of media objects is needed to provide the expected degree of activity and responsiveness. One method for achieving this level of detail involves the use of scripting, and is exemplified by Javascript used in conjunction with HTML in web applications.

Scripting methods operate at the most basic level by associating a list of instructions, called a script, with a triggering event. The possible triggering events for scripts vary, and include real-time input from the user interface, timers and clocks, trigger points within media object timelines, other scripts, etc. When the triggering event for a script occurs, a script playback engine, called an interpreter, reads the instructions in the script and performs the actions and procedures specified therein. In a multimedia system, these actions and procedures not only provide the features customarily found in any programming environment, such as sub-routines, conditional branches, general purpose variables, math operations, etc., but they also include facilities for manipulating and controlling the playback of media objects.

Regardless of the specific instructions supported by a particular scripting method, the results obtained from running the script must reflect the author's intentions. However, current methods of scripting are often unsatisfactory due to the procedural nature of scripting. Especially when dealing with highly interactive multimedia presentations with numerous possible states and paths, the step-by-step nature of the script instructions tends to obscure the true structure of the content, and requires substantial mental visualization, i.e. sophistication on the part of the author, to be used effectively. As a method for controlling the behavior of media objects in a multimedia system where ease of use for unsophisticated users is needed, current methods of procedural scripting have significant drawbacks.

One drawback is that the procedures used to create the scripts are abstract and fragmented, and do not correspond either directly or intuitively to the shape and structure of the resulting multimedia presentation. This problem becomes worse as the size and complexity of the multimedia presentation increases. To create a set of scripts that represents a highly interactive or expansive presentation, a large number of non-intuitive, interrelated procedures must be performed, often presenting a complex or frustrating burden to authors, particularly those who are inexperienced.

Another drawback is that current methods of scripting frequently result in rigid or too simplistic algorithms for determining the activity in a presentation. This tendency often leads to mechanical-looking results and misses the objective of creating appealing and entertaining multimedia content. For systems that otherwise derive advantage from creating multimedia content that is attractive or interesting to a viewing audience, this presents a burden in delivering appropriate results.

Therefore, current systems and methods which use scripting to enable the author to specify the playback behavior of media objects are generally unable to provide the clarity, intuitiveness, and ease of use required to efficiently and effectively produce multimedia, websites, and other audio-visual content.

Some authoring systems are designed based on the assumption that the author is unsophisticated. For example, when a consumer wants to present a slide-show of family photographs on a personal website, only minimal control over the playback behavior of media objects is needed (i.e., selection of the order of the photographs), but the process of specifying that control must be simple enough to be easily understood by the average consumer. One method for enabling the author to specify the playback behavior of media objects where the manner of specifying is simple and easy to understand involves the use of templates.

As a way of enabling the author to specify the playback behavior of media objects where the manner of specifying is simple and easy to understand, template methods in this field operate at the most basic level by providing means for the author to associate individual media objects or sets of media objects with specified roles or events within a template, or piece of multimedia content in which the playback behavior of the media objects has been programmed in advance but in which some of the media objects have been left unspecified. Once the author has assigned one or more media objects to their desired roles or events within the template, the system incorporates the specified media objects into the template and outputs the combination as a finished piece of multimedia content.

Regardless of the specific means provided for associating media objects with roles or events within a template, the combination of author-selected media objects and pre-programmed template must produce the desired results by displaying multimedia content that reflects the creative intentions of the author. However, current methods that use templates are frequently unsatisfactory due to the pre-programmed nature of the template, and because the author generally has no input into the form of the template or the functionality it provides. Particularly with regard to multimedia presentations where individuality or uniqueness is desirable, an author's creative intentions are frequently unable to be realized using templates. As a method for controlling the behavior of media objects in a multimedia system where detailed or flexible control is needed, current methods using templates have significant drawbacks.

One drawback with current methods using templates is that the procedures undertaken to develop templates cannot take into account each individual author's profile, likes and/or dislikes, but must rather make broad assumptions about authors in general. For templates to be effective in assisting authors to realize their creative intentions, this presents a burden in the provision of effective assistance.

Another drawback is that current methods using templates typically result in media object behavior that is generic, inflexible or overly simplistic. This tendency often leads to multimedia content which is "canned" looking or otherwise uninteresting. For systems that derive advantage from creating multimedia content that has such characteristics as uniqueness or interest for the viewing audience, this presents a burden in delivering appropriate results.

Therefore, current systems and methods using templates to enable the author to specify the playback behavior of media objects are generally unable to provide the usefulness, flexibility, and author-specific objectives required to efficiently and effectively enable satisfactory authoring of multimedia, websites, and other audio-visual content.

Some systems focus on the passage of time in how they organize the playback behavior of media objects. For example, when a consumer wants to shoot several minutes of home video and use it to create a one minute 'movie,' the ability to take a number of separate media elements, such as video segments, sound effects, musical clips, text items, etc., and organize them in time is required. One way to provide this ability this is through the use of timelines.

Timeline methods in this field operate at the most basic level by providing means for the author to place representations of media objects on a line which is divided into frames, each frame representing a discrete, constant unit of time passing. The "frame rate" of a timeline specifies the length of this constant unit; for example, a frame rate of ten frames per second means that each unit is a tenth of a second long.

In professional timeline authoring tools such as Macromedia's Flash 5, the timeline may further be divided into independent data paths or "layers" which allow the author to develop the behavior of several media objects in parallel. For example, one layer could be used for behavior changes to a background object, and speparate layers might be used for each of several foreground objects. Additional means may be provided for organizing timelines into interconnected "scenes", looping timelines, and nesting timelines within timelines, and exporting the results as completed "movies." In professional authoring tools such as Flash 5, scripting capabilities may be provided so that the author can program timelines and their contents to behave interactively according to end-user input.

Typically, finished movies are played back using a special program, or in the case of web playback of Flash 5 files, using a web browser plug-in. The plug-in or program interprets the movie data on a frame-by-frame basis and displays it to the end user in a playback display.

Regardless of the specific means for defining playback behavior in time, the timeline approach must produce the desired results in a variety of situations. For example, the author may be unsophisticated, or need to produce content very quickly, or the content being produced may need to be highly interactive for the end user. In these cases, the timeline approach has significant drawbacks.

If the user is unsophisticated, or the content must be produced very quickly, the timeline approach represented by tools such as Flash 5 is daunting. Defining behavior on a frame-by-frame basis is an inherently painstaking process, not conducive to quick gestures or spur-of-the-moment ideas. For example, a simple idea like "fade this picture out for three seconds" becomes "place a picture at this frame, now place it 36 frames later, now set its properties at the first frame, now set them at the later frame, now create a motion 'tween' (transition object) between them."

When interactivity is required the situation gets even more complex. Timelines are inherently linear in that they represent pre-defined behavior over time. But interactive presentations are inherently non-linear, since they must account for circumstances and user choices that will happen at unpredictable times. Therefore, in order to program even the most basic levels of interactivity, professional tools like Flash 5 must employ scripting, which has drawbacks that have already been discussed.

Some tools providers have addressed the problems of complexity and interactivity through the use of timeline templates. These templates are typically canned sequences produced by professionals that can be laid out, interconnected and adjusted somewhat by the author; for example, the author may be able to specify some color schemes, fonts and custom text that appears in the animations. Examples of this approach are found in the sites Moonfruit.com and Electrifier.com. But timeline templates present similar problems to the templates already discussed. They are inflexible, limit the creative input of the user and often result in a canned look.

Regardless of the method used to enable the author to specify the behavior of media objects, outputting a finished piece of multimedia content frequently involves exporting it to a computer file which can then be stored on an Internet-enabled server and linked with other files via the World Wide Web. For example, someone using a web authoring tool to create a personal home page will typically output the page as a browser-readable HTML file and store it on a Web server, at which point the author's friends and family can view the page in their browsers and can put links to it in their own home pages. The linking method provided by the World Wide Web allows separate pieces of multimedia content located on different computers and authored by different people to be connected together into a web by including within one piece of multimedia content a pointer to the Web address of another.

This linking method provided by the World Wide Web operates at the most basic level by defining a browser-readable format for Web content called HTML (which may be extended by Javascript and downloadable browser "plug-ins" that can read and play custom formats), and by allowing authors to associate a triggering event in one piece of Web content (such as the user clicking on a particular line of text displayed in his or her browser) with the Web address of a second piece of Web content. When the triggering event occurs, the browser discards the current piece of Web content and loads and displays the second piece of Web content, effecting a page change. The address specified in the link identifies the desired Web content in terms of the Web server on which it is stored, using either the Internet Protocol (IP) address of the server or a registered domain name (such as www.yahoo.com) that is converted into the IP address by a Domain Name Server (DNS). Regardless of the type of authoring system used to create multimedia content for the World Wide Web, the system typically depends on this linking method to interconnect pieces of multimedia content stored on different servers.

The linked pages thus created and posted to Web servers are then viewed in a browser, which is a playback program that allows people to traverse, or navigate, through the distributed content page by page. This navigation process is distinguished in this document from "exploration" of files on the user's hard drive in that exploration involves traversing through a hierarchy of files, usually presented in a GUI using a data display with a desktop metaphor, as is done in Microsoft ® Windows ®. This data display represents to the user the current location in the hierarchy being examined and provides means to further explore up or down levels in the hierarchy, by opening nested containers called directories or folders and presenting their contents. It is relatively easy for a user to understand at any time where a particular folder or file is in the hierarchy.

Navigation, on the other hand, does not require a hierarchy. Navigation displays directly the content of a file or object being examined and maintains information about the file or object that was previously examined, providing a "back" function to return to the contents of the previous file or object. A "forward" function may further be provided to return to the most recent content that a "back" function has been executed from. In other words, when navigating the web, there is no absolute sense of where one is, only the most recent snapshot of where one has been.

Consequently, the method used by Web browsers to effect page changes is conceptually simplistic, involving first discarding the current page and then loading and displaying the next, and this can be inefficient or otherwise problematic in terms of the "Web surfing" experience of users. Particularly when it comes to effectively presenting link destinations, the smoothness of transitions between Web pages, and the robustness of links when Web content is moved, the linking method of the World Wide Web and its implementation by Web browsers have significant drawbacks.

One drawback of the linking method of the World Wide Web is that the procedures a Web browser uses to access data for a new page do not begin until the triggering event for the link has occurred. This means that after clicking on a link, the user must wait for the data of the new page to load before seeing the new page, which often takes a noticeable amount of time, Furthermore, it means that the user cannot preview the actual destination of the link prior to committing to the page transition, but can only evaluate the destination based on information provided in the current page, which is frequently inadequate. As a result, users frequently become frustrated after triggering links which are slow to load, irrelevant to the purposes at hand, or both. This presents a substantial burden in providing an efficient and pleasing Web navigation or "surfing" experience for the user.

Another problem with the linking method of the World Wide Web is that the Web addresses used in links identify pieces of Web content in terms of the server hosting the data rather than the data itself. This means that if a piece of Web content is moved to a different server, any existing links to that Web content will become invalid, resulting in "broken links." This approach misses the objective of providing Web links that are as robust and flexible as possible.

Therefore, current authoring and playback systems which depend on the linking method of the World Wide Web to provide linking of content across different servers inherit the drawbacks of that method, which include the inability to effectively represent link destinations to users, the inability to implement page changes with the smoothness, efficiency and flexibility required to provide a fully satisfactory Web surfing experience for users, and the inability to reference Web content when that content is moved.

Considered separately, current systems for authoring, publishing, sharing and viewing of multimedia content present drawbacks to the user. What is needed in authoring systems is a level of control over the content provided by scripting, without the complexity, loss of perspective and mechanical results inherent in scripting methods. What is further needed in authoring systems is a simplicity and ease of use found in templates, without the restrictions imposed by template methods. What is also needed is the ability to control time-based and interactive processes without the inflexibility imposed by timelines. What is needed in publishing, sharing and viewing systems is a manner of interconnecting content distributed on the Web or other network that allows for a smooth and pleasing navigation experience for the user and is robust when portions of the content are moved from one location to another.

Finally, when taken together, current systems for authoring publishing and sharing present a collective burden in that: 1) the number and quality of tools varies greatly; 2) each only addresses a specific part of a much larger picture; and 3) incompatibilities and inefficiencies arise as content is passed from one tool to the next along the production, publishing and viewing chain. Therefore what is further needed is a unified approach to authoring, publishing, sharing and viewing that eliminates these inefficiencies and incompatibilities.

SUMMARY AND OBJECTS OF THE INVENTION

In view of the above-described disadvantages with present systems, it is an object of embodiments of the present invention to provide a multimedia authoring and playback system that affords more intuitive display and control interfaces and provides improved authoring of multimedia, web-sites and other media-rich content.

It is an object of the present invention to provide system users with faster, more flexible development and management capabilities.

It is another object of the present invention to provide for high-quality authoring and control of multimedia without the need for the user to be a professional developer, have significant training in authoring methodology, or be otherwise sophisticated.

It is yet another object of the present invention to provide advanced control features and functionality that afford clarity, intuitiveness and ease of use for the author.

It is also an object of the present invention to allow authors to publish multimedia, web-sites and other forms of media-rich content directly from their local PC.

It is a further object of the present invention to provide a multimedia authoring and playback system that affords the creation of more dynamic multimedia content by a user, with less effort.

It is yet a further object of the present invention to provide a multimedia authoring and playback system that allows users to easily add media-rich content to online communications (such as emails, instant messages, chat rooms, presentations, online communities, virtual private webs, etc.), and to make e-communications more interactive and audio-visual rich.

It is still a further object of the present invention to provide a smoother and more satisfactory web surfing experience for users via improved methods for linking and playing back interconnected pieces of multimedia content stored on different computers.

It is still another object of the present invention to provide a multimedia authoring and playback system that affords improved management and manipulation of data via improved hierarchical arrangements.

It is an additional object of the present invention to provide a multimedia authoring and playback system that affords improved management and manipulation of data via improved object type characterizations.

A system and method for multimedia authoring and playback is disclosed. Users of the system create, edit and distribute multimedia content and applications in the form of 'presentation data,' which may be viewed by recipients who 'play' the content (and in some cases may be allowed to modify it). The 'playback' of content is presented in one or more windows or displays called 'playback displays'. Playback displays present the 'playback output' of presentation data which is playing, and can also provide various editing functions which may be used to create and edit presentation data. Additional windows or displays, called 'control displays,' may be included to provide playback control functions, and these too may be used to create and edit presentation data.

This basic functionality of the present invention, as discussed above, is quite similar to that of many widely available authoring tools and systems. However, compared to these other tools and systems, the present invention offers significant innovations in several areas, and these include: 1) creating objects and editing their appearance; 2) distributing presentation data to recipients; 3) starting and stopping playback; 4) creating playback 'behavior'; 5) working with control displays; 6) interconnecting objects using 'pointer' objects; 7) user 'navigation' through the presentation data; 8) hierarchical structuring of the presentation data; and 9) nested 'sub-displays' embedded within playback displays.

While the innovations in each of these areas are fundamentally independent from one another, each providing value and standing on its own as a feature of the present invention, in many cases the various innovations build on one another in ways which are highly complementary. Wherever possible, features have been designed to leverage and take advantage of each other in this way, so that as layers of innovation and novelty are added in the above areas, the system increases in power substantially, but without undermining ease of use. In its most fully realized embodiment, the system becomes a new type of software application, seamlessly integrating authoring, playback and networking in an active, shared, rich media environment optimized for personal communications.

The features and advantages of the present invention will be apparent from the accompanying drawings and detailed description that follows.

BRIEF DESCRIPTION OF THE DRAWINGS

The present invention is illustrated by way of example and not limitation in the figures of the accompanying drawings, in which like references indicate similar elements, and in which:

FIGS. 3B through 5C illustrate the editing of media objects, according to embodiments of the present invention;

FIGS. 7A–C illustrate user control over the starting and stopping of object playback, according to embodiments of the present invention;

FIGS. 9A–9D and 10A–D illustrate programming of object behavior following a sentence paradigm, according to embodiments of the present invention;

FIGS. 11A–B illustrate the functionality of vector objects, according to an embodiment of the present invention;

FIGS. 13A–14B illustrate uses of the control display, including starting and stopping individual objects and programming object playback behavior through the use of popup panels, according to embodiments of the present invention;

FIGS. 15A–D illustrate hierarchically nested container objects, and exploration of hierarchically structured object data in a control display, according to embodiments of the present invention;

FIGS. 16A–C and 17A–C illustrate an extension of the hierarchically structured object space to include files in a hierarchical file system (HFS), producing a hierarchical file extension (HFX), according to embodiments of the present invention;

FIGS. 18A–D illustrate user navigation of the hierarchical object space and the HFX, according to embodiments of the present invention;

FIGS. 19A–C, 20A–C, and 21A–C illustrate the properties and uses of nested sub-displays, and how they relate to navigation of the hierarchically structured object space, according to embodiments of the present invention;

FIG. 43 illustrates a block diagram of an individual, exemplary hierarchical database of objects and relations, according to an embodiment of the present invention;

DESCRIPTION OF THE PREFERRED EMBODIMENTS

Figure 1:
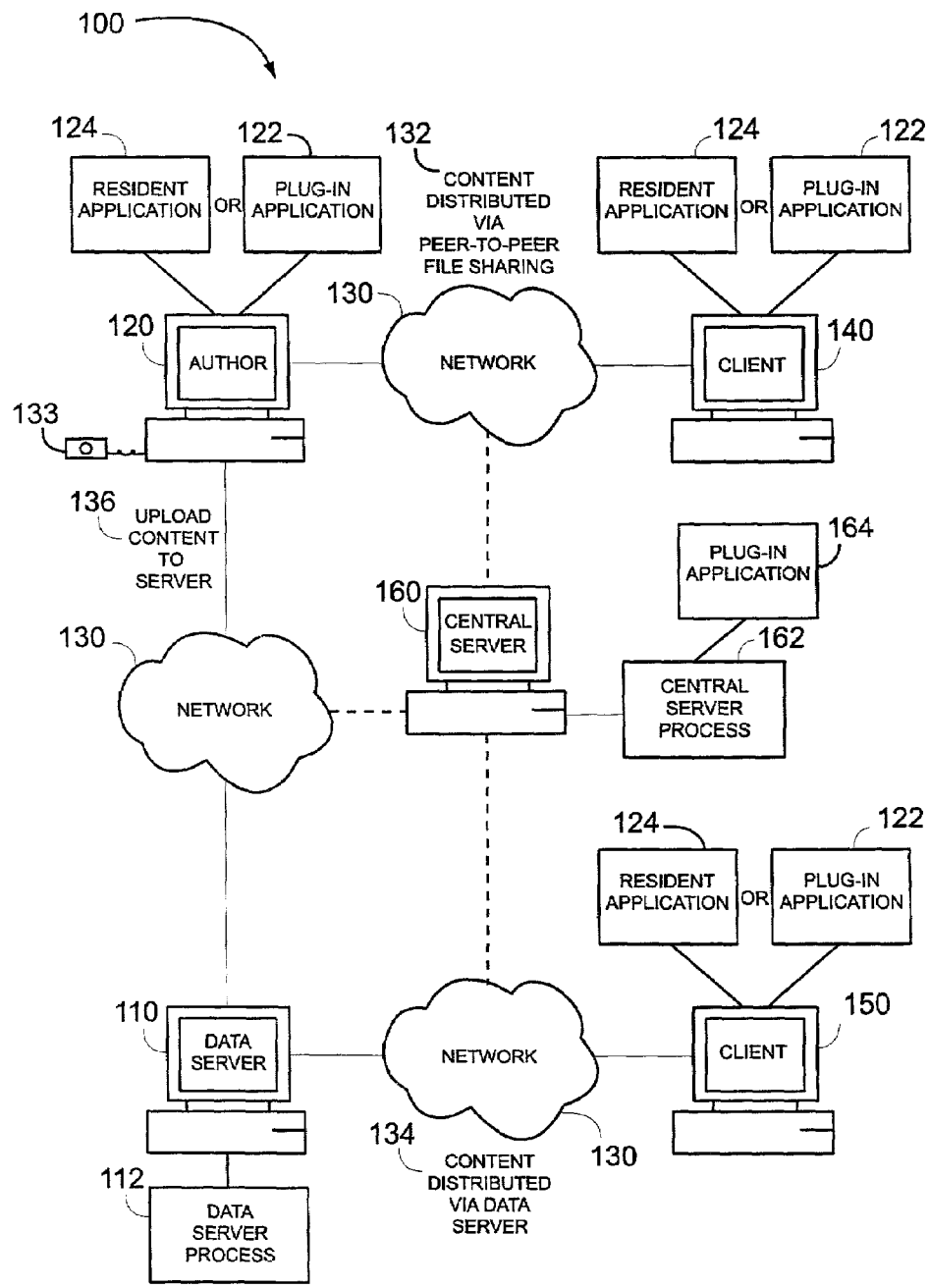
FIG. 1 illustrates a block diagram of a computer system, either network or standalone, that implements embodiments of the present invention.

A multimedia authoring and playback system for use in a computer-based environment is disclosed. In the presently preferred embodiments, the system can be executed via a resident application on a computer workstation, or it can be executed via a plug-in application hosted by a Web browser or other host. In the following description, for purposes of explanation, numerous specific details are set forth in order to provide an understanding of the present invention. It will be evident, however, to those of ordinary skill in the art that the present invention may be practiced without the specific details. In other instances, structures and devices are shown in block diagram form to facilitate explanation. The description of the preferred embodiments is not intended to limit the scope of the claims appended hereto.

Hardware Overview

Aspects of the present invention may be implemented on one or more computers executing software instructions. According to a preferred class of embodiments of the present invention, a single computer locally executes the software instructions. The computer can locally execute the software instructions as a resident application or as a plug-in application. According to another preferred embodiment of the present invention, several computers connected to a network may execute the software instructions, each of them accessing and manipulating shared data which is transmitted and received over a computer network or standard telephone line. In this embodiment, the sharing of data can be accomplished using either of two sub-embodiments: 1) by standard network server, or 2) by peer-to-peer filesharing.

Regardless of whether operation is standalone or networked, the steps of accessing, downloading, and manipulating the data, as well as other aspects of the present invention, are implemented by a central processing unit (CPU) in a computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the computer from a storage device, or from one or more other computer systems over a network connection. For example, a server computer may transmit a sequence of instructions to a client computer in response to a message transmitted to the server over a network by the client. As the client receives the instructions over the network connection, it stores the instructions in memory or on disk. The client may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, this embodiment of present invention is not limited to any specific combination of hardware circuitry and software, nor to any particular source for the instructions executed by the computer running the software.

FIG. 1 illustrates a computer system 100 that implements one or more embodiments of the present invention. The network embodiment of FIG. 1 is addressed below. The standalone resident application 124 embodiment and standalone plug-in application 122 embodiment are shown in FIG. 1 in connection with the author's computer 120, along with all of the (for this purpose, unnecessary) network system elements. More thorough descriptions of the resident application 124 embodiment and plug-in application 122 embodiment are provided in connection with FIGS. 22 and 23, respectively.

In the network embodiment of system 100, two means for distributing content over a network are shown. The first uses a standard network server to provide content distribution 134. A network data server computer 110 is coupled, directly or indirectly, to one or more authors' computers 120 and to one or more client computers 150 through a network 130. The network interface between the data server computer 110 and the author and client computer(s) may also include one or more routers that serve to buffer and route the data transmitted between the server and client computers. Network 130 can be the Internet, a Wide Area Network (WAN), a Local Area Network (LAN), or any combination thereof. The network 130 is normally a bi-directional digital communications network that connects the author computer(s) 120 and client computer(s) 150 with the data server 110. With current technologies, a CATV (cable television) bi-directional network, ISDN (Integrated Services Digital Network), DSL (Digital Subscriber Line), xDSL high-speed network or wireless network are examples of existing network infrastructures enabling the necessary network connections for implementing embodiments of the present invention, though they are not intended to be exclusive as to the types of networks capable of practicing the present invention.

In embodiments of the present invention where the Internet is used as the network, the data server 110 executes a data server process 112 to provide file access to author and client computers coupled to network 130. Content is uploaded from author computer 120 to server 110 using a file transfer protocol, such as FTP. Once present on the server, content can be accessed from client computer 150 using http or some other file read protocol. For this embodiment, other client computers (not shown) may access the Internet network 130 through an Internet Service Provider (ISP). Similarly, as alternative to the use of Web server processes, the system can be implemented as proprietary or dedicated software programs that communicate over a public or private computer network.

The second means for distributing content over a network uses peer-to-peer filesharing to provide content distribution 132. In this embodiment, author computer 120 runs a filesharing process, included within resident application 124 or plug-in application 122, which simulates the network or web server process 112 that runs in data server 110. Author computer 120 is coupled, directly or indirectly, to one or more client computers 140 through a network 130. The network hardware and routing considerations are the same as for the server model, above. In order to publish content in this embodiment, author computer 120 logs the relevant data with its internal filesharing process, thereby making it accessible to external computers. Once it is made accessible in this fashion, the data may be accessed by client machine 140 over network 130 using a file access protocol. As with the server model, above, the file access protocol can either be standard, such as FTP or http, or proprietary.

The peer-to-peer filesharing process running in author computer 120 may be 'pure' peer-to-peer, in which case there is no central server involved, or it may be 'assisted' peer-to-peer, in which case central server 160, running central server process 162, may be used to facilitate author-client transactions (such as to provide the author's IP address to the client if the author does not have a dedicated, permanent IP address). Finally, plug-application 164 is shown hosted by central server process 162, allowing both authors and clients to interact with the invention over a network, which is one of the configurations in which the present invention may be implemented.

The system of FIG. 1 is configured for the overall objective of authoring and playback of data (multimedia content and applications, presentations, greetings, web-sites, etc.) according to the desires and control of the user. The system functions as the genesis of this data, which may be suitable for dissemination to any number of desired users specified by the author. It should be noted that a system 100 that implements embodiments of the present invention may include a larger number of interconnected author, client and server computers than shown in FIG. 1. The desired dissemination can certainly have differing scopes of preferred coverage, and the user can have corresponding control over the enabling functionality.

As can be appreciated by those of ordinary skill in the art, the representative networked computers of FIG. 1 can be implemented as any standard computer that includes a CPU coupled through a bus to various other devices. These devices could include random access memory (RAM), a read only memory (ROM), and mass storage devices (e.g., a magnetic disk, tape drive, optical compact disk, and/or any card or other device for storing data and instructions). The computer also typically includes input/output devices, such as, a display device, keyboard, and network interface device, along with other similar devices or interfaces. It may also include a 'web cam' or other image capturing device which captures images and makes them available to applications running in the computer via 'driver' software. It may also include an audio playback system, which in most cases would consist of digital-to-analog audio converters, an amplifier and speakers (provided in a variety of physical configurations). Any of the computers in FIG. 1 can be implemented in the form of a personal computer, a laptop computer, a mainframe computer, other types of workstation computers, a set top box, a computing/gaming device, a computing device of comparable capabilities, a PDA or other handheld device, or any other terminal device providing access to the system.

The presently preferred embodiment of the invention, discussed throughout this specification, was produced using Microsoft Visual C++ Version 6.0 running in a Windows 98 desktop computer.

Functional Overview

The system described in this specification is best understood in terms of the user experience it provides. Therefore, various features of the system are now described with an emphasis on the user experience, along with a moderate amount of explanation of the underlying operations and data management procedures occurring at each point. The system architecture section which follows this functional overview then explains the underlying system operations in detail.

The following sections describe various exemplary embodiments of the present invention in which an author creates and manipulates multimedia content by means of a graphical user interface (GUI). This GUI features a 'playback display' for viewing and editing content which is playing, and optionally, a 'control display' for controlling object playback and 'exploring' object data. These displays can take many forms on many different hardware platforms, and the specific display representations are not to be understood as limiting or restricting the appearance or implementation of the control display or the playback display.

One important aspect of the present invention is how it allows presentation data to be interconnected in structures. Thus, to help clarify the workings of the system in these embodiments of the invention, three common representations are used in many of the diagrams that accompany the following sections: 1) to the left a structural representation of the presentation data as it resides and interacts in the system 2) a simplified picture of the control display 3) a simplified picture of the playback display. These three elements may be used separately or in tandem to illustrate different aspects of the workings of the invention.

Figure 2A:
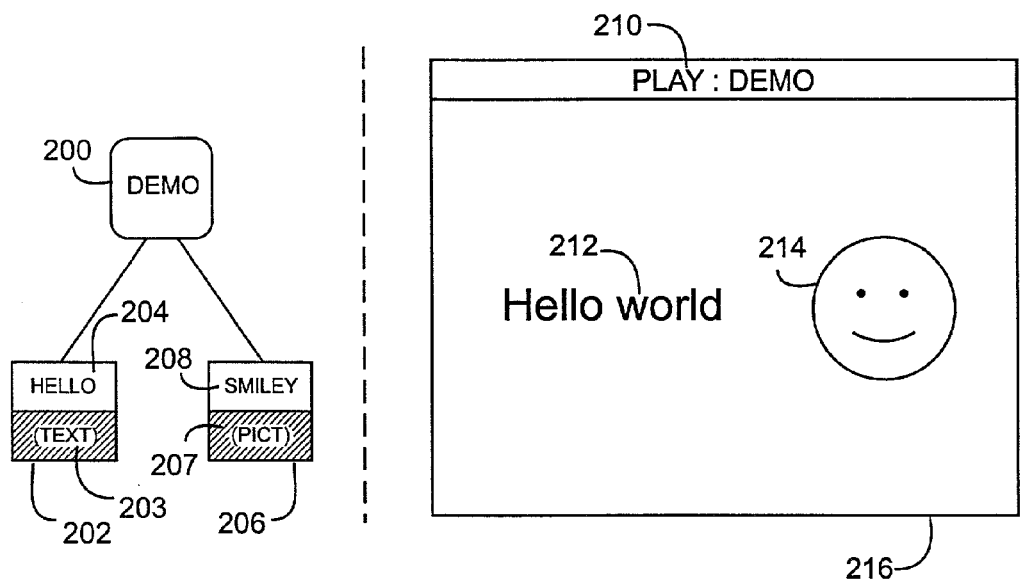
FIGS. 2A–D and 3A illustrate the basic elements of the system, including the creation of new media objects, according to embodiments of the present invention.

BASIC ELEMENTS OF THE SYSTEM—The left side of FIG. 2A shows a representation of a container object 200 containing a text object 202 and a picture object 206. Text object 202 further comprises setup and properties data 204 and content data 203. Similarly, picture object 206 comprises setup and properties data 208 and content data 207. To the right in FIG. 2A is a representation of a playback display 216 with a status indicator 210 indicating that the playback display 216 is in play mode, and that container object 200 is playing. The playback display 216 is displaying the text content "Hello World" 212 of text object 202, as well as the picture content 214 of picture object 206.

Figure 2B:
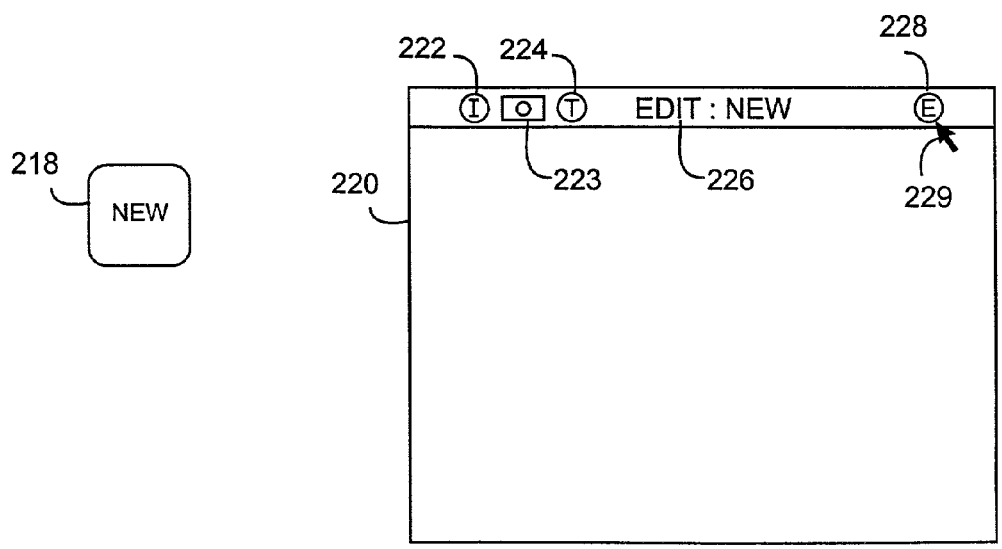

FIG. 2B shows a situation in which the user has created a new container object, according to one embodiment of the invention. The left side of FIG. 2B shows a representation of the new empty container object 218 named "NEW." To the right, status indicator 226 indicates that the playback display 220 has entered edit mode as a result of a user-initiated click of the pointer 229 on edit mode command icon 228. Status indicator 226 also indicates that container object 218 NEW is being edited. Other command icons 222, 223 and 224 are shown. These correspond to editing functions which will be described later in this document.

Figure 2C:
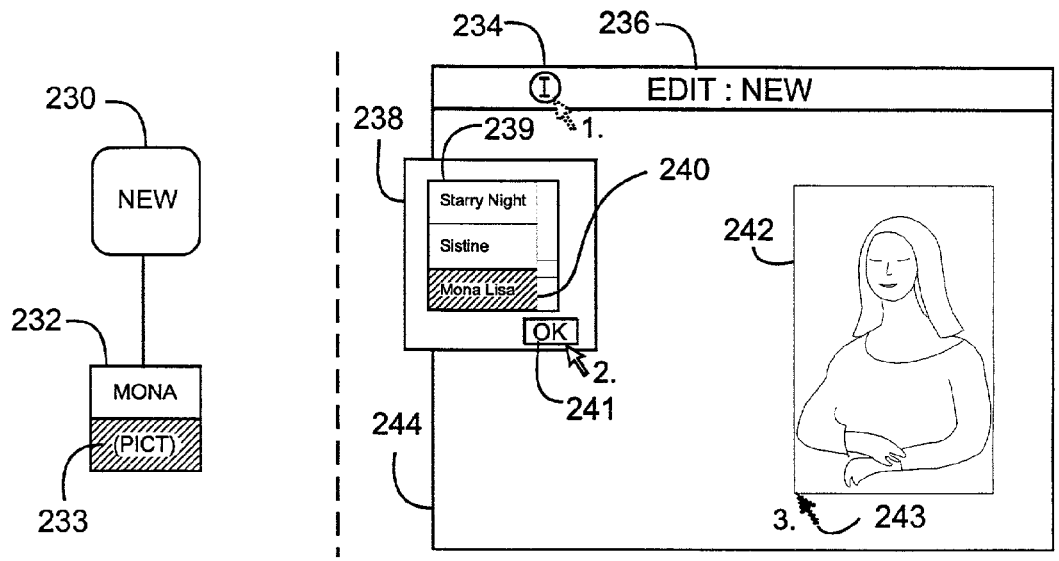

CREATING NEW MEDIA OBJECTS—FIG. 2C shows a new picture object being imported into the system from an external picture file by three user actions, according to one embodiment of the invention. Again the status indicator in 236 in playback display 244 indicates that the playback display 244 is in edit mode and that object 230 is being edited. On the right is shown three click actions performed with pointer 243. First, the user clicks on import command icon 234, which opens file selection dialog 238. In file selection dialog 238, several external picture files 239 are shown, which may be standard graphics files such as JPEG, TIFF, BMP or similar files stored in a hierarchical file system. The picture file 240 named "Mona Lisa" is selected and the user clicks "OK" button 241. Finally, the user clicks on a desired location in the playback display 244 and the picture content 242 appears at the point where pointer 243 is clicked. As a result of this three-action process, as seen in the representation on the left side of FIG. 2A, a new picture object 232 is created, which is now contained in container object 230. Picture content 233 corresponds to the imported picture content 242 shown on the right.

Figure 2D:
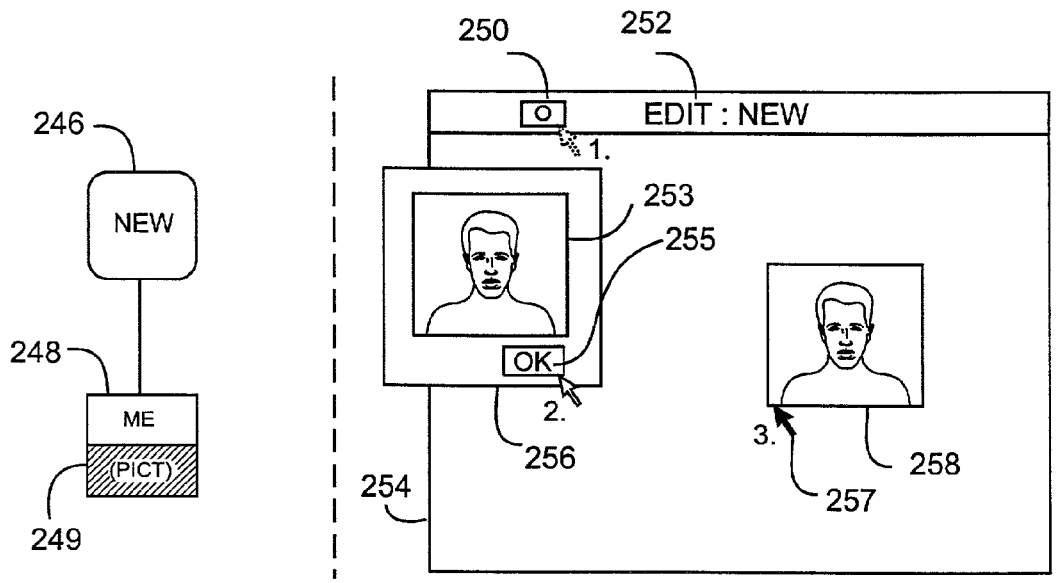

FIG. 2D shows a picture being created by the system through the use of a web camera, according to one embodiment of the invention. The user clicks on the web cam command icon 250 in playback display 254 and a web camera dialog 256 is shown with a real-time view of the desired subject 253 to be captured as a digital image displayed in the dialog 256. The user clicks button 255 OK, then clicks at a desired location in the playback display 254 with the pointer 257, and output 258 from a newly created picture object containing the captured digital image appears. In one embodiment of the invention, the dialog 255 and software drivers associated with the capture of the digital image are provided by a third-party web camera software.

Figure 3A:
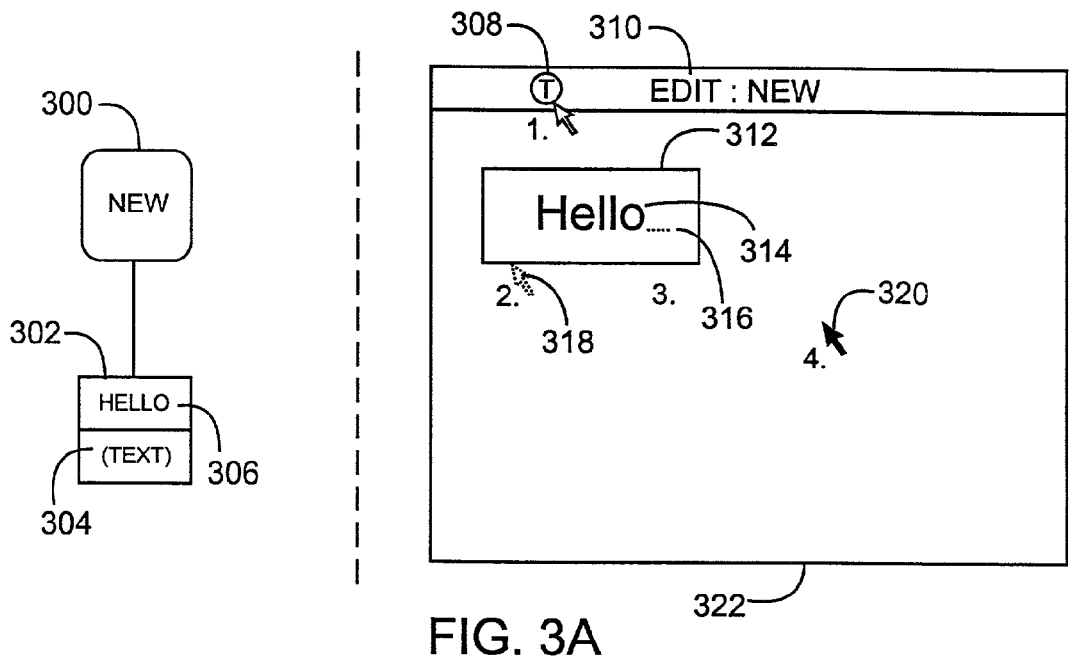

FIG. 3A shows a situation in which the user creates a new a new text object using three actions, according to one embodiment of the present invention. Again, the status indicator 310 for playback display 322 indicates that the user is editing container 300 NEW. First, the user clicks on the new text command icon 308; second, the user clicks on a desired spot 318 in the playback display 322, causing a new text box 312 to be displayed in the playback display 322.

The new text box 312 contains a cursor 314 indicating that the user can enter new text, and as new text 314 "Hello" is entered, the cursor 316 follows the last character entered. When the user is done entering text, the pointer 320 is clicked at any spot in the playback display that is outside the new text box 314, completing the operation. As is shown on the left of FIG. 3A, a new text object 302 named "HELLO" is created, contained in container object 300. The new text object 302 contains the text "Hello" in its content data 304.

Figure 3B:
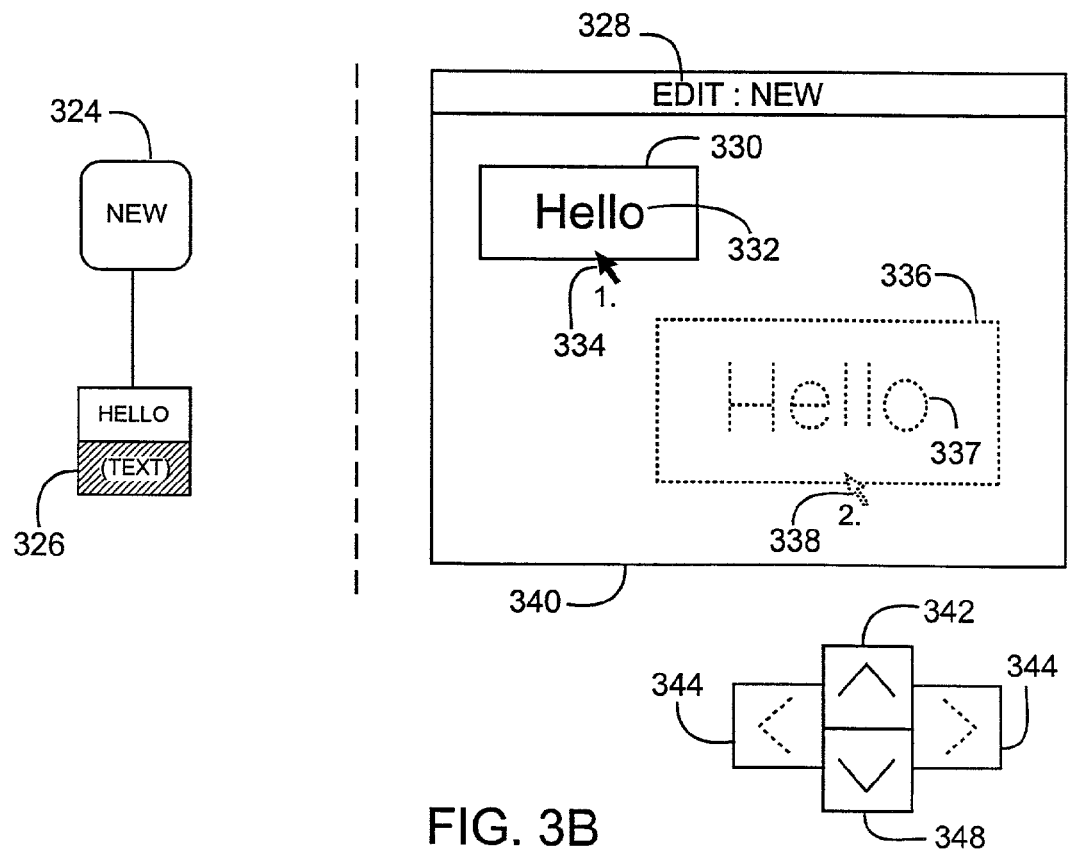

EDITING MEDIA OBJECTS—FIG. 3B shows the editing of text object 326 whose output 332 is seen in playback display 340, according to one embodiment of the present invention. The playback display's status indicator 328 again indicates edit mode, and also indicates the user is editing the container 324 NEW and its contents. The user selects text output 322 by clicking on it with pointer 334, causing object selection box 330 to appear, indicating that the text can be edited. The user can then drag the selected text to a desired location 338 in the playback display 340. During that same process of dragging (or merely holding the mouse on) the text, the user may re-size the text by pressing and holding the up-arrow key 342, making the text larger, as seen in the increased size of the text output 337 and its selection box 336. Similarly, the down-arrow key 348 may be used to make the text output smaller.

Figure 3C:
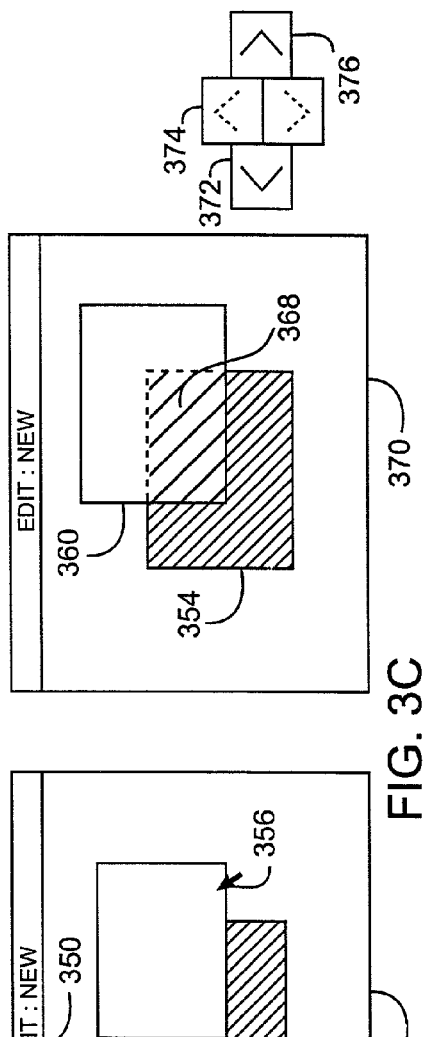

FIG. 3C shows control over transparency of a graphic object in the playback display, according to one embodiment of the present invention. Two graphic object outputs 354 ad 352 are seen as rectangles in the playback display 358. While in edit mode 350, the user selects graphic object output 352 with pointer 356, then presses and holds the left arrow key 372 to steadily increase the transparency of the graphic object output. The result is shown to the right in display 370, where the graphic object output 360 is now partially transparent, as can be seen from the overlap 368 between the two rectangles 360 and 354. Similarly the user may decrease the transparency, making selected rectangle 360 gradually opaque again, using the right arrow key 376.

Figure 3D:
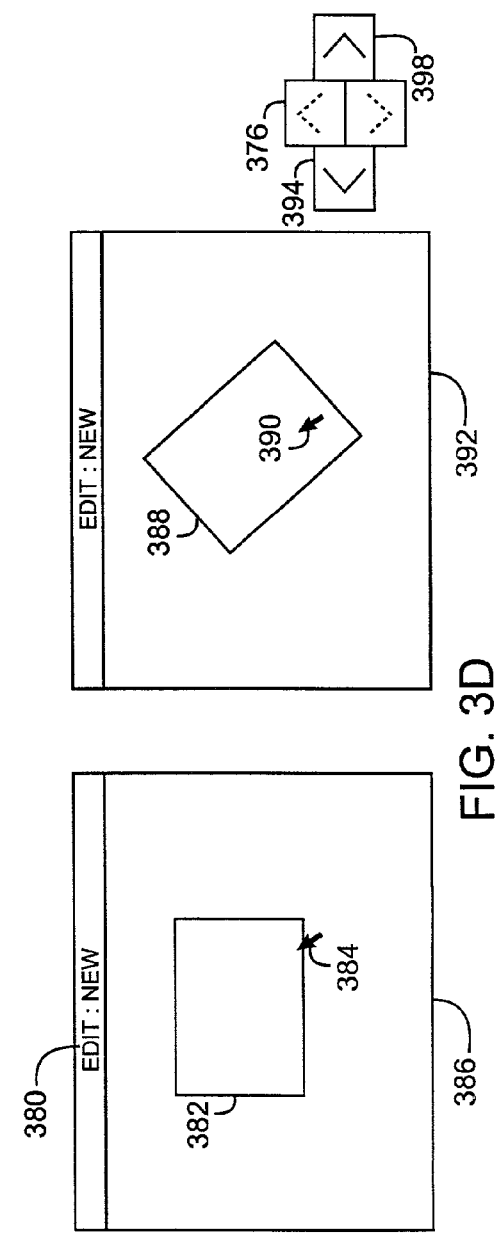

FIG. 3D shows the rotation of a graphic object in the playback display, according to one embodiment of the present invention. In edit mode 380, the user selects graphic object output 382 in the playback display 386 using pointer 384. The user holds the mouse or other pointer controller down while pressing and holding the right arrow key 398 to rotate the graphic object output 388 clockwise. Similarly, the left arrow key can be used to rotate the object output counter-clockwise. The object may also be dragged with the pointer 390 while the object 388 is being rotated.

Figure 4A:
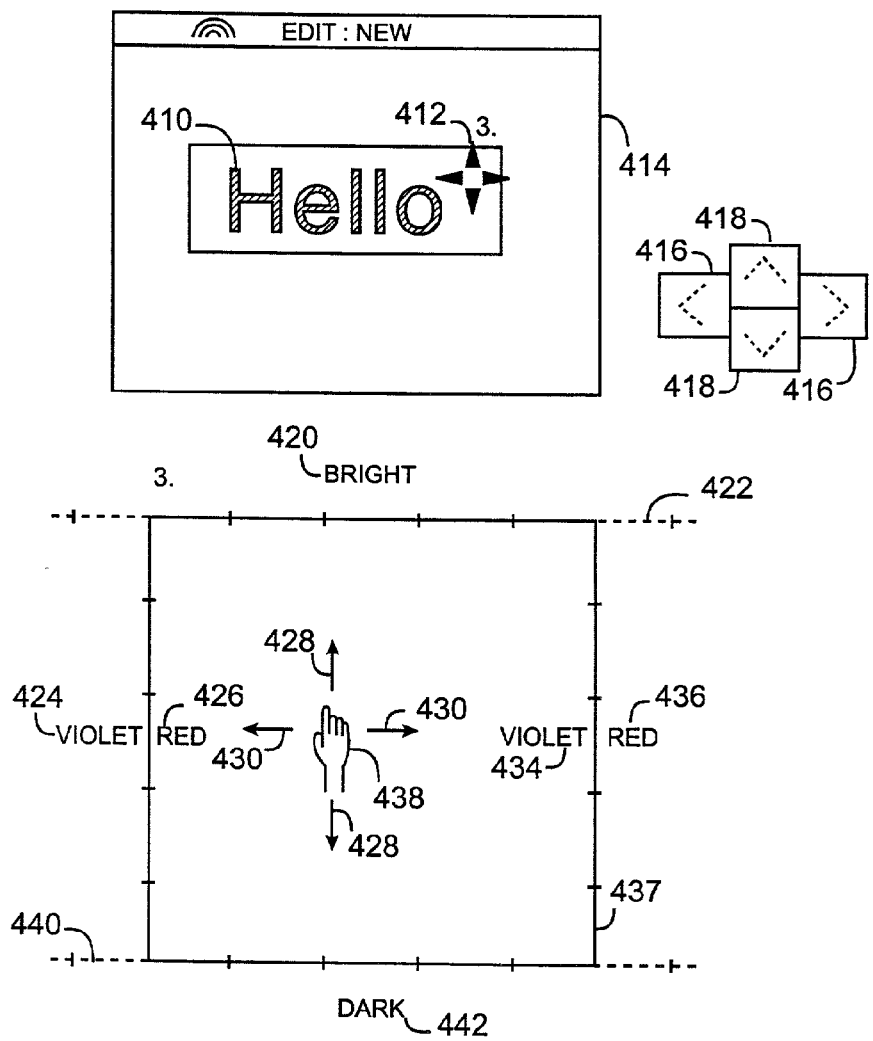

FIG. 4A shows the process of control over the color of a media object, in this case a text object, according to one embodiment of the present invention. In FIG. 4A-1 color adjust mode is entered when, while in edit mode 402, the user clicks the color control icon 400. The user then selects text object output 404 in the playback display 408. FIG. 4A-2 shows that when the selection has occurred a special cursor symbol 412 appears (alternatively, the object may be selected first, then the control icon), indicating that color adjust mode has been entered. The user may then move the mouse or other pointer controller 438 in any of four directions to adjust the color. Left or right movement 430 is used to adjust the hue toward the red end 426 of the color spectrum (left) or the violet end 434 of the spectrum (right). Up or down movement 428 is used to adjust the brightness or darkness of the color. In short the four directions form a "color grid" 437 which controls the color dimensions hue and brightness. The grid may be is optionally extended in the horizontal dimension 440 and 442, so that the hue values "wrap around" when the user moves the mouse or pointer controller beyond the point corresponding to the maximum value of hue in either direction. When in color adjust mode, up/down arrow keys 418 are used to increase or decrease the color saturation, and left/right arrow keys 416 are used to increase or decrease the transparency. All of the aforementioned color changes happen in real time to the object output 410 in playback the display 414. The special cursor symbol 412 need not move during color adjust mode. Color adjust mode may be left by clicking the mouse or other pointer controller.

FIG. 5A shows a graphic object being stretched, according to one embodiment of the present invention. In edit mode 500, graphic object output 502 is shown in playback display 514. The user clicks on the edge 506 of the graphic object output, revealing four drag handles 508. The user may then click on a drag handle 508 and drag the object, stretching it in the direction of the drag handle. The result is shown in playback display 516 where the object output 510 appears elongated. Clicking anywhere in the object display 516 that is outside of the edge 512 of the object output will cause the drag handles to disappear.

FIG. 5B shows the logical size of an object being changed, according to one embodiment of the present invention. In edit mode 518, graphic object output 520 is shown in playback display 530. The user clicks on a corner of the object revealing four corner drag handles 522. The user may then drag a corner drag handle to change the logical size of the object, i.e., the portion of it being "revealed" in the playback display. The result is shown in playback display 532, as the outer edges 528 of the object output 526 now appear cropped. Clicking anywhere in the object display 532 that is outside of the edges 528 of the object output will cause the drag handles to disappear.

Figure 5C:
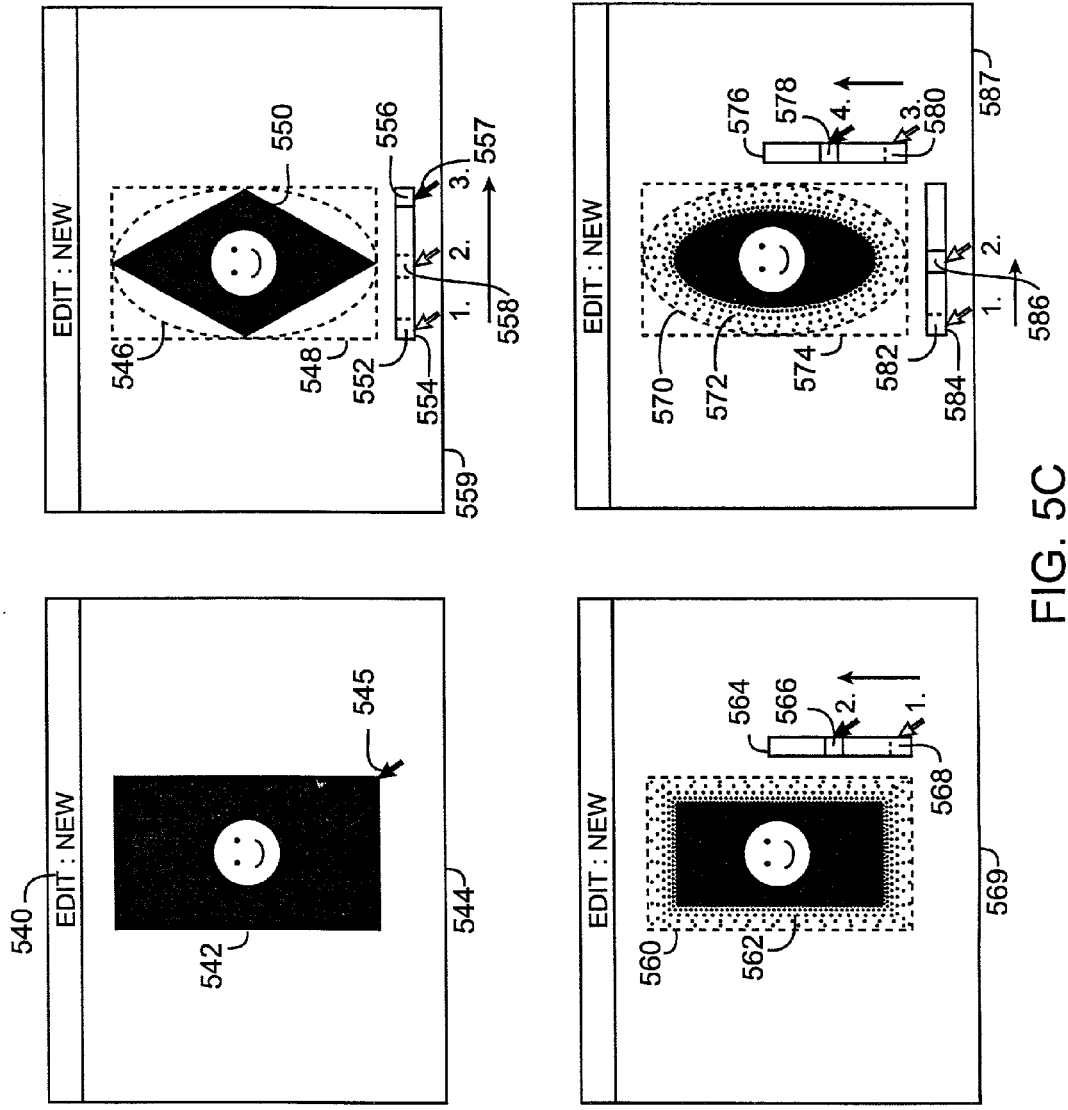

FIG. 5C shows a graphic object being reshaped, and its edges made soft, in the playback display, according to one embodiment of the present invention. In edit mode 540, graphic object output 542 is shown in playback display 544, being clicked on by pointer 545. The system may be configured so that this click of the pointer causes the shape slider 554 to appear as shown in playback display 559 to the right. As the shape slider control is moved to the right with the pointer 557, the edges of the graphic object output become increasingly rounded until they collapse into a diamond. Shape slider control left position 554 corresponds to the original rectangular shape of the graphic object output indicated by boundary 548. The mid position 558 corresponds to the oval shape indicated by boundary 546, and the right position 556 corresponds to the diamond shape 550.

The lower left playback display 569 in FIG. 5C shows that, according to one embodiment of the present invention, the system may alternatively be configured so that clicking on an object's graphic output causes the softness slider 564 to appear. Moving the softness slider control 566 up makes the edges of the graphic object output appear increasingly soft or "fuzzy;" i.e. in region 562 the graphic object output becomes increasingly transparent away from the center and toward the edges 560. The greater higher the slider position, the greater the softness; i.e. the larger the region of "fuzziness" 562. The bottom position 568 of slider control 564 corresponds to the original "hard outline" 560 of the graphic object; i.e. no softness. The mid position 566 means the object output blends to full opacity at a distance from the edges that is half the shortest distance from an edge to the object output's center. At the maximum slider control position the only points in the graphic object output which will are fully opaque are those whose distance from every edge is at least the shortest distance from an edge to the object output's center.

The lower right playback display 587 shows that the system may alternatively be configured according to one embodiment of the present invention so that clicking on an object's graphic output causes both shape slider 584 and softness slider 576 to appear. Both shape and softness effects may be combined according to the rules previously described separately for the shape and softness sliders. In the example shown, the shape slider control is moved to the mid position 586, and the softness slider control is moved to the mid position 578 resulting in a "soft oval" with a "fuzzy region" 572 which is transparent at the oval's boundary 570 and becomes fully opaque at a distance from the oval's boundary which is half the shortest distance from the boundary to the object output's center.

Figure 6A:
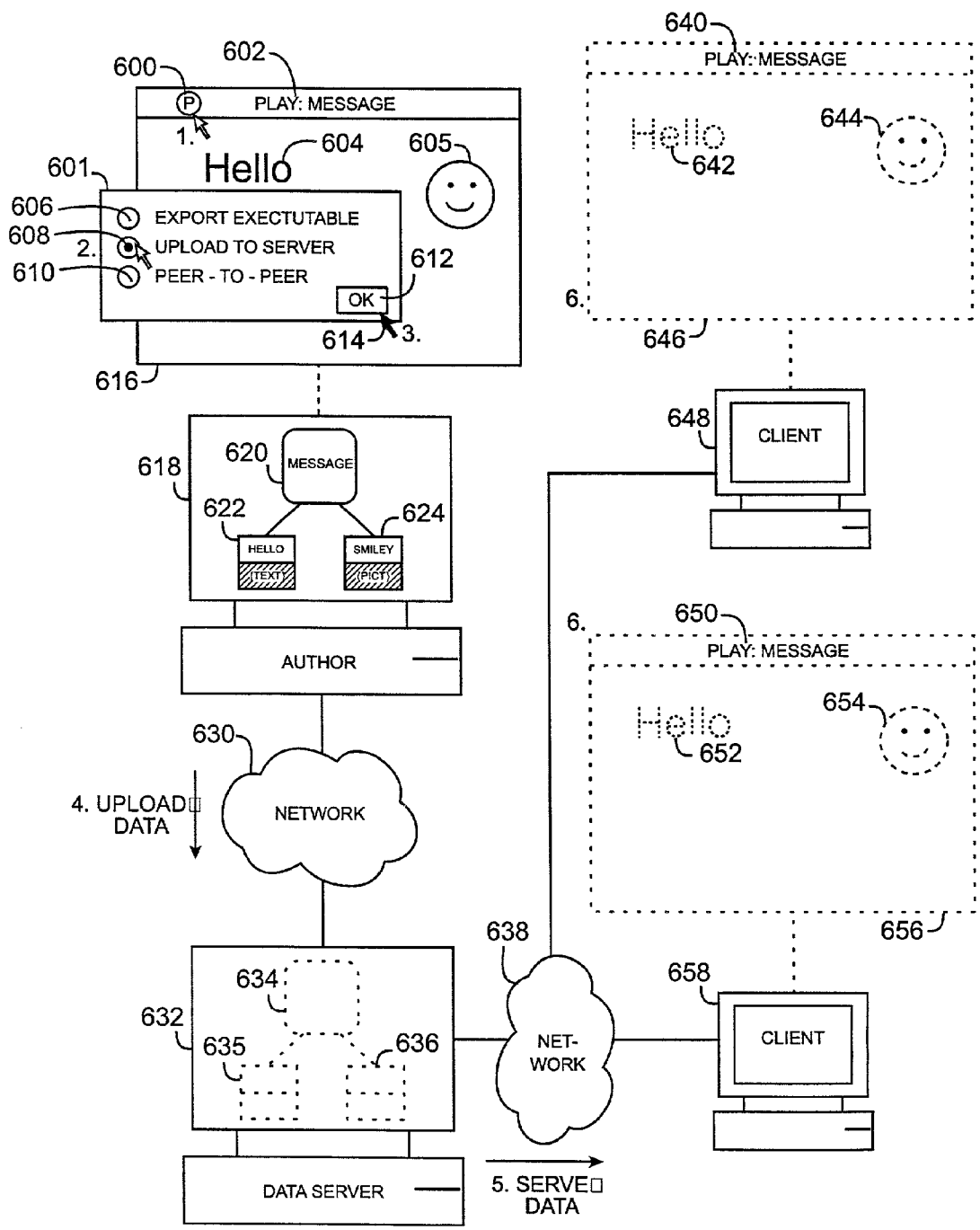
FIGS. 6A and 6B illustrate publishing and editing of presentation data over a network, according to embodiments of the present invention.

PUBLISHING AND EDITING OVER A NETWORK—FIG. 6A shows a presentation being exported according to one embodiment of the present invention from an author's machine over a network to a server where it can be viewed by users of client machines in another embodiment of the present invention. Alternatively, according to another embodiment of the present invention, the presentation may be published directly from the author's machine, or exported as an executable to be sent as an email enclosure. In this example, the author creates a presentation consisting of container object 620 containing text object 622 and picture object 624, whose outputs in playback display 616 are "Hello" 604 and a smiley face 605. The author clicks the publish command icon 600 which brings up publish dialog 601. The dialog 601 presents options including: option 606 to export the presentation as an executable program, option 610 to publish directly in a peer-to-peer fashion 610 from the author's machine 618, and option 608, shown selected, to upload to server 632. The author executes option 608 by clicking the OK button 612. The presentation data is uploaded to server 632 over network 630 so that a copy of the presentation is made on the server consisting of container object 634 containing text object 635 and picture object 636. The presentation may then be viewed on client machines 648 and 658 over network 638. Client playback displays 646 and 656 show client views of the presentation with "Hello" text object outputs 642 and 652 corresponding to the text object 635 and the smiley face outputs 644 and 654 corresponding to picture objected 636. The clients view the presentation in play mode as indicated in playback indicators 640 and 650. The client applications need not have access to edit mode.

Figure 6B:
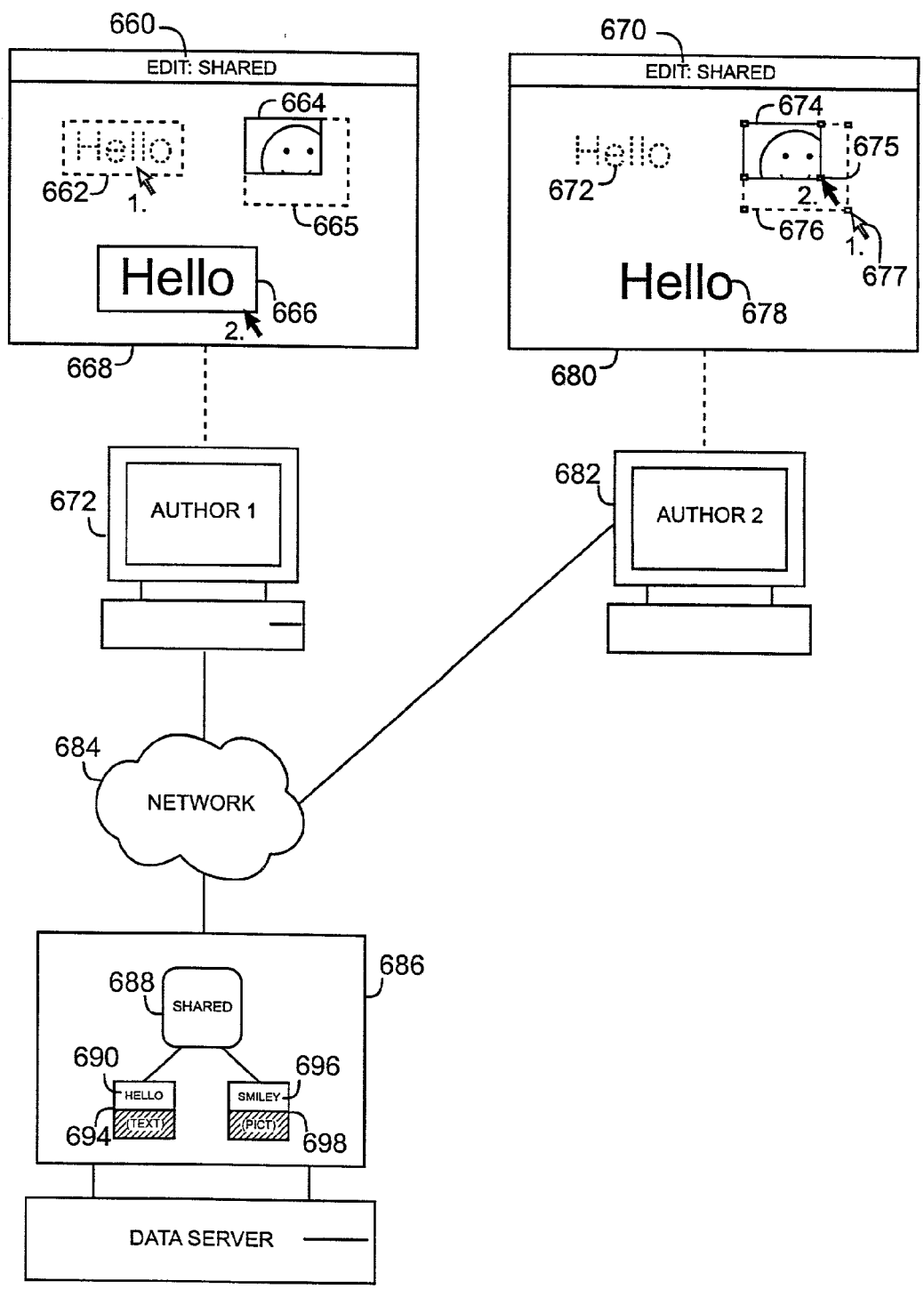

FIG. 6B shows two authors simultaneously editing shared presentation data on a data server, according to one embodiment of the present invention. In this example, the presentation data consists of a container object 688 containing text object 694 and picture object 698. Author 1 using machine 672 is dragging and re-sizing the text "Hello" from its small size and upper-left position 662 to a larger size and more centered position 666 in playback display 668. This editing operation is conveyed over network 684 to data server 686, updating the setup data 690 of text object 694. This change in setup data 690 is read on Author 2's machine 682, resulting in a change in playback display 680 of the "Hello" text from its old size and position 672 to the new size and position 678. Said change happens smoothly while Author 1 is editing, so as to appear to Author 2 as though it were being done locally. At the same time, Author 2 is changing the logical size of picture object 698 by dragging the lower right corner of the picture object output from its original position at 677 to 675 using the drag handle method described in FIG. 5B. This editing operation is conveyed over network 684 to data server 686, updating the setup data 696 of picture object 698. This change in setup data 696 is read on Author 1's machine 672, resulting in a change in playback display 668 of the smiley picture object output from its old logical size 665 to its new logical size 664. Said change happens smoothly while Author 2 is editing, so as to appear to Author 1 as though it were being done locally.

START AND STOP COMMANDS—FIG. 7A demonstrates a means for starting and stopping a container, with propagation of start and stop commands to contained objects, according to one embodiment of the present invention. FIG. 7A-1 shows a container 704 that contains a text object 705, a picture object 706, and another text object 708. Nothing is being displayed in playback display 709 shown in play mode 702, and container start toggle button 700 is turned off. In FIG. 7A-2 the user clicks on the container start toggle button 726 causing the container 712 to start with propagation of the start command to its contained objects 720, 722 and 724. That objects 712, 720, 722 and 724 are now playing is indicated by object play indicators 710. The playback display 734 now shows the object outputs 728, 730 and 732, corresponding to media objects 720, 722 and 724 respectively. In FIG. 746, the user clicks off the container start toggle button 736 causing the container 738 to stop, again propagating the stop command to its contained objects 740, 742 and 744.

FIG. 7B demonstrates a selective means for propagating start and stop commands sent to a container to its contained objects, through random selection of the contained objects, according to one embodiment of the present invention. Container 748 is shown in FIG. 7B-1 containing media objects 750 752 and 754. The container start toggle button 756 is shown turned off and nothing is displayed in playback display 758. In FIG. 7B-2 the user clicks on the container start toggle button 760 with random selection enabled and the container 764 starts, propagating the start command to a randomly chosen contained object, in this case picture object 772, whose object output 773 is shown in the playback display 780. The other contained objects 750 and 752 remain turned off.

FIG. 7C shows the stopping of individual objects in a container by means of a two-step process, according to one embodiment of the present invention. Container 782 is shown containing objects 784, 786 and 788, and the container and all of its contained objects are initially playing in playback display 798. The user clicks on object output 792, then clicks on the individual stop button 790, causing the object 784 to stop playing. The stopping is indicated by the dotted representation of object output 792 and by the open object play indicator 783.

Figure 8A:
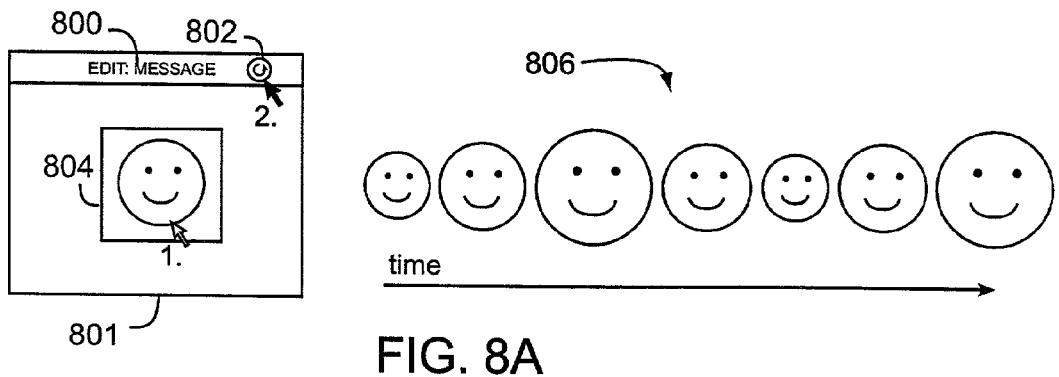
FIGS. 8A–8D illustrate programming of object playback behavior, according to embodiments of the present invention.

PROGRAMMING PLAYBACK BEHAVIOR—FIGS. 8A–8D show examples of the programming of object playback behavior, according to one embodiment of the present invention. FIG. 8A shows the programming of undulation. This example shows a picture object whose output 804 is shown in edit mode 800 in playback display 801. The user clicks object output 804, then clicks the undulate button 802, completing the programming of the behavior. When started in play mode, the object's behavior in time is depicted by the series of representations 806. This playback behavior consists of a pulsating effect, in which the size of the object output periodically increases and decreases from its original size.

Figure 8B:
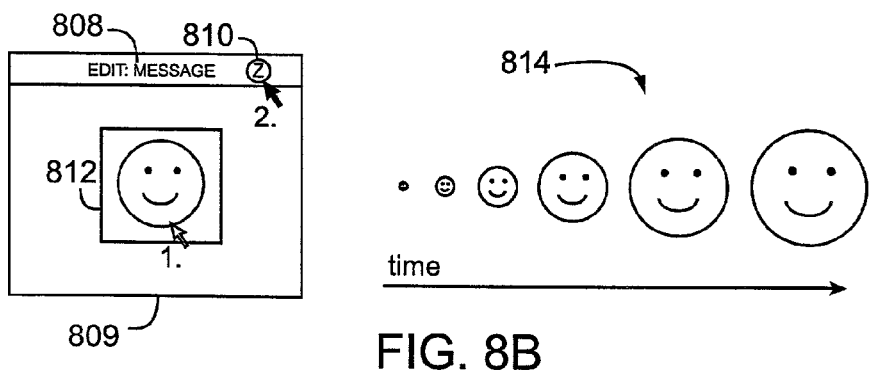

FIG. 8B shows the programming of an entrance, in this case a zoom-in transition, according to one embodiment of the present invention. The user clicks on object output 812 shown in playback display 809, and then clicks on the zoom-in button 810, completing the programming of the behavior. When started in play mode, the object's behavior in time is depicted by the series of representations 814. This playback behavior consists of a steady increase in size from a point to full-size.

Figure 8C:
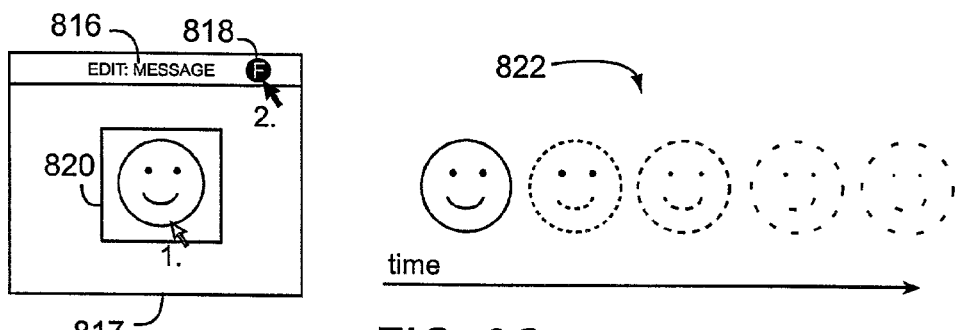

FIG. 8C shows the programming of an exit, in this case a fade-out transition, according to one embodiment of the present invention. The user clicks on object output 820 shown in playback display 817 and then clicks on the fade-out button 818, completing the programming of the behavior. When stopped in play mode, the object's behavior in time is depicted by the series of representations 822. This playback behavior consists of a steady increase in transparency from full opacity to complete invisibility.

Figure 8D:
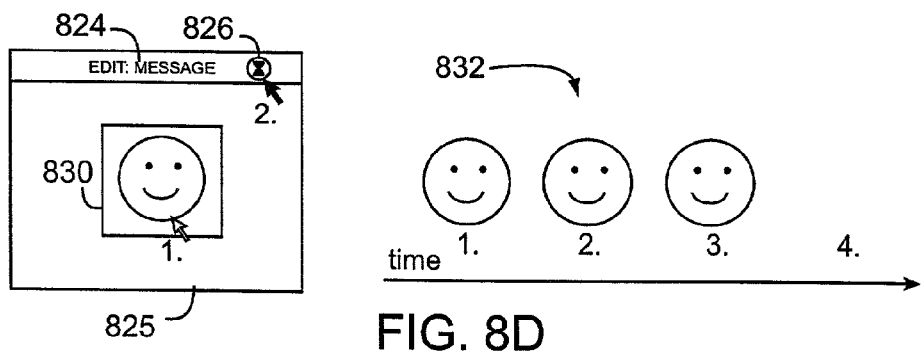

FIG. 8D shows the programming of an object timeout, according to one embodiment of the present invention. The user clicks on object output 830 shown in playback display 825 and then clicks on the timeout button 826, completing the programming of the behavior. When started in play mode, the object's behavior in time is depicted by the series of representations 832. After a period of time the object stops.

THE 'SENTENCE' PROGRAMMING PARADIGM—FIGS. 9A–9D demonstrate the programming of interactive object behavior using a three-step means following a sentence paradigm, according to one embodiment of the present invention. According to the sentence paradigm, an object is selected, then an action, then an object to be acted upon. It should be noted that in different embodiments of the invention the order could be different; for example, it could involve selection of an object, then the object to be acted upon and finally the action to be taken.

FIG. 9A shows the programming of an object which, when clicked in play mode in FIG. 9B, causes another object to start playing, according to one embodiment of the present invention. In edit mode 912, the user first clicks on object output 916 shown in playback display 921 and corresponding to text object 908 HELLO. The user then clicks on the "when clicked, starts" button 914, then clicks on object output 918 corresponding to picture object 911 SMILEY. As a result of these three actions, a relation 910 forms between the two objects 908 and 911.

FIG. 9B shows the playback of the previously programmed interactive behavior in play mode, according to one embodiment of the present invention. Object 928 HELLO is playing its output 934 in the in the playback display 938. When the user clicks object output 934, relation 930 causes the picture object 946 SMILEY to start, and its output 950 appears in the playback display 952 as output 934 of text object 928 continues to play.

FIG. 9C shows the programming of an object which, when clicked in play mode in FIG. 9D, causes itself to stop and another object to start playing, according to one embodiment of the present invention. In edit mode 962, the user first clicks on object output 966 shown in playback display 972 and corresponding to text object 954 HELLO. The user then clicks on the "when clicked, stops and starts" button 964, then clicks on object output 968 corresponding to picture object 960 SMILEY. As a result of these three actions, relation 958 forms between the two objects 954 and 960, and relation 956 forms between object 954 and itself.

FIG. 9D shows the playback of the previously programmed interactive behavior in play mode, according to one embodiment of the present invention. Object 980 HELLO is playing its output 986 in the in the playback display 988. When the user clicks object output 986, relation 982 causes the picture object 996 SMILEY to start, and its output 999 appears in the playback display 998. At the same time, relation 981 causes object 992 HELLO to stop.

FIGS. 10A–10D demonstrate two more examples of programming interactive object behavior following a sentence paradigm, according to one embodiment of the present invention. According to the sentence paradigm, an object is selected, then an action (or actions in the case of FIGS. 10C and D), then an object to be acted upon. Once again, other embodiments of the present invention may re-order the selection of objects and the action.

FIG. 10A shows the programming of an object which, when played in play mode in FIG. 10B, times out and causes another object to start playing, according to one embodiment of the present invention. In edit mode 1010, the user first clicks on object output 1014 shown in playback display 1018 and corresponding to text object 1004 HELLO. The user then clicks on the "times out and starts" button 1012, then clicks on object output 1016 corresponding to picture object 1008 SMILEY. As a result of these three actions, a relation 1007 forms between the two objects 1004 and 1008, and relation 1006 forms between object 1004 and itself.

FIG. 10B shows the playback of the previously programmed interactive behavior in play mode, according to one embodiment of the present invention. Text object 1026 HELLO is playing its output 1036 in the in the playback display 1038. When text object 1026 times out, relation 1032 causes the picture object 1046 SMILEY to start, and its output 1048 appears in the playback display 1050. At the same time relation 1030 causes the text object 1042 to stop.

FIG. 10C shows the programming of an object which, when clicked in play mode in FIG. 10D, causes itself to stop and another object to start playing, this time using a compound sentence paradigm, in which two actions are selected in sequence, according to one embodiment of the present invention. Again, the order of objects and actions could be different for different embodiments of the present invention.

In edit mode 1058, the user first clicks on object output 1060 shown in playback display 1068 and corresponding to text object 1054 HELLO. The user then clicks on the "when clicked, stops" button 1062, followed by the "starts" button 1064, then clicks on object output 1066 corresponding to picture object 1057 SMILEY. As a result of these four actions, relation 1056 forms between the two objects 1054 and 1057, and relation 1055 forms between object 1054 and itself.

FIG. 10D shows the playback of the previously programmed interactive behavior in play mode, according to one embodiment of the present invention. Object 1076 HELLO is playing its output 1083 in playback display 1085. When the user clicks object output 1083, relation 1078 causes the picture object 1094 SMILEY to start, and its output 1098 appears in the playback display 1096. At the same time, relation 1077 causes the text object 1090 HELLO to stop.

VECTOR OBJECTS—FIGS. 11A–B show the use of a special vector object for generating a data source, which in turn feeds data sinks in media objects via relations, changing the media object behavior over time, according to one embodiment of the present invention. FIG. 11A shows a picture object 1110 whose output 1116 is shown in playback display 1120. Text object 1114 is also shown, with output 1118 in playback display 1120. Also shown is vector object 1112, which has relations 1115 and 1117 with the aforementioned media objects 1110 and 1114. The vector object output is mapped to the position input data sink of picture object 1110, and to the vertical dimension input data sink of text object 1114. To the left is a graph that shows the data source output 1100 of the vector object over time 1104, which appears in this case as a linear function 1101. However, much more complex functions are possible. Time 1103 called "now" corresponds to the moment in time represented in playback display 1120.

As time passes for a duration specified in the vector object, the value of the data output being sent from the vector object increases and feeds the inputs of the two media objects, changing their outputs continuously. At the time called "now" in FIG. 11B, the media object outputs have changed in playback display 1142. Picture object output 1136 is now at a higher position than its original 1116 position and text object output 1119 is stretched in the vertical dimension.

POINTER OBJECTS—FIGS. 12A–D show characteristics and uses of different kinds of pointer objects, each of which references a base object for some of its data, according to one embodiment of the present invention.

Figure 12A:
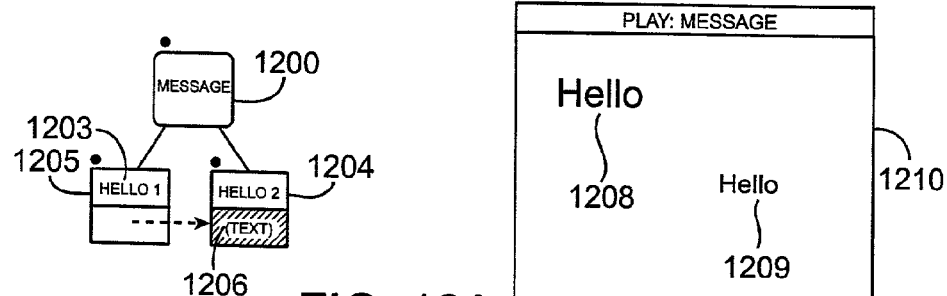
FIGS. 12A–D illustrate characteristics and uses of different kinds of pointer objects, each of which references a base object for some of its data, according to embodiments of the present invention.

In FIG. 12A, pointer object 1205 references base object 1204 for its text content 1206, but has different setup content in 1203. Both objects are playing in playback display 1210, but the display characteristics (position and size) differ between the display outputs 1208 and 1209 of the text "Hello", corresponding to objects 1205 and 1205 respectively, due to the difference in setup data.

Figure 12B:
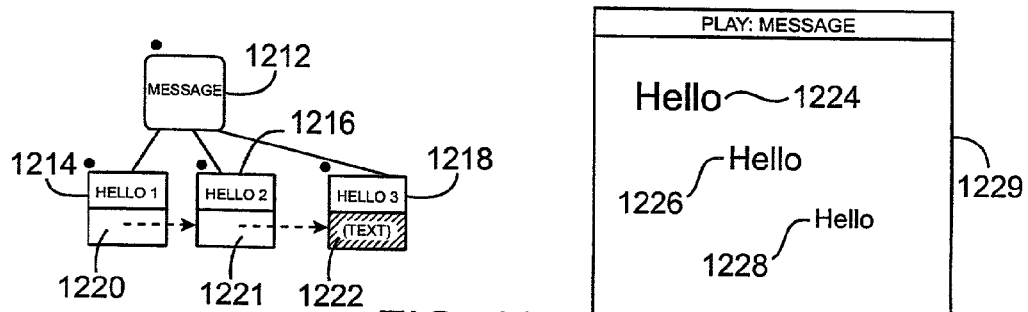

In FIG. 12B pointer object 1214 references pointer object 1216 for its content data 1221, which in turn references object 1218's content data 1222. Again the setup data for the three objects differs, so that three versions of the text "Hello" 1224, 1226 and 1228 are seen in the playback display 1229, corresponding to the three pointer objects 1214, 1216 and 1218 respectively.

Figure 12C:
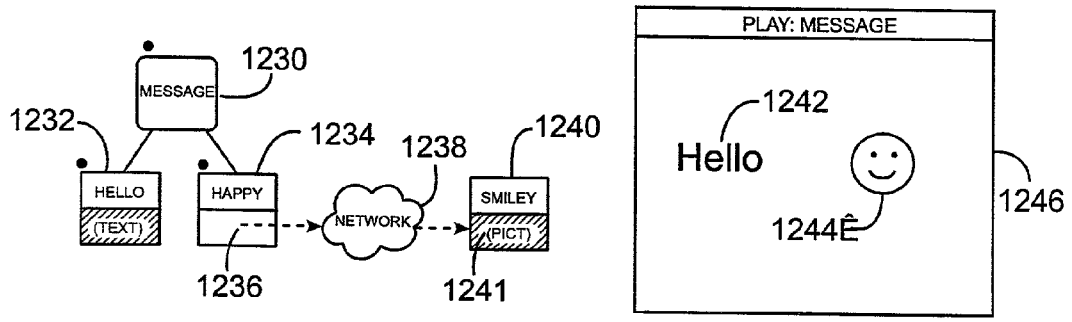

FIG. 12C shows a pointer object 1234 referencing another object 1240 for its content data 1241 over a network 1238, according to one embodiment of the present invention. The output 1244 of pointer object 1234 is shown in playback display 1246 next to the output 1242 of text object 1232. Both outputs appear as they would if all of the content data were stored locally.

Figure 12D:
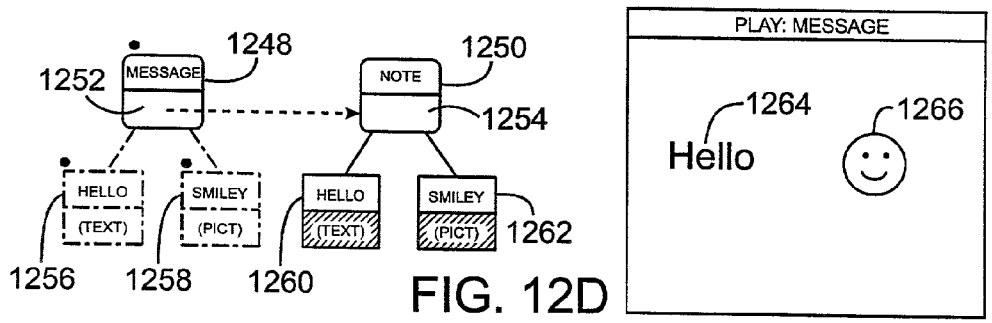

FIG. 12D shows a pointer container object 1248 referencing container object 1250 for its content 1254 which includes its contained items 1260 and 1262, and may also contain behavior-specifying data, display options, etc. Pointer container object 1248 contains two virtual objects 1256 and 1258 called "mirages" of the objects 1260 and 1262 "contained" by container object 1250. These mirages 1256 and 1258 exist only virtually because, like other pointer objects, pointer container objects obtain their contents by referring to the contents of another object. The mirages are in effect a construct to depict how the pointer container objects are treated by the system both as pointers and as containers.

THE CONTROL DISPLAY—FIG. 13A shows independent control of object playback in an optional control display, according to one embodiment of the present invention. In FIG. 13A-1 control display 1314 is displaying the contents of container object 1300 MESSAGE, as the status indicator 1312 indicates. Text object 1302 HELLO has been started by clicking on the name 1306 of its icon 1308 in the control display 1314. An object status indicator or "halo" 1310 is seen around the icon 1308, indicating that the object is playing. Object 1302's display output 1318 is shown in playback display 1316.

In FIG. 13A-2, the user clicks on the name 1326 of the icon 1328 in the control display 1327 for the picture object 1322 SMILEY, starting the object, causing the output 1332 to be displayed in the playback display 1334. In FIG. 13A-3, the user clicks again on the name 1340 of text object 1336 in the control display 1348, stopping the object, so that its output is no longer shown in the playback display 1350.

FIG. 13B shows the starting of objects in a container 1352 using a container control object 1356, according to one embodiment of the present invention. In the control display 1365, the user clicks on the icon 1360 for the container control object 1356 causing the container 1352 to start playing. The start command is propagated to the media objects in the container, i.e. text object 1354 and picture object 1358. The play status of their respective icons 1362 and 1364 is indicated by halos 1361, and the respective outputs 1366 and 1368 of the two objects are shown playing in the playback display 1369.

FIG. 14A shows the setting of object entrance and exit behavior parameters using icon panels in a control display, according to one embodiment of the present invention. In a preferred embodiment, these icon panels may be opened independently by alt-clicking on an icon in the control display. In this example, icon panel 1406 has been opened for object 1402 and the user has set the fade-out time to 2 seconds by clicking text entry box 1407 and entering numerical text. Similarly, the user has entered a fade-in time of 1.5 seconds in text entry box 1409 for icon panel 1408 for picture object 1409.

FIG. 14B shows the establishment of a relation by dragging a "string" between object icon panels in a control display, according to one embodiment of the present invention. In FIG. 14B-1, the user clicks on the CLICKED output 1426 in icon panel 1422 in control display 1437 for text the object 1416 HELLO. A string 1430 appears connecting the pointer to the CLICKED output 1426. The user then drags the string to the START input 1434 of icon panel 1432 for the picture object 1418 SMILEY and releases the mouse or other pointer control object. FIG. 14B-2 shows that a relation 1444 is established by the connected string 1442, so that in play mode, when the output of text object 1438 named "HELLO" is clicked, picture object 1440 SMILEY will start. See FIG. 9A for an alternate way to implement this functionality using a sentence paradigm.

HIERARCHICAL NESTING OF CONTAINER OBJECTS—FIGS. 15A–B show an example of starting hierarchically structured container objects in a control display, constituting a hierarchical object space, according to one embodiment of the present invention. Control display 1516 is displaying the contents of container object 1500 MY SITE which contains text object 1502 WELCOME and another container object 1504 HOBBIES. Icon 1510 for object 1502 WELCOME is shown playing in the control display, and its output 1518 is displayed in the playback display 1520. Icon 1514 for container object 1504 HOBBIES is also shown in control display 1516, but it is not playing. In FIG. 15A the user clicks on the icon name 1512 in order to start container object 1504.

FIG. 15B shows the same situation after the user has clicked on the name 1512. The container object 1522 HOBBIES has started, propagating the start command to its contained objects 1524 and 1526, which also start playing. The container object icon 1530 is now indicated as playing in the control display 1540 by halo 1531, and the outputs 1534 and 1536 of the contained objects 1524 BOAT and 1526 GUITAR are now seen in playback display 1542 playing along with text object output 1532.

FIGS. 15C–D show an example of exploration of hierarchically structured presentation data in a control display, according to one embodiment of the present invention. In both figures, container object 1550 MY SITE is shown containing text object 1552 WELCOME and container object 1554 HOBBIES, which in turn contains picture objects BOAT 1556 and GUITAR 1558. The text and picture object outputs 1566, 1567 and 1568 are all shown in playback display(s) 1555.

In FIG. 15C, control display 1553 shows the contents of object container 1550 MY SITE as indicated by the status indicator 1559. The dotted box 1557 indicates what the control display 1553 is displaying, or its "focus" in the hierarchy. The user double-clicks on container object icon 1562 in control display 1553 to explore the data contained in it. This action causes a transition in the control display, the result of which is shown in FIG. 15D. Now control display 1594 shows the contents of container object 1554 HOBBIES as indicated by the status indicator 1581 and the focus box 1571. Object icons 1582 and 1584 are seen playing in control display 1594, corresponding to picture objects 1556 BOAT and 1558 GUITAR. The "up" button 1580 appears, giving the user a convenient way to return the control display back up to the previous level in the hierarchy; i.e. to displaying the contents of container object 1550 MY SITE. In this manner the user can traverse an entire object hierarchy and view the contents of any containers nested in it.

EXTENDING THE HIERARCHY USING FOLDER POINTERS—FIGS. 16A–B show exploration of presentation data stored outside the object space in files in a hierarchical file system (HFS), using a special container pointer object, the folder pointer object, which is used to create a hierarchical file extension (HFX) to the hierarchical object space of presentation data, according to one embodiment of the present invention.

FIG. 16A shows a container object 1600 HOME which in turn contains container object 1602 MY SITE and folder pointer object 1604 DESKTOP. Icons for these two objects 1616 and 1618 are shown in the control display 1622. Folder pointer object 1604 DESKTOP references for its content 1605 a hierarchical file tree (HFT—part of an HFS) with HFS folder 1606 DESKTOP as its root. Folder pointer 1604 contains virtual object 1610 MONA which is a mirage of file 1612 MONA.JPG contained in HFS folder 1606. This structure allows the user to explore the contents of the HFT as though they were part of the hierarchical object space, as follows.

In the control display 1622, the user double-clicks on folder pointer object icon 1618 corresponding to folder pointer object 1604 DESKTOP. A transition in the control display occurs, similar to that discussed earlier for conventional container objects.

FIG. 16B shows the control display 1649 after this transition. An up button 1640 appears, just as in the previous exploration example for returning to the HOME level of the hierarchy. Object icon 1643 in the control display 1649 corresponds to the virtual object 1637 MONA. The user can click on object icon name 1644, starting virtual object 1637. Since 1637 is a mirage of file 1612 MONA.JPG, its output is obtained via folder pointer 1604 pointing to HFS folder 1606 DESKTOP for the folder's contents. Thus the display the output 1647 in playback display 1648 comes from 1612 MONA.JPG. Halo 1642 then appears around object icon 1643 indicating that the virtual object 1637 is playing.

Thus, taken together, the folder container object pointer 1606 and its virtual object contents 1637, i.e. the part of the object hierarchy inside focus box 1638, form a hierarchical file extension (HFX) to the object space. This allows exploration of files in the HFS in a manner similar to exploration of objects in nested containers. This also allows files in an HFS, such as file 1612 MONA.JPG to be effectively treated as playable objects in the object space. Moreover, these playable objects can be started and stopped in conjunction with other media objects such as text object 1608 HELLO, whose output 1626 is seen in the playback display 1648 next to the output 1647 of the HFX mirage object 1637.

FIG. 16C shows how objects may be imported from HFX containers to non-HFX containers in the hierarchical object space via a three-step copy operation, according to one embodiment of the present invention. The figure shows container 1652 MY SITE and folder pointer 1654 DESKTOP both contained in container object 1650 HOME. Container 1652 MY SITE further contains text object 1660 HELLO, and folder pointer 1654 DESKTOP contains virtual object 1664 MONA as a mirage of file 1666 MONA.JPG contained in HFS folder 1656 DESKTOP. In this example, virtual object 1664 MONA is to be imported into non-HFX container 1652 MY SITE as picture pointer object 1662 MONA.

The user clicks on the object icon 1669 corresponding to virtual object 1664 MONA shown in control display 1674. Next the user clicks on the "ghost" control icon 1670 in the playback display 1675, and finally the user clicks on a desired location in the playback display 1675. As a result, a new picture pointer object 1662 MONA is created in container 1652 MY SITE. The content of the new picture pointer object 1662 now refers directly to the content in file 1666 MONA.JPG, and the output 1673 based on this content is shown at the user-chosen location 1672 in the playback display 1675.

FIG. 17A shows how objects may be exported from non-HFX containers to HFX containers using a two-step copy operation, thereby creating a new file in the HFS, according to one embodiment of the present invention. In this example, container object 1700 HOME contains container object 1702 MY SITE which in turn contains media objects 1710 HELLO and 1712 ME. Also contained in 1700 HOME is folder pointer 1704 referencing folder 1708 DESKTOP in an HFS. Playback display 1732 is currently displaying the output of 1702 MY SITE; i.e. the display is showing the text output 1724 and picture output 1728 of objects 1710 and 1712 respectively. The control display shows the contents of folder pointer 1704 DESKTOP, which is initially empty. Container 1702 MY SITE and its contents are to be saved as a file 1719 in HFS folder 1708 DESKTOP, while folder pointer 1704 will contain virtual objects which are mirages of the contents of file 1719.

The user first clicks on the export command icon 1726 in the playback display 1732. Next the user clicks on any location in the control display 1730. This executes the export operation. File 1719 MY SITE.WORLD is created in the HFS folder 1708 DESKTOP. This file 1719 contains saved container object 1717 which contains saved media objects 1715 and 1716, created from objects 1710 HELLO and 1712 ME respectively. Folder pointer 1704 now contains virtual container object 1711 which is a mirage of container object MY SITE 1717 in file MY SITE.WORLD 1719. Virtual object 1711 contains virtual media objects 1713 and 1714 which are mirages of saved media objects 1715 HELLO and 1716 ME respectively. In the control display 1730, object icon 1720 appears, corresponding to virtual object 1711 MY SITE.

FIGS. 17B and 17C show an example of using a control display to explore an HFX representation of object presentation data saved in an HFS file, according to one embodiment of the present invention. In FIG. 17B folder pointer 1738 contains virtual container object 1746 which is a mirage of container object 1752 in file 1750 MY SITE.WORLD in HFS folder 1740 DESKTOP. Virtual object 1746 and its contained virtual objects 1747 HELLO and 1748 ME are currently playing, and their output 1764 and 1766 in the playback display 1768 comes from stored objects 1753 and 1754 respectively in file 1750 MY SITE.WORLD. As indicated by the status indicator 1756, and the focus box 1741, the control display 1767 shows a view representing the contents of folder pointer 1738 DESKTOP. I.e. the display shows the object icon 1761 for virtual container object 1746 MY SITE, which has been started by clicking on the object icon name 1760.

To explore presentation data contained in 1746 MY SITE, the user double-clicks on container object icon 1761, causing a transition to happen in the control display. FIG. 17C shows the control display 1776 after this transition. As indicated by the status indicator 1774 and the focus box 1769, the control display now represents the contents of virtual object 1746 MY SITE, corresponding to the media contents 1753 and 1754 of file MY SITE.WORLD.

Thus to the user, the processes of exploring the object hierarchy as seen in FIGS. 15C–D, and exploring HFS folder contents as seen in FIGS. 16A–B, and exploring the contents of saved files stored in an HFS as seen in FIGS. 17C–D are all presented as one seamless experience, made possible by the HFX. And the HFX in turn is created through the use of folder pointers.

NAVIGATION—Turning to FIG. 18A, we see an example of user navigation initiated by starting a container object, causing the current playback output for a playback display to be preempted and replaced by the playback output of the newly started container, according to an embodiment of the invention. In this example, both a control display and a playback display are shown, and the navigation is implemented such that the control display acts as a "self-navigating map" showing a data view of content being displayed in the playback display, but an embodiment of the present invention need not have a control display to implement user navigation.

The control display 1815 in FIG. 18A shows the contents of container object 1800 MY SITE, with object icons 1810 and 1811 corresponding to text objects 1802 WRITING and 1803 ART, respectively. 1800 my site also contains container object 1806 ART STUFF, whose object icon 1814 is also shown in the control display 1815. The check box NAVIGABLE 1813 in object panel 1812 indicates that object 1806 ART STUFF is navigable. This means meaning that when started, 1806 ART STUFF will preempt the output in the playback display 1819 with its own output. Navigation lines 1805 indicate the navigability of object 1806 in the data representation to the left. Furthermore, a relation 1804 has been created between text object 1803 ART and container object 1806 ART STUFF which will cause 1806 ART STUFF to start when the output 1818 of text object 1803 ART in playback display 1819 is clicked on in play mode 1816 by the user. The relation 1804 is represented in the control display 1815 by string 1820.

The user clicks on text object output 1818 in the playback display 1819 causing the container object 1806 to start via relation 1804, which initiates a navigation event, and a transition occurs in both the playback display and the control display.

FIG. 18B shows the situation after this transition. Objects 1822 MY SITE and 1826 WRITING and 1827 ART, which were playing previously in FIG. 18A, are now stopped and their play state has been saved, as indicated by parentheses 1823. The playback display 1840 now displays output from the container 1828 ART STUFF; in particular, output 1838 and output 1839 correspond to objects 1829 VOILA and 1830 SMILEY, respectively. The control display 1835 shows the contents of the container 1828 ART STUFF; object icons 1833 and 1834 represent objects 1829 VOILA and 1830 SMILEY respectively. The up arrow button 1831 permits the user to explore back up the hierarchy to container object 1822 MY SITE, without changing the contents of the playback display 1840.

The back arrow button 1836 in the playback display 1840 permits navigation back to the previous container 1822 MY SITE, as shown by the navigation return lines 1824 to the left. This is navigation is distinguished from the exploration capability provided by the up arrow 1831 in the control display 1835, in that such navigation will involve restoring the output in the playback display to the state saved for container object 1822 and its contained objects 1826 and 1827.

FIGS. 18C–D show an example of user navigation of presentation data distributed over a computer network according to an embodiment of the present invention. Both a control display and a playback display are shown in this example; however, an embodiment of the present invention need not have a control display to implement this navigation capability. In this example, the user navigates from container object 1844 MY SITE to remote container object 1854 MOM'S SITE.

To the left in FIG. 18C, object 1844 MY SITE is shown containing text objects 1845 SIS and 1846 MOM. Pointer container object 1848 TO MOM references container object 1854 MOM'S SITE across network 1853 for its contents 1856 WELCOME and 1857 PIE. Pointer container object 1848 thus contains two virtual objects 1851 and 1852 which are mirages of objects 1856 and 1857 in 1854 MOM'S SITE. Control display 1863 shows object icons 1859 and 1860 representing objects 1845 MOM and 1846 SIS respectively, as well as object icon 1861 for pointer container object 1848 TO MOM. The object panel 1862 indicates that pointer container object 1848 TO MOM is navigable, and string 1869 indicates a relation 1849 between text object 1846 MOM and pointer container object 1848 TO MOM, such that when the output of 1866 in playback display 1867 of text object 1846 is clicked, pointer container object 1848 TO MOM is started and a navigation event occurs.

The user clicks on text object output 1866 in the playback display 1867 causing the pointer container object 1848 to start via relation 1849, which initiates a navigation event, and a transition occurs in both the playback display and the control display.

FIG. 18D shows the situation after that transition has occurred. This situation is similar to that in FIG. 18B, except that the presentation data being navigated to is obtained over network 1853. The output in the playback display 1890 has been preempted and the play state of container object 1870 MY SITE and its contents 1871 and 1872 has been saved as indicated by parentheses 1878. Pointer container object 1874 TO MOM and its virtual object contents 1876 and 1877 are now playing, as shown by the status indicator 1885. The control display shows the contents of pointer container object 1874 TO MOM, and object icons 1881 and 1882 correspond to virtual objects 1876 and 1877 respectively. The output 1886 and 1887 of these virtual objects in the playback display is of course obtained remotely from 1856 WELCOME and 1857 PIE. Once again, exploration back up the hierarchy is available via up arrow button 1879 in the control display 1883 and return navigation is available via back button 1884 in the playback display 18D.

NESTED SUB-DISPLAYS—FIGS. 19A–B show the operation of nested sub-displays corresponding to nested container objects, according to one embodiment of the present invention. FIG. 9A shows the nested contents of container object 1900 MY SITE displayed in playback display 1924. Outlines 1904 in the object representation to the left indicate that containers 1906 and 1910 have nested sub-displays enabled. Text object 1902 HELLO contained in 1900 MY SITE has its output 1914 displayed in the playback display 1925 outside the nested sub-displays 1916 and 1920. Sub-display 1916 corresponds to container object 1904 MY STUFF and thus contains the output from objects contained by 1904; i.e. it contains the output 1915 from object 1908 MONA and the output from object container 1910 MORE STUFF, which is itself nested in sub-display 1920. Similarly, sub-display 1920 contains the output of the object 1912 ME, since this object contained by container object 1910 MORE STUFF. The size and positioning of each nested sub-display are determined relative to the sub-display that contains it.

FIG. 19B shows the operation of a user option for a container object specifying whether its sub-display functionality is enabled or disabled, according to one embodiment of the present invention. FIG. 19B-1 also demonstrates the operation of an interactive object playback behavior in a nested sub-display in an embodiment of the present invention.

In FIG. 19B-1 container object 1926 MY SITE contains text object 1928 HELLO and container object 1930 MY STUFF, which has nested sub-display functionality enabled. Container object 1930 in turn contains picture object 1932 MONA and text object 1934 LISA, which have a relation 1933 specified between them, such that clicking on the output of 1932 MONA will start object 1934 LISA.

In the control display 1942 the object panel 1938 for container object 1930 MY STUFF is shown open, and the user has clicked checkbox 1940 SUB-DISPLAY, enabling the nested sub-display functionality. In playback display 1951 the output 1944 of text object 1928 HELLO is seen, and below it is seen the nested sub-display 1946 corresponding to container object 1930 MY STUFF. Inside this nested sub-display, the output 1950 of object 1932 MONA is seen. When the user clicks on the output 1950, relation 1933 will cause object 1934 LISA to start, so that its output 1948 will also be seen in the nested sub-display of its container object 1930 MY STUFF.

Next, in FIG. 19B-2 the user disables the sub-display functionality for container object MY STUFF, by clicking off the checkbox 1958 in its object icon panel 1956 in control display 1942. Now container object 1952 has sub-display disabled, so that the output now appears in playback display 1964 without the nested sub-display, along with the output 1944 still showing from object 1928 HELLO.

Figure 19C:
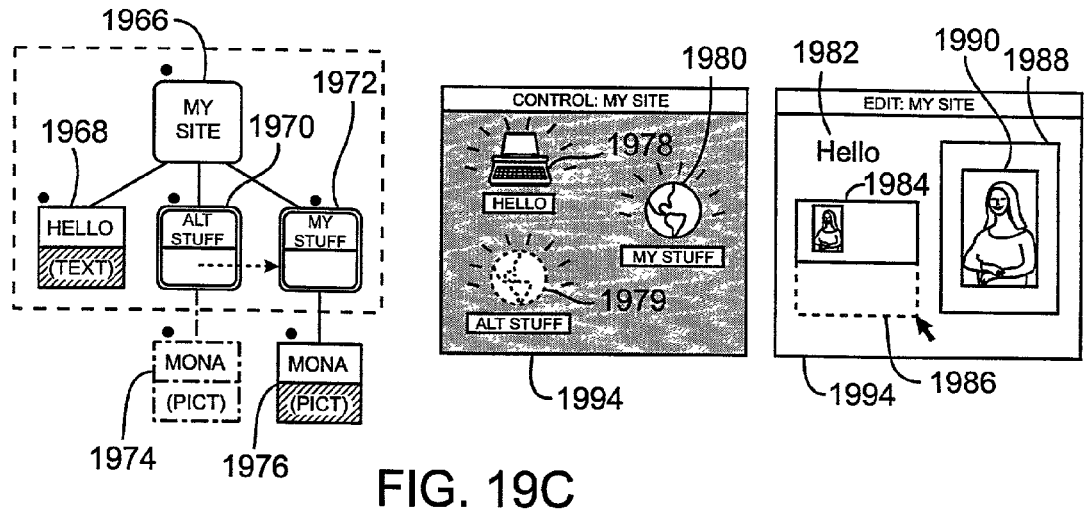

FIG. 19C shows an example of a sub-display container object which is a pointer object, having its own user option specified independently from its base object, according to one embodiment of the present invention. In this example the container object 1966 MY SITE contains another container object 1972 MY STUFF, along with a pointer container object 1970 ALT STUFF that references 1972 MY STUFF for its contained object 1976 MONA. But pointer container object 1970 has its own user-specified display options, so its sub-display output 1984 is shown differently in playback display 1994 from the sub-display output 1988 of object 1972. Control display 1994 also differentiates the object icon 1979 for pointer container object 1970 from the object icon 1980 for container object MY STUFF by displaying object icon 1979 for the pointer container object as faint or semi-transparent. Object output 1982 for text object 1968 is shown in the playback display to reinforce the nested nature of the sub-displays 1984 and 1988.

The user can change the display characteristics of the two sub-displays independently. For instance the user can click on the edge of sub-display output 1984 and drag it to change its logical shape and size to the shape and size depicted by outline 1986, and the sub-display 1988 is not affected.

Figure 20A:
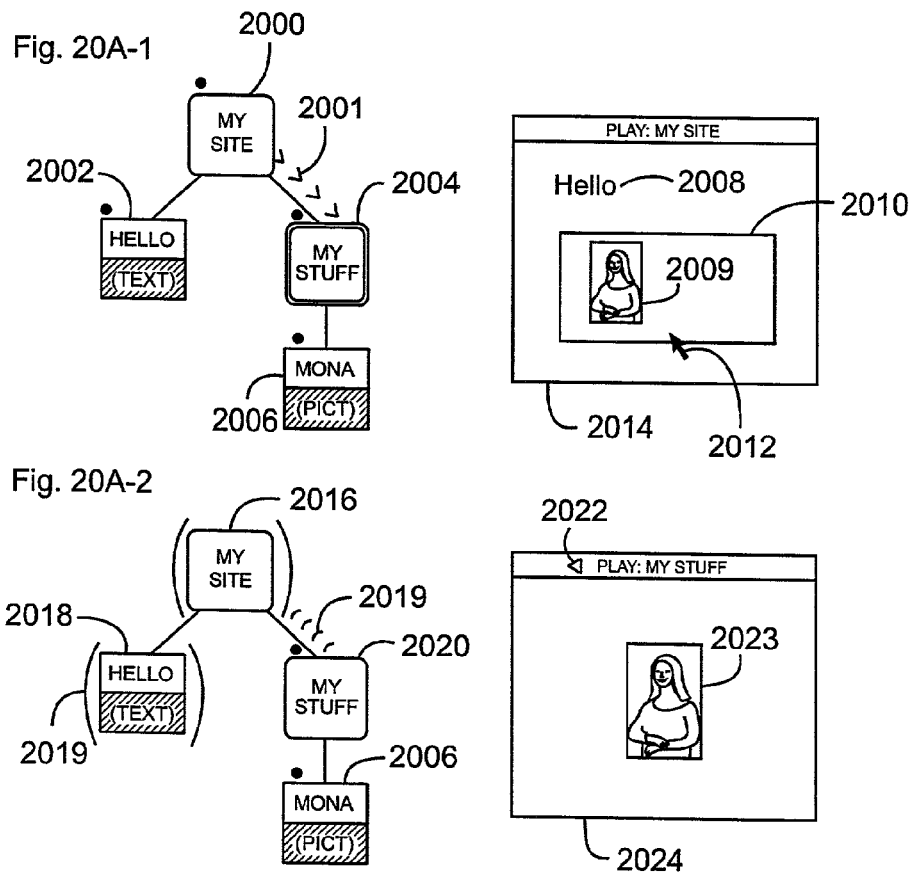

FIG. 20A shows an example of navigation via a navigable nested sub-display container object, according to one embodiment of the present invention. In FIG. 20A-1, object 2004 MY STUFF is contained in container 2000 MY SITE, and has its sub-display option enabled, so that output 2009 from its contained object 2006 MONA is displayed in object 2004's sub-display output 2010 in playback display 2014. Also displayed in playback display 2014 is the output 2008 of text object 2002 HELLO contained in 2000 MY SITE. Object 2004 MY STUFF has also been configured to be navigable (see FIG. 18A for how this may be done in one embodiment of the present invention), as indicated by navigation lines 2001. When the user double-clicks on the sub-display output 2010 in the playback display 2014 with pointer 2012, a navigation event occurs, the results of which are shown in FIG. 20A-2.

After the navigation event, the play states of 2016 MY SITE and its contained object 2019 HELLO have been saved and their output pre-empted. Object 2020 MY STUFF now has now taken over the playback display 2024 with the sub-display feature disabled due to the navigation event. Output for contained object 2006 MONA is now displayed at full size. Back arrow button 2022 allows the user to navigate back to the previous container 2016 MY SITE as indicated by navigation return lines 2019.

FIGS. 20B and 20C show an example of navigation using nested sub-displays of presentation data distributed over a network, according to one embodiment of the present invention. In this embodiment, the control display follows the playback display like a self-navigating map of the presentation data, but another embodiment of the invention need not include a control display to implement navigation of presentation data over a network using nested sub-displays.

In FIG. 20A, container object 2026 MY SITE contains media objects 2028 HELLO and 2030 ME, along with pointer container object 2036 TO MOM, which references container 2044 MOM'S SITE over network 2042. Control display 2060 shows object icons object icons 2059 and 2052 for media objects 2028 HELLO and 2030 ME, whose respective outputs 2064 and 2065 are playing in playback display 2068. Control display 2060 also shows the object icon panel 2054 for pointer object 2036 indicating that the pointer object is navigable 2057 and that its sub-display feature is enabled 2058. Accordingly, the outputs of virtual objects 2038 and 2040 contained by 2036 are displayed in the playback display 2068 in object 2036's sub-display 2066. When the user double-clicks on sub-display 2066 in playback display 2068, a navigation event occurs, the results of which are shown in FIG. 20C.

In FIG. 20C, the output of 2070 MY SITE and its contained media objects has been preempted and their play state saved, and the playback display 2094 has been taken over by the output of pointer container object 2075 TO MOM, which now has its sub-display option disabled, and 2075's contained virtual objects. The control display shows object icons 2082 and 2084 corresponding to virtual objects 2038 and 2040 respectively. These virtual objects are still mirages of media objects 2046 WELCOME and 2048 PIE from which the data is obtained to show outputs 2090 and 2092 in the playback display, now in full size. Back arrow button 2088 allows the user to navigate back to the previous container 2070 MY SITE as indicated by navigation return lines 2076.

Figure 21A:
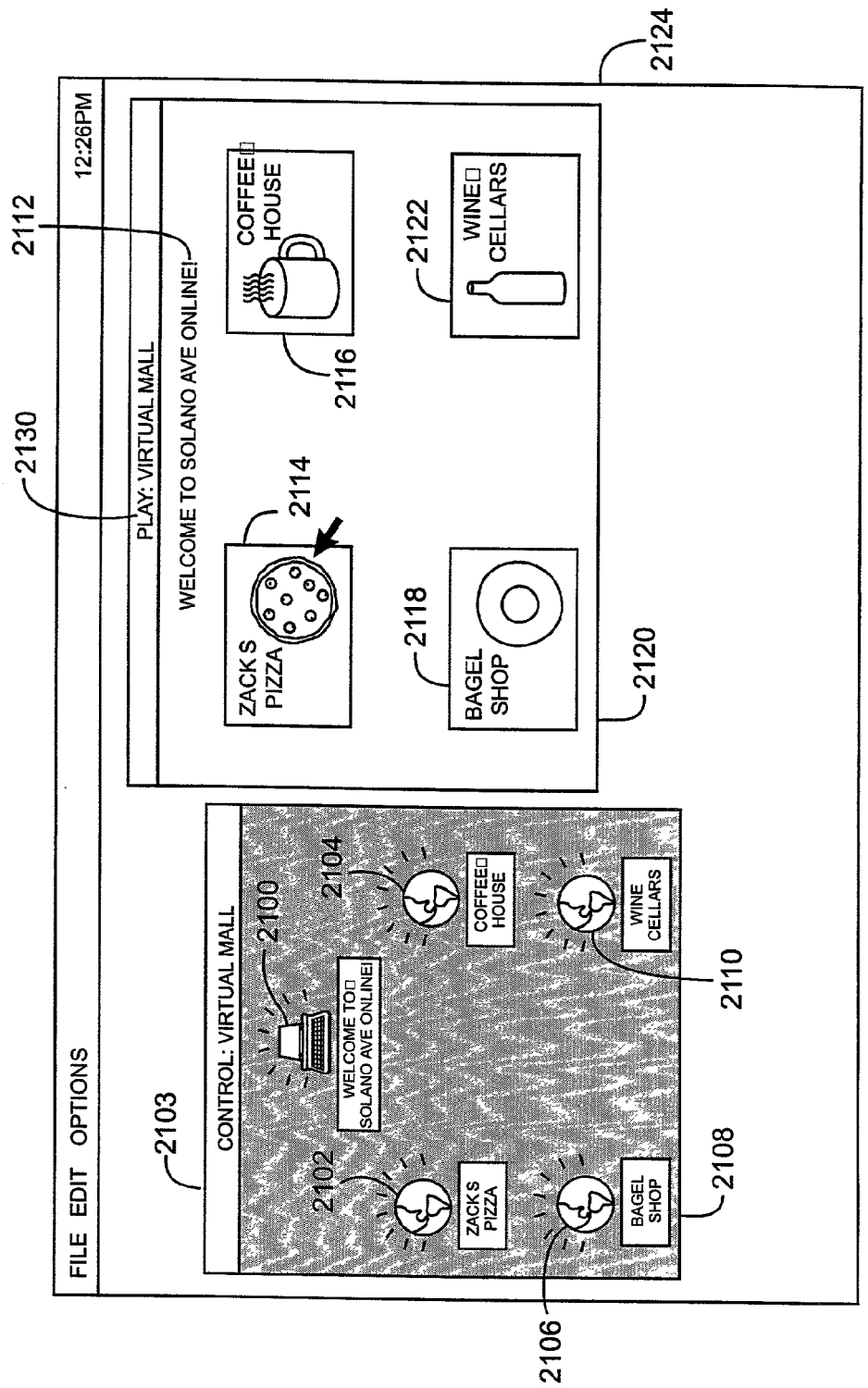
Figure 21B:
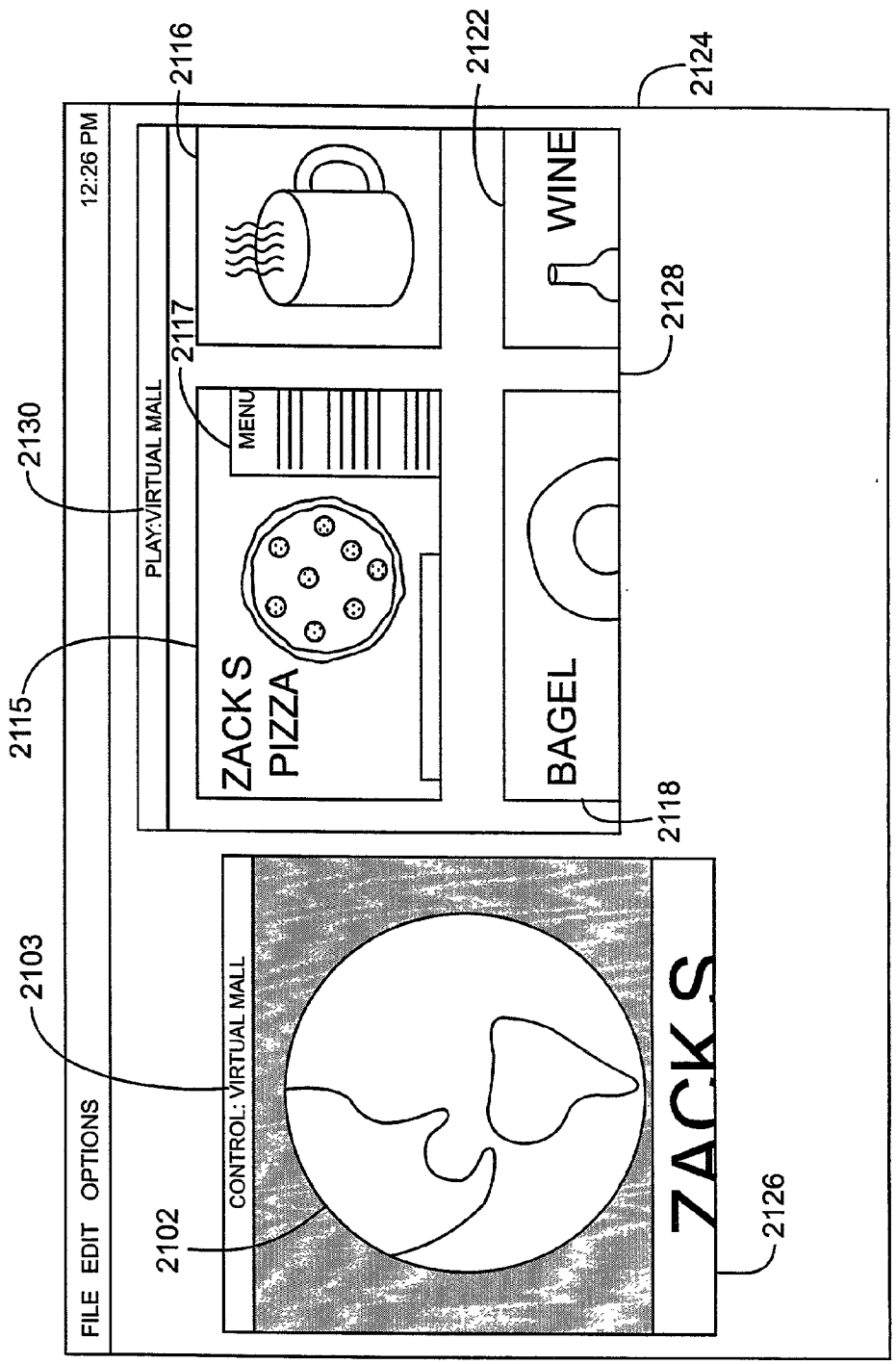
Figure 21C:
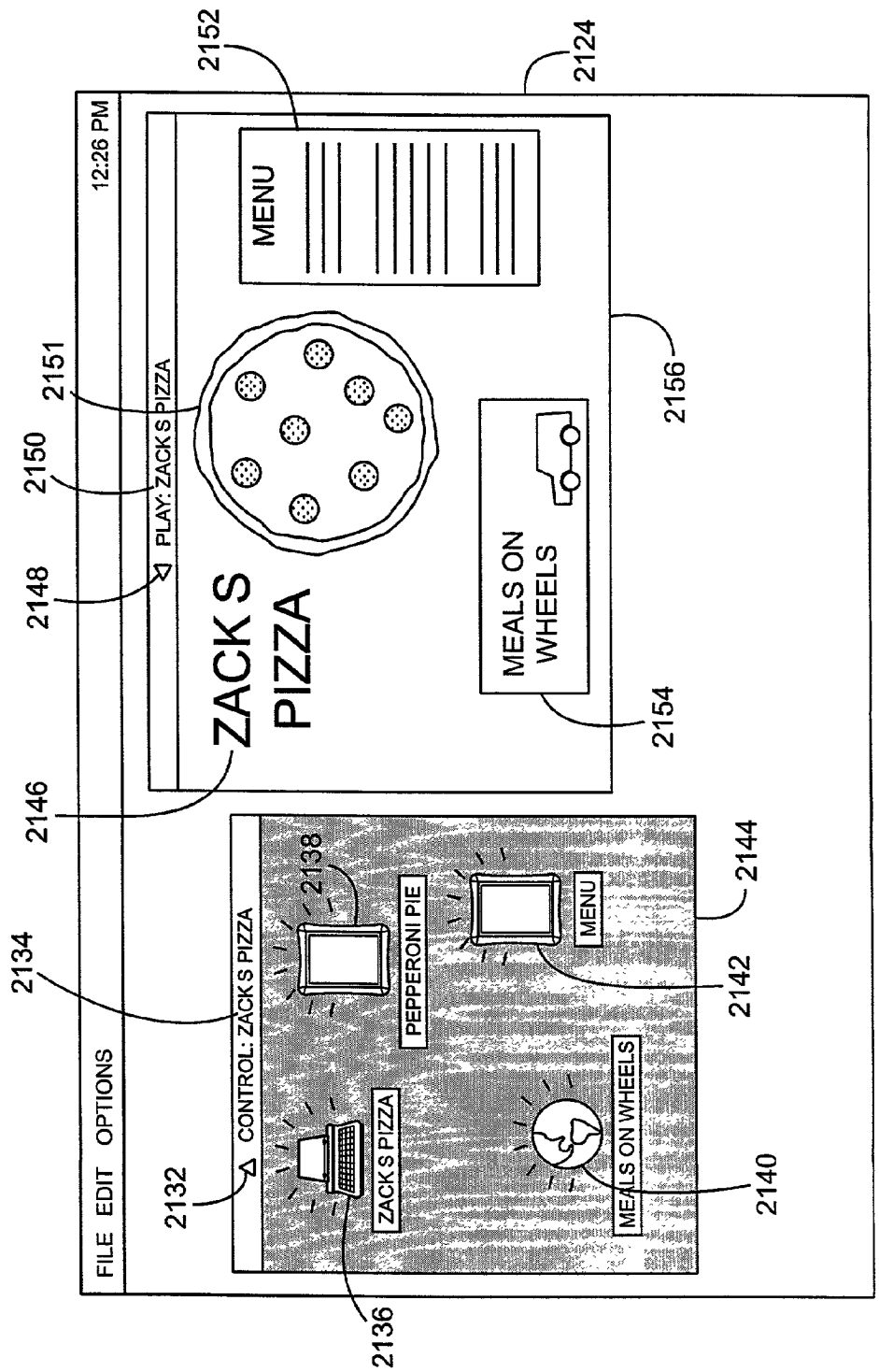

FIGS. 21A–C show playback display "zooming in" when a nested sub-display is activated during user navigation, according to one embodiment of the present invention. In this embodiment, the control display follows the playback display like a self-navigating map of the presentation data, but another embodiment of the invention need not include a control display to implement navigation of presentation data over a network using zooming nested sub-displays.

In FIG. 21A, a control display 2108 and a playback display 2120 are shown in screen display 2124. Together they are showing presentation data and output from a container object called VIRTUAL MALL, which may consist of pointer container objects containing references over a network to four container objects which have been published containing presentation data for four businesses: Zack's Pizza, Coffee House, Bagel Shop, and Wine Cellars. Object icons for these objects are shown in control display 2108 and are numbered 2102, 2104 2106 and 2110 respectively. The objects have been configured to be navigable, their sub-displays are enabled, and the sub-display outputs 2114, 2116, 2118 and 2122 are shown respectively in playback display 2120. Both status indicators 2103 and 2130 indicate that user is viewing the contents of the VIRTUAL MALL. The user double-clicks on sub-display output 2114, initiating a navigation event and zooming sub-display transition which is seen in two stages in FIGS. 21B and 21C.

FIG. 21B shows a "snapshot" of the control display 2126 and the playback display 2128 midway through the zooming display transition process. Control display 2126 has zoomed in to a very close view of the object icon 2102 for the container for Zack's Pizza presentation data; i.e. the destination of the navigation. The playback display 2128 has zoomed enough so that the display output of the Zack's Pizza sub-display 2115 is clearly the focus, and only partial views of the other display outputs for Bagel Shop 2118, etc. are visible. Moreover, we are beginning to see more information in the Zack's sub-display as it is expanding to show a partial view of a menu 2117. Both status indicators 2103 and 2130 still indicate that the user is viewing the contents of the VIRTUAL MALL.

FIG. 21C shows the to displays after the zooming transition. The Zack's Pizza container presentation data now fills both displays, as indicated by the status indicators 2134 and 2150. We now see that the original Zack's sub-display 2114 in FIG. 21A was just part of the full view of Zack's presentation data; i.e., we see that the logical size of the sub-display view 2114 was smaller than that of the full view of the presentation now shown in playback display 2156. The control display 2144 now shows object icons 2136, 2138 and 2142 corresponding to outputs 2146, 2151 and 2152 (the now fully visible menu) in the playback display. A container object icon 2140 MEALS ON WHEELS corresponds to a newly-visible navigable sub-display 1254 which provides a means to navigate to the presentation data for another business, Meals on Wheels. An up arrow button 2132 has appeared it allow exploration in the control display back to the previous data without changing the playback display output, and a back arrow button 2148 allows navigation back to the previous state of both displays. During the zooming process both the control display 2144 and the playback display 2156 have contributed to the impression that the user is navigating through a deep, interconnected space.

System Architecture

A system for generating, manipulating and presenting multimedia content can be configured as an application program for installation on a computer or as a software plug-in associated with a host application. In the presently preferred embodiments, the creation and playback of content occurs in the context of a computer workstation which may be connected to a computer network system, as discussed above. At the same time, however, the scope of the invention is not limited to just these configurations.

In the following discussion, various functions of the present invention are described where increasing levels of complexity and sophistication are revealed over the course of the discussion. Where possible, this increasing functional complexity is delinineated in ways which correlate to the innovations discussed in the preceding functional overview. In many cases, however, clarity and effiency require that certain system functions be described so as to encompass several or all of the innovations discussed above. In cases where such a generalized implementation is described, it is the above functional overview, and not the generalized implementation, that defines and delineates the features of the present invention and any dependencies between them.

Furthermore, the structural and functional divisions of the software system explained below are intended to describe only the currently preferred embodiment of the present invention. The essential functionality of the invention may also be organized and arranged using many other system configurations, such as those in which similar functionality is redistributed among different system components that may relate to each other differently. Therefore, no limitation to the present invention should be construed from the organization of the software system comprising its current embodiment, which is detailed as follows.

Figure 22:
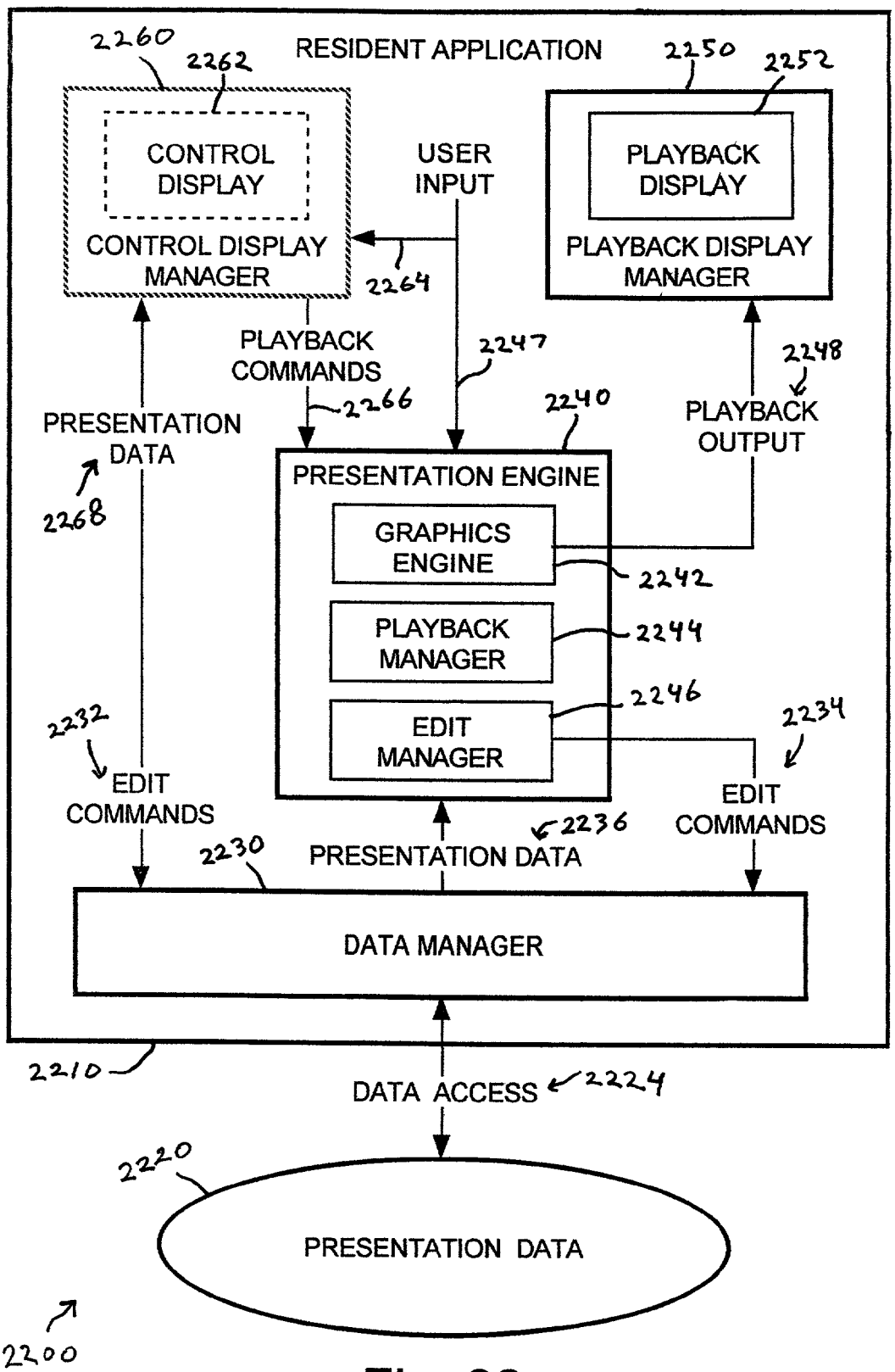
FIG. 22 illustrates a block diagram of a system for generating, manipulating and playing back multimedia content, as implemented by an installed computer program application, according to an embodiment of the present invention.

An overall multimedia authoring and playback system is illustrated by block diagram in FIG. 22, as might be implemented by an application program installed in a computer. As seen in the embodiment of FIG. 22, an authoring and playback application system 2200 will generally be comprised of a block of application elements 2210, as well as presentation data 2220. The presentation data 2220 consists of multimedia content which can be authored and played by users of the system. In the preferred configuration of FIG. 22, the presentation data 2220 is accessed by a data manager 2230 within the block of application elements 2210, as illustrated by arrow 2224. The main role of this data manager 2230 is to make presentation data available to other the system components for reading and editing (and in some of the more advanced embodiments of the invention, this can involve certain innovative procedures discussed below).

In addition to the data manager 2230, the block of application elements 2210 of FIG. 22 also shows a presentation engine 2240, a playback display manager 2250 and a control display manager 2260. The presentation engine 2240 is a mechanism, program or process which 'presents' multimedia content by initiating and managing 'playback processes' that output media content to one or more playback displays. The presentation engine 2240 may also provide various editing functions for authoring presentation data. The playback display manager 2250 is a system component that manages one or more playback displays 2252, each of which is a representation, such as a window in a graphical user interface ("GUI"), that displays visual content. The control display manager 2260 is an optional system component, as indicated by its dotted outline, which provides one or more control displays 2262, each of which is a GUI window, panel or other interface device used to manage or edit presentation data accessed via the data manager 2230.

In addition to the application elements shown in FIG. 22 (data manager 2230, presentation engine 2240, playback display manager 2250 and control display manager 2260), the present invention also includes a number of generic functions and services found in many software applications. These include: a 'main loop' which drives the operation of the system; provisions for receiving and routing user input; standard windowing, menuing and toolbar services; memory allocation and deallocation services; file access and network services; audio output services; and standard user interface services (buttons, checkboxes, radio buttons, text entry boxes, number boxes, dialog boxes, etc.). Because these functions and services are standard in most software applications, they are not described in great detail. A brief overview is provided as follows.

A 'main loop' drives the basic operation of the system, providing two main functions. The first is to aquire user input from the host system and route it to the appropriate system component (as discussed below). The other is to issue an 'update' function call to the various system components on a periodic basis (in this case once per 'frame', i.e., once each time through the main loop). This update function call enables the various system components to perform repetitive or time-based operations. An overall 'system' time is also made available to enable such processing to be correlated to the passage of time.

User input is received by the main loop and routed to the presentation engine 2240, as shown by arrow 2256, and may also be routed to the control display manager 2260 if one is present, as shown by arrow 2244. User input is defined in more detail below, but for the purposes of this high level view, it includes things like mouse actions and keystrokes. In the presently preferred implementation, user input is routed by the system to either the presentation engine 2240 or the control display manager 2260. depending on whether the 'top' window in the GUI (i.e., the most recently used window) is a playback display or a control display (respectively). In either case, when the user input is a mouse action, the screen coordinates of the mouse pointer are converted to the coordinate system of the top window before being passed to the appropriate system component. In the case of the top window being a playback display, the playback display manager 2250 is queried for the 'presentation ID' (discussed below) of its top window, and that information is included with the user input when it is routed to the presentation engine 2260.

The system also provides basic windowing, menuing and toolbar functionality like that found in most GUI-based systems. This standard functionality allows the various system components to create and manage GUI display fields (as seen in FIGS. 2 through 21), and to add menu entries and/or toolbar icons to the GUI (also seen in FIGS. 2 through 21). Either of these latter two components, when selected by a user, results in the execution of a corresponding function call within the appropriate system component. In particular, various operations of the presentation engine 2240 and control display manager 2260 make use of these menuing and toolbar capabilities, as discussed in the respective descriptions of those components, below.

By following the flow of control through FIG. 22, it can be seen how the various system components interrelate and communicate in the currently preferred embodiment of the invention. We begin with the data manager 2230. At initialization time, the data manager 2230 is given the file path or network location of a specified container object within presentation data 2220. This container object thereby becomes the 'root' object in the system, acting as an 'entry point' through which other presentation data can be accessed (not unlike the way the 'desktop' on a personal computer is the entry point for accessing whatever that computer can access). Aside from the internal operations of this data manager 2230, in the rest of the system the objects in presentation data 2220 are always identified in reference to this root object, using 'path strings' similar to those used in many data access systems (where the first element of the path string is the name of the root object).

The data manager 2230 makes the path string (or just 'path') of the root object available to the other system components, and these other components can use it to query the data manager 2230 for a listing of the objects contained within the root object. While container nesting is not a requirement of the system, in embodiments where it is supported, further container listings can also be queried for container objects nested within the root object, and so on. These container listings, provided by the data manager 2230 for the root object and any nested container objects beneath it, define the form of presentation data 2220 as a hierarchical tree of one or more levels. As will become apparent later in this specification, in the most complete form of the system this relatively straightforward 'data tree' can hide significant complexity that arises from creating and interconnecting multimedia content across a network. This improved clarity, achieved by innovative functionality within data manager 2230, is a main goal of the present invention.

The role of data manager 2230, then, is to make presentation data 2220 accessible to the other system components in the form of a hierarchical data tree of one or more levels. These other system components access the data tree by requesting listings for container objects from data manager 2230, starting with the root object and going down the branches of the tree as needed. In addition, the data manager 2230 also provides various data reading and writing functions which can be used by other system components to access or change particular data for specified objects.

One system component which accesses presentation data in this way is the control display manager 2260. In the currently preferred embodiment shown in FIG. 22, the control display manager creates and manages control displays that show objects contained in containers. For each such container, the control display manager 2260 gets the container listing from data manager 2230, as shown by arrow 2246, whereupon it can present the listing to the user in the form of an icon-view or list-view display. Using these control displays, the user can perform data management operations on containers and their contained objects, and these are illustrated by edit commands 2232 going into data manager 2230 in FIG. 2. Furthermore, the control display manager 2260 can display object data to the user in the form of editing screens, popup panels, etc., and these can also result in access of presentation data 2246 and issuing of edit commands 2232.

By interacting with a control display via user input 2244, the user can explore and edit the contents of the data tree, and can also start playback for one or more objects. In order to accomplish the latter, the control display manager 2260 issues playback commands 2248 to the presentation engine 2240. These playback commands 2248 can also include status checking functions for monitoring the playback operations occurring in presentation engine 2240, so that the playback status of displayed objects can be indicated to the user within control displays.

When a command to start a particular object is issued to the presentation engine 2240 (such as when a user clicks on an object name within a control display), the presentation engine 2240 routes the start command to its internal component 2264, the playback manager, which initiates one or more playback processes in response. When starting playback processes, the playback manager 2264 accesses presentation data 2220 from the data manager 2230, as shown by arrow 2236, and issues commands to the graphics engine 2262 that cause that module to incorporate media data from the newly started objects into its playback output 2258. This playback output 2258 from graphics engine 2262 goes to playback display manager 2250, which accepts a bitmap from the graphics engine once per frame and presents it in a playback display 2252 for the user to view.

Once object playback has started in this way, the user can interact with the playback output being presented in the playback display, as indicated by user input 2256 going into the presentation engine 2240. This user input, like the start commands, is routed to playback manager 2264, where it can be used to generate playback behavior as discussed below. Additionally, in embodiments where there is both a play mode and an edit mode, the user can switch the system to edit mode via the user input 2256, whereupon the user input 2256 is instead routed to the edit manager 2266 in presentation engine 2240. In edit mode, the user can perform various editing functions which cause the edit manager 2266 to send edit commands 2234 to the data manager 2230, and at the same time the edit manager 2266 may issue commands to the graphics engine 2262 so that edits being performed by the user are reflected in the playback output 2258 presented in playback display 2252.

In addition to the communications between the various system components shown in FIG. 22, in the most complete embodiment of the system certain additional component interactions (not shown) are required in order to optimize the clarity of the user interface. In particular, user navigation, play mode versus edit mode, and multiple control displays, when used in combination, require 'careful handling' in order to achieve optimum results. The detailed explanation of this functionality is spread among the discussions of the components which are involved, as noted in the pages which follow.

Figure 23:
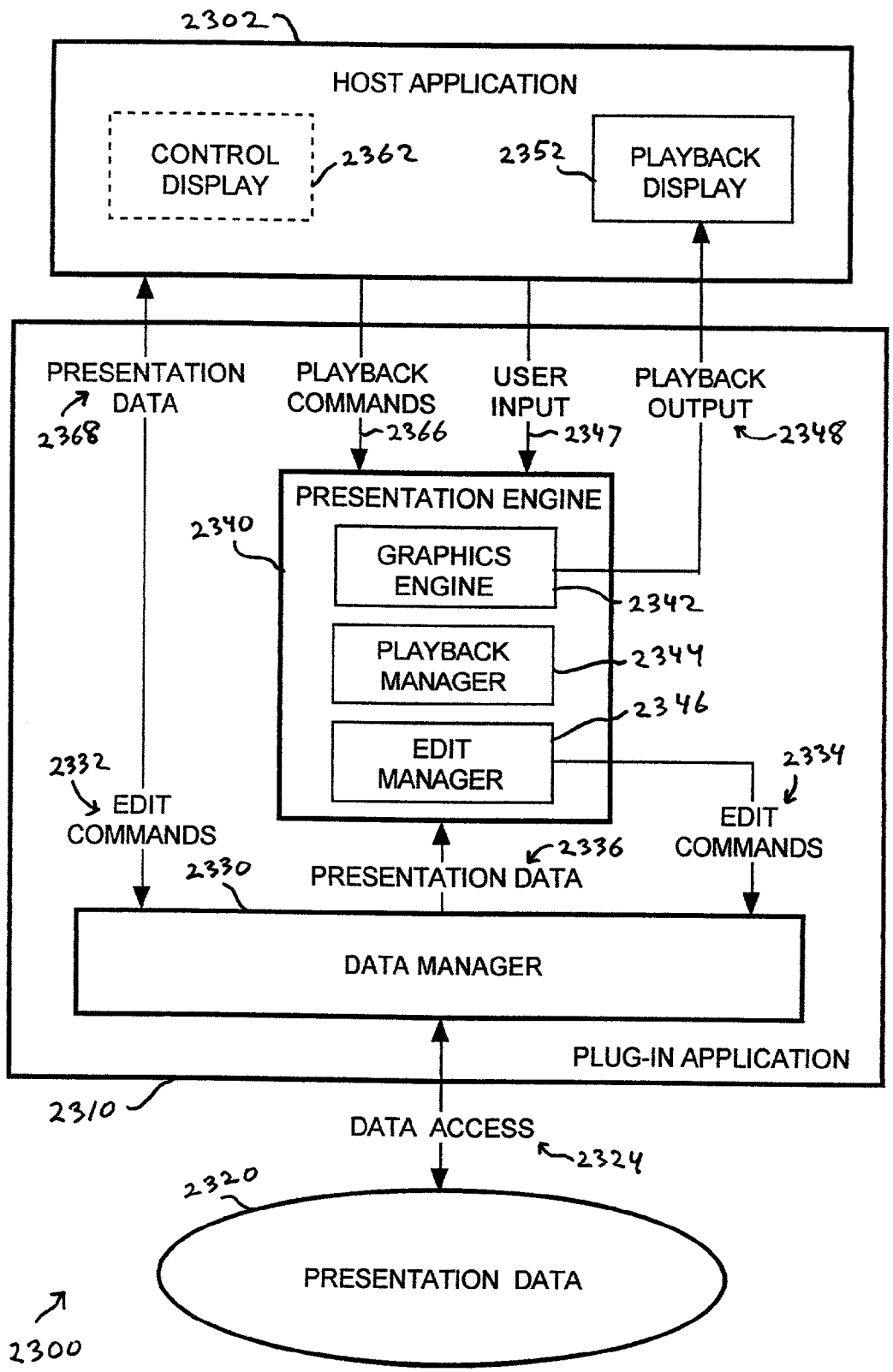
FIG. 23 illustrates a block diagram of a system for generating, manipulating and playing back multimedia content, as implemented by a software plug-in associated with a Web browser or other host, according to an embodiment of the present invention.

Turning now to a second system configuration set forth in FIG. 23, the overall authoring and playback plug-in system 2300 is comprised of a different arrangement of many of the same components seen in the application system. In the preferred embodiment, an authoring and playback plug-in system 2300 will generally be comprised of a host application 2302, a block of plug-in elements 2310, and presentation data 2320. As with the application system above, the presentation data 2320 consists of multimedia content which can be authored and played by users of the system. In the preferred configuration of FIG. 23, the presentation data 2320 is accessed by a data manager 2330 within the block of plug-in elements 2310, as illustrated by arrow 2324. The main role of this data manager 2330, like the above data manager of FIG. 22, is to make presentation data available to the other system components for reading and editing (and as above, this can involve various innovative procedures).

Regarding the host application 2302 in the system of FIG. 23, various types of software applications may be able to provide the necessary hosting functionality, and these can include Web browsers, media integration platforms, server processes running on servers, etc. The host application is responsible for the manner and context in which the functionality of the present invention is presented to the user. For example, a community Web site which offers chat rooms or other forms of text-based communication for its members might include options within its control interface for accessing displays and functionality associated with the present invention. Or alternatively, the present invention may be configured as a 'player' plug-in for a Web browser, with minimal or no editing features available. Overall, these host applications can include various types of presentation and interface functionality depending on the purposes at hand. In many cases this can involve functionality similar to that provided by the playback display manager 2250 and the control display manager 2260 of FIG. 22, as indicated by the playback display 2352 and control display 2362 shown within host application 2302 (the latter being in outline, as in the earlier figure, to show its optional nature).

In general, the flow of control in the plug-in system of FIG. 23, as well as the capabilities and interrelationships of the various system components, is the same as in the application system of FIG. 22, as can be seen by the similarity of the two figures. In FIG. 23, the plug-in data manager 2330 provides the other system components with access to presentation data in a similar fashion as the data manager of FIG. 22. As seen by the arrows in FIG. 23, the data manager 2330 can receive edit commands 2332 from the host application 2302, and edit commands 2334 from an edit manager portion 2366 of the presentation engine 2340. The data manager 2330 can also provide presentation data to both the host application, as shown by arrow 2346, and to the presentation engine 2340, as shown by arrow 2336.

Also located within the block of plug-in elements 2310, is the presentation engine 2340 portion of the plug-in system 2300. This presentation engine 2340 manages playback processes and generates a playback output, and generally performs the same functions as the presentation engine in FIG. 22. Like the earlier presentation engine, the plug-in presentation engine 2340 includes three sub-components: a playback manager 2364, an edit manager 2366 and a graphics engine 2362. The plug-in presentation engine 2340 can receive user input 2356 and playback commands 2348 from the host application 2302, and can provide playback output 2358 to the host application for presentation in one or more playback displays. The presentation engine 2340 can also aquire presentation data 2336 from, and issue edit commands 2334 to, the data manager 2330.

Now that the overall flow of control has been described for two configurations (application and plug-in) of a software system that embodies the currently preferred form of the invention, the initialization procedure for the system is described. This procedure is described in reference to the application system of FIG. 22; a similar procedure takes place in the case of the plug-in system of FIG. 23, allowing for certain differences based on host involvement, etc. Before describing the specific steps of system initialization, some general explanation of the concepts involved may be helpful.

In the presently preferred embodiment, during system initialization a database file within presentation data 2220 is identified to the data manager 2230 as the 'root' database. The location of this root database is specified to the data manager in physical terms, such as a file path or network address (hereinafter called a Universal Resource Locator, or URL). The database file format is defined later in this specification, but is essentially it has one container object at its top internal level, the 'top' object, which contains the rest of the data in the database. This top object of the root database is the 'root object' of the system, acting as an entry point into the presentation data 2220. To understand the role of this root object, it is important to understand that the system can also be implemented effectively with multiple root objects instead of just one. In such an embodiment, these multiple root objects might, for example, represent different 'presentations' that a user has collected, and there would likely be provisions for the user to select among them via a control display to initiate playback, etc.

In the presently preferred embodiment, the system has just one root object at a time, and this provides an effective solution for two common user scenarios which fall on either side of the above scenario in terms of complexity. One scenario is where a user is only interested in one presentation (such as, for example, after receiving a message from a friend in the form of an executable file sent via email). For such cases, a minimum system configuration is provided in which the root database is passed in as a 'launch parameter' during system initialization, and is automatically started so that it plays immediately.

In the other scenario, the user is interested in maintaining a 'home' data tree, where multiple presentations can be managed and arranged in hierarchically nested containers. For this case, a more full-featured system is provided, where the root object is the entry point into this data tree, and the tree extends out hierarchically from there. In this configuration, the root database is maintained in a persistent fashion by the system, such as in a specially named file stored in a known location (there can even be one such root database per registered user of the system, so that every user has their own 'home' tree). In this version of the system, the root object is not started during initialization, but rather a control display is opened which displays the contents of the root object to the user.

It should be noted that the only inherent difference between these two scenarios is whether or not the root object is passed in as a launch parameter, since either scenario may otherwise include various features which may be present or absent. In fact, a variety of system configurations can be imagined for the present invention, ranging from a minimum feature set to a complete feature set, to suit the needs of various users in various scenarios. The system initialization procedure discussed below would be effective for most such configurations.

Before discussing the specific steps of the initialization procedure, it might be helpful to explain what a 'presentation' is within the context of the current invention. Unlike traditional multimedia tools, where a presentation is defined by such things as file boundaries, other data storage constructs or the like, in the present invention each 'presentation' is essentially the set of playing objects assigned to a particular playback display. A list of playing objects for each playback display is maintained inside presentation engine 2240, and all of the objects on a list share a common 'presentation ID.' Any object can potentially be part of the 'current' presentation (the one being shown in the topmost playback display) at any time simply by being started. Whenever an object is started, it is assigned to a presentation, meaning that its newly started playback process goes on one of these lists. Each presentation is also associated with a 'master object,' typically a container object, whose name becomes the name of the presentation; it is this object which is started and stopped when the presentation is started and stopped.

It should be noted that in the presently preferred embodiment, there are currently no provisions for creating additional playback displays other than the first one created during initialization (although a variety of such mechanisms can easily be imagined). Therefore, while the system is architected to support multiple presentations playing in multiple playback displays, in various places in the discussion certain details of managing this multiplicity are omitted for the sake of clarity. Whenever such abridgement takes place, the functionality for performing equivalent tasks in a system with multiple playback displays is merely an extension of the functionality described.

Figure 24:
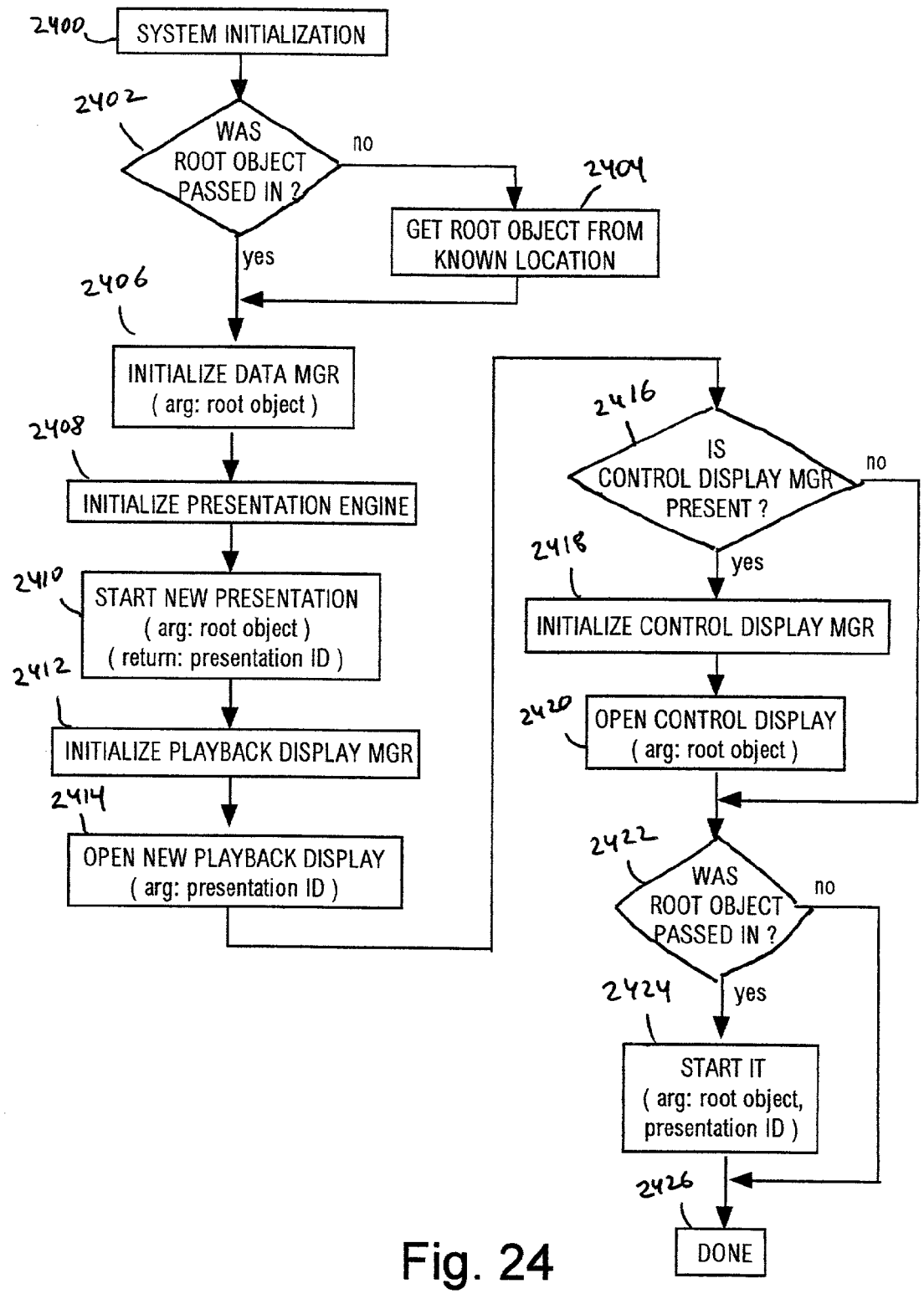
FIG. 24 illustrates a software flow diagram of the system initialization procedure, according to an embodiment of the present invention.

FIG. 24 shows an illustrated flow diagram of the initialization procedure for the presently preferred embodiment of the invention. Step 2400 is triggered when the user launches the system. A root database may or may not be passed in as a launch parameter, depending on the manner of the launch. If the user launches the application by selecting a particular database file, that database file will be passed in as the root database. If the user launches the application directly, no such root database will be passed in. In step 2402, if there was no root object passed in, the system goes to step 2404, locating the root database by looking in a known location. In either case, step 2406 occurs next, in which the system initializes the data manager 2230 by passing it the identity of the root database (a URL, such as a file path or network address).

Next, in step 2408, the system initializes the presentation engine 2240. In the following step 2410, it creates a new presentation, passing in the top object of the root database aquired in step 2400 or 2404 as the master object, and a presentation ID is returned. Next, in step 2412, the playback display manager 2250 is initialized. Next, in step 2414, a new playback display is opened, and it is assigned the presentation ID received in step 2410.

In step 2416, the presence or absence of the control display manager 2260 (an optional system component) is checked. If one is present, it is initialized in step 2418 and then in step 2420 a control display showing the contents of the root object is opened. Next, in step 2422, the evaluation of step 2402 is repeated. If the root object was passed in as a launch parameter, that object is started in step 2424 by a playback command issued to presentation engine 2240 (which specifies the root object and the presentation ID as arguments). Step 2426, which follows, signifies that initialization is complete.

A detailed description of each of the functional components of the system is now provided. The discussion begins with the playback display manager 2250 of FIG. 22, which is the simplest component in the system. Next, the control display manager 2260 of FIG. 22 is described (even though this component is optional, the discussion proceeds more logically in this order). The discussion then goes on to describe the presentation engine (2260, 2360) of FIGS. 22 and 23 which provides playback and editing of objects. Finally, the data manager component (2230, 2330) of FIGS. 22 and 23 is explained.

The playback display manager 2250, as seen in the upper right hand corner of FIG. 22, provides playback display functionality for presenting playback output to users of the system. In the presently preferred embodiment, the playback display manager 2250 is a software module which can receive function calls, such as function calls for initialization, termination, and the opening and closing of playback displays. In response to these function calls, the playback display manager 2250 issues standard windowing calls to the system windowing services to create and manage the playback displays being presented. The playback display manager 2250 also has an update function called once per frame, which aquires a bitmap from the presentation engine 2240 for each playback display currently open and passes it to the system windowing services.

Before discussing the details of the preferred embodiment of the playback display manager 2250, some alternate embodiments of playback display functionality are worth noting. For example, instead of presenting playback output using windows or displays in a GUI, the playback display manager 2250 might, in some system configurations, present playback output using various other devices, and these can include: video output hardware connected to a video monitor or television set, a network connection that accepts playback output, etc. Furthermore, in the plug-in system configuration, the host application that accepts playback output from presentation engine 2340 may also use a variety of means for presenting that playback output to users, and these can involve various hardware, software and network configurations such as above. All of these alternate embodiments may be used to implement playback display functionality in the present invention.

Returning now to the presently preferred embodiment of playback display functionality, the playback display manager 2250 is a software module which receives playback output and presents it to users via one or more playback displays. The playback display manager 2250 provides functions for opening and closing playback displays, which in the present embodiment are only called once during system initialization and termination. In a further embodiment of the system, provisions may be included that let a user open additional playback displays, such as by double-clicking on container objects, etc. In any event, every open playback display (in this case the one main playback display) is associated with a playback output originating from some source (in this case the presentation engine). Whenever the function for opening a playback display is called, the calling routine passes it a presentation ID, which can be a pointer or other identifier specifying the source of the playback output intended for that playback display. This identifier is then referenced in the update function when the playback display manager 2250 aquires a new bitmap once each frame from the presentation engine 2240.

Figure 25:
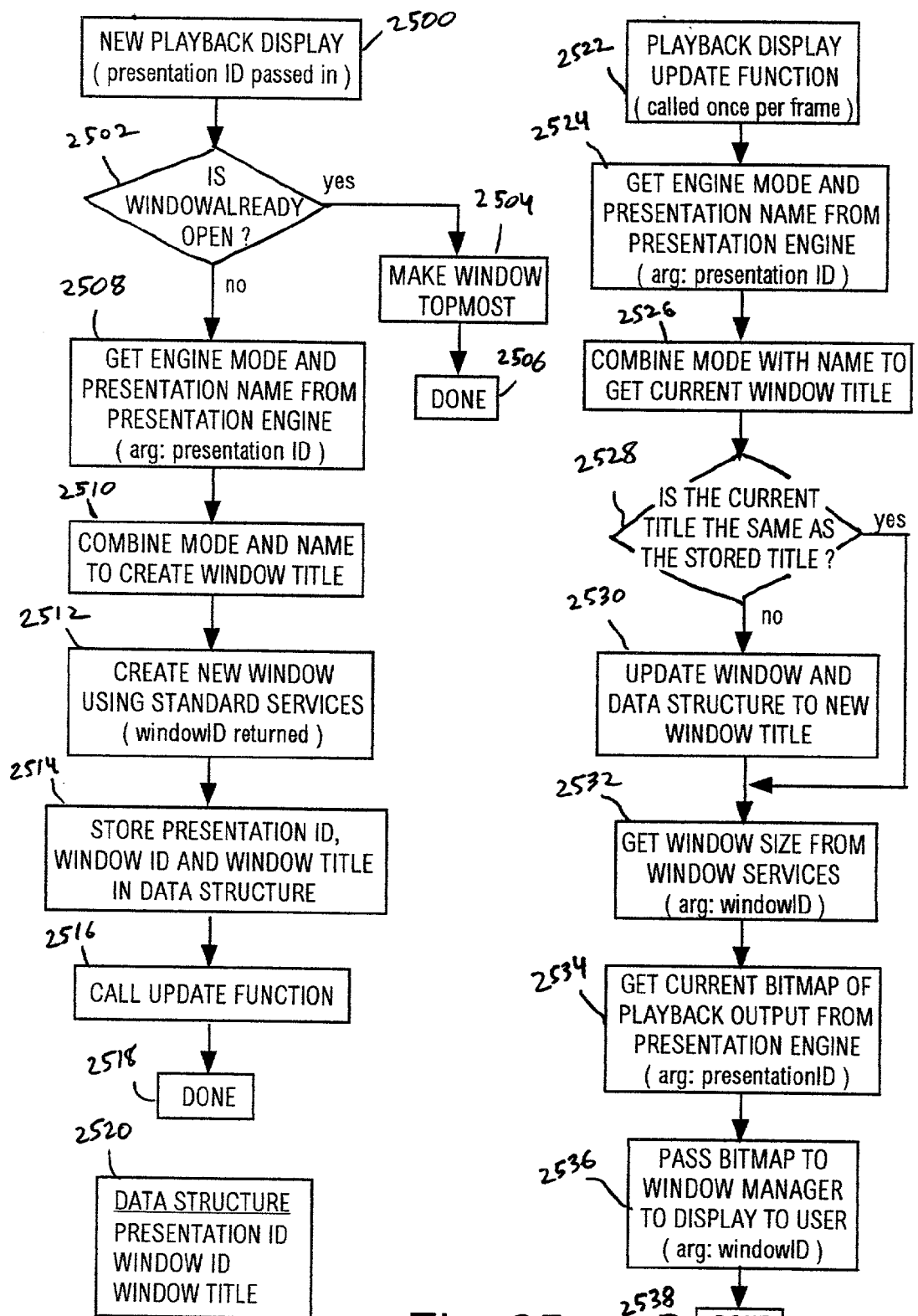
FIG. 25 illustrates software flow diagrams showing procedures of the playback display manager of the systems of FIGS. 22 and 23, according to an embodiment of the present invention.

A flow diagram of the function for opening a new playback display is shown in FIG. 25. In step 2500, the function has just been called, in the present embodiment by the initialization functionality. Next, in step 2502, the incoming presentation ID is compared against those of any open playback displays, and if a match is found, the function makes that window the top window 2504 and exits 2506. Otherwise, in step 2508, the engine mode and presentation name, two ascii strings, are aquired from presentation engine 2240 (based on the presentation ID passed in at step 2500). Then in step 2510, the two strings are concatenated to create the window title. Next, in step 2512, a new window is created using the window title of the last step, by calling the standard windowing services provided by the system, and a window ID is returned. Next, in step 2514, the presentation ID, window ID and window title of the previous steps are stored in data structure 2520. Then, the update function is called 2516 to fill the window with content and the function exits 2518. Thereafter, the user may interact with the window frame to move and resize the window, which is handled entirely by the system window services.

On the right side of FIG. 25 is a flow diagram of the update function, which begins at step 2522 when the function receives its periodic call. First, in step 2524, the engine mode and presentation name, two ascii strings, are aquired from presentation engine 2240 as before (this time based on the presentation ID stored in data structure 2520). Then in step 2526, the two strings are concatenated to create the window title. Next, in step 2528, the current title is compared with the previous title stored in data structure 2520, and if they are different, the playback display (via window services) and data structure 2520 are updated accordingly in step 2530. Next, in step 2532, the size of the bitmap needed to fill the content portion of the playback display is aquired from the window manager. Next, in step 2534, a bitmap of that size is aquired from presentation engine 2240 by passing it the presentation ID stored in data structure 2520. Next in step 2536, the aquired bitmap is passed to the system window services, referencing the window ID stored in data structure 2520, making it the next 'frame' shown in the playback display. With that, the function is done 2538.

Finally, at the bottom of FIG. 25, we see a flow diagram for a short function provided by playback display manager 2250. This function is part of the un-illustrated component interactions mentioned above which provide 'careful handling' to optimize the clarity of the user interface. It allows the control display manager 2260 (when starting an object) or the system (when routing user input) to query the playback display manager 2250 for the presentation ID of the top playback display (i.e., the playback display which has most recently been the 'active' user window in the system). In the present embodiment, after being called 2540, it gets 2542 the presentation ID from data structure 2520, and returns it 2544. If there were multiple playback displays, it would need to always store the identity of the top playback display and return that instead. The playback display manager 2250 also includes standard functions for closing playback displays and termination.

We now turn to a discussion of the control display manager 2260, shown in the upper left hand corner of FIG. 22. The control display manager provides one or more 'container view' display windows, in which the objects contained in a particular container object are displayed either as icons arranged on a background or as names in a list. The container object whose contained objects are presented in a control display is referred to as the 'focus' of that control display. Depending on which features are implemented in the system as a whole, container view control displays can provide various features for users to view and interact with presentation data, and these can include: starting and stopping of individual objects; displaying the status of objects that are playing; managing and editing presentation data; and exploring hierarchically arranged presentation data. In addition, the control display manager 2260 may also provide one or more 'editing screen' display windows, in which the content data for an object which is not a container object can be edited.

As mentioned above, the control display manager 2260 is an optional system element, in that many of the features of the present invention can be successfully implemented without this element in the system. In the discussion below, which describes the currently preferred embodiment of the control display manager 2260, the full set of preferred control display functionality is described. It should be understood that not all of the features discussed are essential to the invention, nor even essential to the successful implementation of basic control display functionality. Depending on the overall system configuration and the features provided in other system elements, various subsets of the full functionality described below may be implemented.

In the preferred embodiment shown in FIG. 22, the control display manager 2260 is a software module which receives function calls, such as calls for initialization, termination, the opening and closing of control displays, and user input handling. The control display manager 2260 uses the system windowing services to create control displays, and has an update function called once per frame in which it renders a bitmap for each open control display and passes it to the windowing services for display to the user. This update function monitors and indicates the playback status of displayed objects, and in advanced implementations, can provide 'zooming' effects. In addition, the control display manager 2260 is involved with some of the un-illustrated component interactions mentioned above which provide 'careful handling' to optimize the clarity of the user interface.

Figure 26:
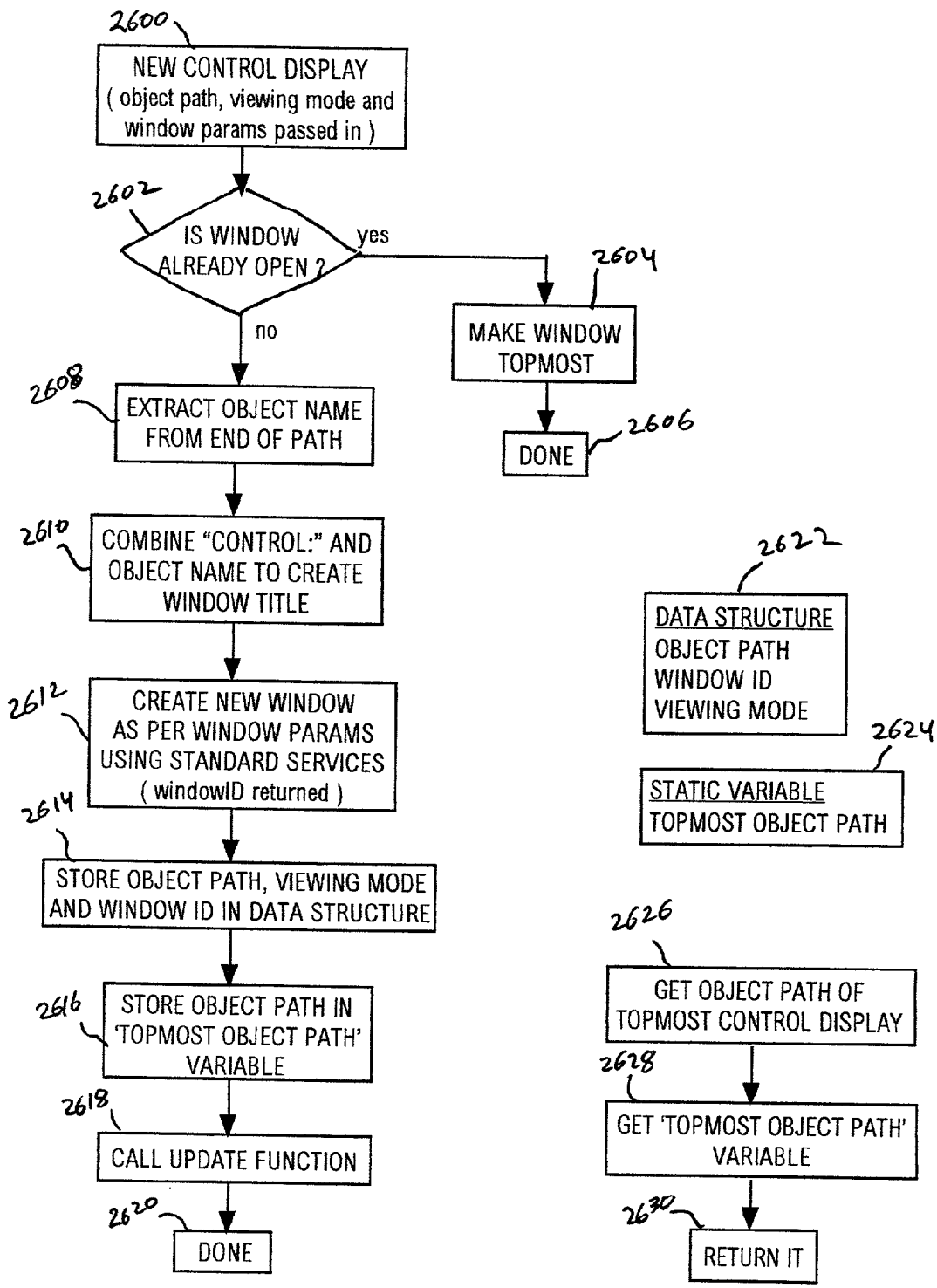
FIGS. 26–27 illustrate software flow diagrams showing procedures of the control display manager of the systems of FIGS. 22 and 23, according to an embodiment of the present invention.

As shown in the flow diagram of FIG. 24 (discussed above), during system initialization the control display manager 2260 is initialized and issued a command to open a control display for the root object of the system. A flow diagram of the function for opening a new control display is shown in FIG. 26. In step 2600, the function has just been called, in the present embodiment by the initialization functionality. Next, in step 2602, the incoming object path is compared against those of any open control displays, and if a match is found, the function makes that window the top window 2604 and exits 2606. Otherwise, in step 2608, the last object name in the incoming object path is extracted. Then in step 2610, the window title is created by concatenating a title string, such as "Control: " with the object name. Next, in step 2612, a new window is created using the window title of the last step, by calling the standard windowing services provided by the system, and a window ID is returned. Next, in step 2614, the object path, viewing mode and window ID of the previous steps are stored in data structure 2622. Next, in step 2616 a static variable 2624 "Topmost Object Path" is updated with the object path of the previous steps. Then, the update function is called 2618 to fill the window with content and the function exits 2620. Thereafter, the user may interact with the window frame to move and resize the window, which is handled entirely by the system window services.

In the lower right of FIG. 26 is a function 2626 which returns the object path of the topmost control display. This function is called by other system components (in particular the presentation engine and control display manager) as part of the 'careful handling' mentioned above. Steps 2628 and 2630 return the address of variable 2624 to the caller of the function 2626.

Figure 27:
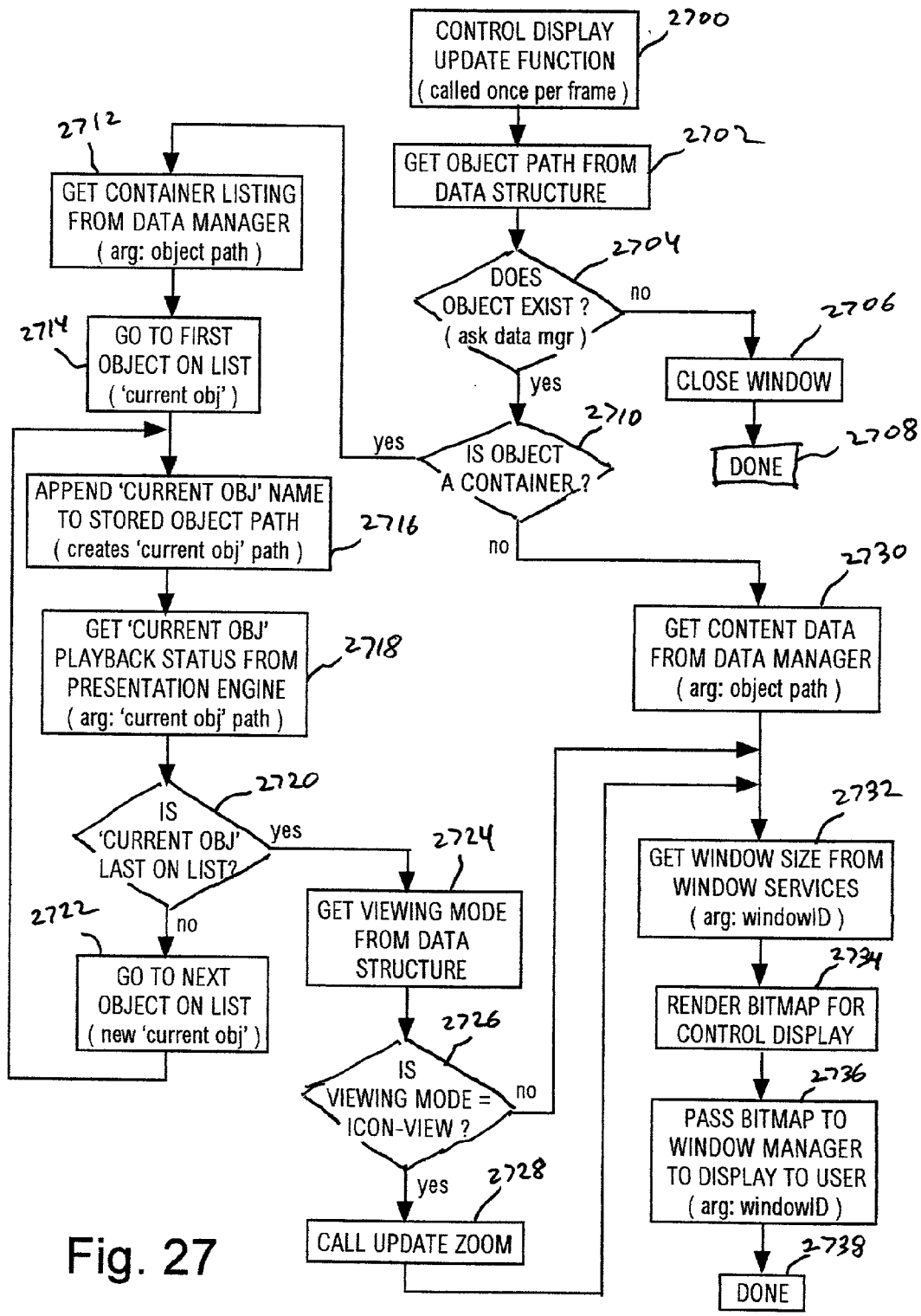

In FIG. 27 is a flow diagram of the control display update function, which begins at step 2700 when the function receives its periodic call. First, in 2702, it accesses the data structure 2622 from FIG. 26 to acquire the current object path of this control display. Then, in 2704, it calls the data manager with the object path from the previous step to aquire object properties and verify the that object still exists. If it does not exist, then in step 2706, the control display window is closed, and the update function returns to its caller with an error code 2708. If the object does exist, its properties data is examined to see if it is a container object. If it is a container object, then in step 2712 the data manager is called with the object path from step 2702 to get a listing of the contained objects. Next, a loop goes through the list of contained objects starting at the first object 2714. At the top of the loop code 2716, a 'current object path' string is created by appending the name of the current iteration object to the object path from 2702. Next, in 2718, the presentation engine is queried for the playback status of the 'current object path' from 2716, that status is stored for later use in the rendering portion of this function. Step 2720 checks whether the end of the list has been reached, and if not, step 2722 sets the current object to the next object in the list and proceeds to the top of the loop 2716 for another iteration.

When the end of the list is reached in step 2720, the view mode is acquired 2724, from the data structure 2622. Next, the view mode is checked in step 2726 to see if it's icon-view. If it is in icon-view mode, step 2728 calls a subroutine to update the zoom of the control display, which provides zooming into and out of container icons. If the container query from 2710 was negative, in step 2730 a call to the data manager is made to acquire the content for the object. Once step 2732 is reached, the window size is acquired from the standard window services, so a bitmap in 2734 can be rendered. In the case of objects which are not containers, each object type has its own type of standard editing screen which is rendered: a text object has a text editor, a picture object has a paint editor, etc. One quasi-standard editor provided is for vector objects; a vector object is a timeline with changing numbers, and its editor is similar to an editor for MIDI continuous controller data in a MIDI sequencer. In the case of a container object, it may be rendered in either list view or icon view. Both views are similar to those provided by standard windowing operating systems, such as Windows® or Apple® Macintosh®. There are, however, some important differences. One is that in icon view, popup panels are provided for editing setup data for each object. Another is that relations between objects are displayed as lines between icons. Another difference is that the playback status aquired in step 2718 is indicated visually (as a highlight glow behind the icon in icon view, or by showing the name in bold text in list view; other means may of course be used as well). In the most preferred embodimemt, not only is this playback status indicated as on or off, but the level of playback activity, reported by the presentation engine as a 'percent active', is indicated by the brightness of the visual indication, which changes dynamically as objects perform entrances, exits, etc. Once the bitmap in 2734 is rendered, the bitmap is passed to the standard windowing services for display. At this point, in step 2738, the function is done.

Regarding the the handling of user input by the control display manager 2260, the currently preferred functionality centers around control displays which are container views. Much of the user input handling is equivalent to that found in windowing operating systems, especially in the areas of 'exploration' and editing. However one important area where the present invention differs from these other systems involves the starting and stopping of object playback. In the present invention, single-clicking on the name of an object, either in icon view or list view, causes it to be started if it is not already playing, and stopped if it is already playing. This toggling of playback is accomplished via playback commands XXXX issued to presentation engine 2240 by control display manager 2260. In addition to specifying the path of the object being started or stopped, the control display manager 2260 also queries the presentation ID of the top playback display from the playback display manager 2250, and that is passed to the presentation engine along with the object being started or stopped (this is part of the 'careful handling,' causing objects started in this way to always appear in the top playback display).

Turning now to user 'exploration' of hierarchically structured presentation data via a control display, it is accomplished in the following ways. Double-clicking on a container object causes the control display to switch over to a container view of that object; in the most preferred embodiment, this switch over is implemented by 'zooming in' to the double-clicked container object. Double-clicking on a media object causes the control display to switch over to an editing screen for media objects of that type (also, in the most preferred embodiment, with zooming). Pressing the 'escape' key or selecting a 'back' button in the display title bar causes the display to switch away from its current container view or editing screen (also, in the most preferred embodiment, with zooming), and switch over to a container view for the enclosing container object (in which the object previously being 'explored' is now one of the contained items). All of the user interface handling for these operations is provided using standard user interface handling functionality, found in many types of software applications.

In addition to this exploration which is driven by user interaction with the control display, the control display manager 2260 also provides a function which can be called by other system components to drive its control display exploration automatically. In particular, the presentation engine calls this function during user 'navigation' (discussed below), and this causes the top control display to 'follow' the user navigation as it occurs. This effectively turns the top control display into a self-navigating map, which follows the user as he or she navigates through presentation data by interacting with a playback display.

In addition to exploration, the control display manager 2260 also includes user input handling that provides various editing functions for editing and managing presentation data. Like the exploration functions above, these functions are similar to what might be found in various windowing operating systems, and standard techniques for processing user input of this type may be employed. In particular, a number of these functions involve menu selections which operate upon the currently selected object or objects in the control display, and which sometimes involve selecting a display location as well. Functions of this type include 'new', 'copy', 'rename' and 'delete,' all of which are standard in their usage, as well as 'make pointer object' and 'make folder pointer object.' Of these last two functions, the former is similar in user interface handling to making an alias on the Macintosh® or shortcut in Windows® (although the resulting object operates differently), and the latter involves a dialog box for selecting a folder with which to associate the new folder pointer object. In addition, various editing functions may be accomplished by standard 'drag' operations, such as dragging an object from one control display to another, or into a container object, to move or copy it.

One non-standard piece of functionality associated with this present category of user input handling in control display manager 2260 is that whenever the users clicks on an object or the background of a control display, the control display manager 2260 notifies the edit manager sub-component of the presentation engine 2240 of the user action. This allows user actions occurring in control displays to be integrated into editing procedures provided by the edit manager (which are discussed below). This notification is also part of the 'careful handling' referred to above.

In addition to standard editing operations involving object selection, menu functions and dragging, the control display manager 2260 also provides popup panels which can be opened for displayed objects, and these can be used to edit setup data and object relations using standard user interface devices such as checkboxes, number entry fields, etc. Additionally, as mentioned above, relations between objects are shown in icon view as lines connecting the icons of related objects. In the popup panels, one panel 'page' for each object is dedicated to a set of 'connectors' that represent that object's relational capabilities, i.e., the ways in which that object can communicate with other objects. Relations between objects can be added or removed by dragging 'strings' between compatible connectors on these panels, using line dragging functionality similar to that found in many relational database programs.

Figure 28:
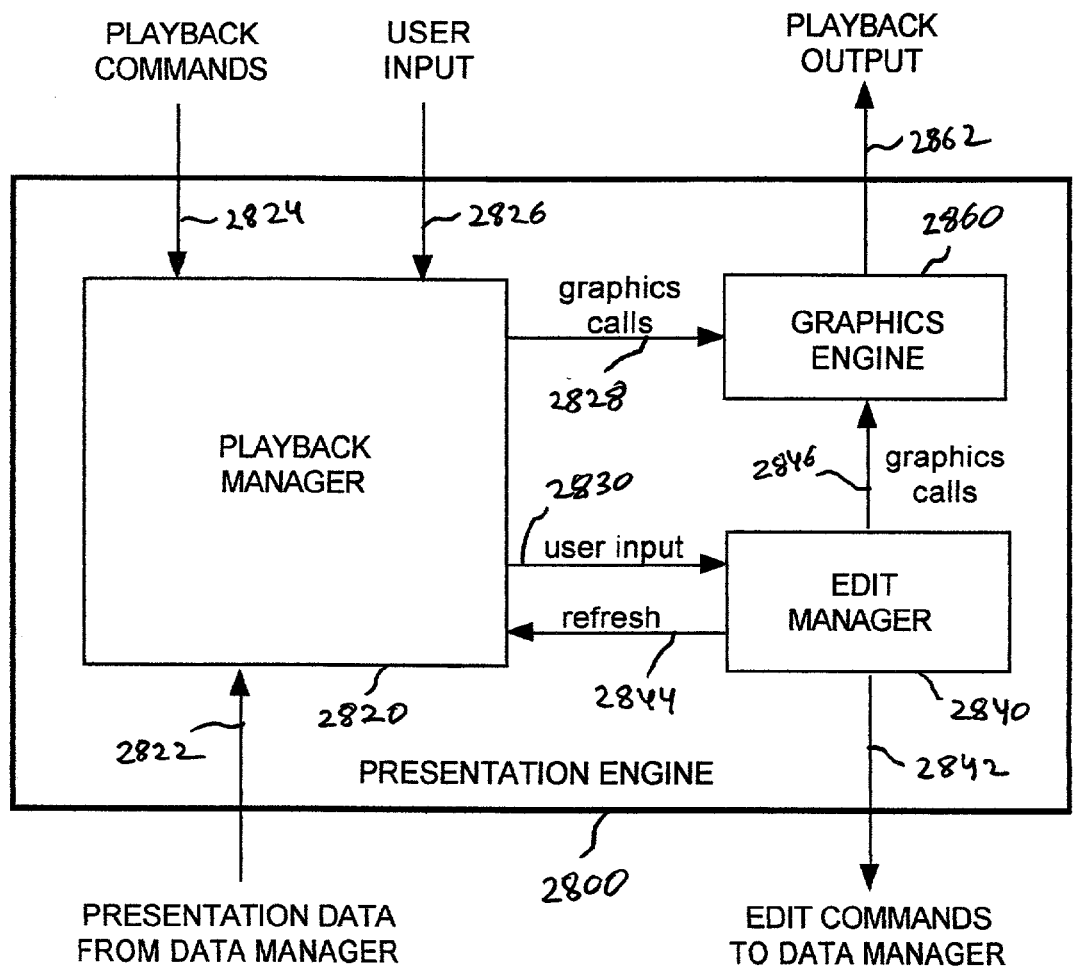
FIGS. 28–30 illustrate block diagrams of the presentation engine component of the systems of FIGS. 22 and 23, according to an embodiment of the present invention.

We turn now to a discussion of the presentation engine of FIGS. 22 and 23. A block diagram of the currently preferred embodiment of the presentation engine 2800 is shown in FIG. 28. Playback manager 2840 provides playback of objects in response to playback commands 2824 and user input 2826, sending graphics call 2828 to the graphics engine 2860 which provides playback output 2862 to one or more playback displays. In edit mode, the playback manager routes user input 2830 to the edit manager 2840, which responds to the user input by modifying presentation data via edit commands 2842 to the data manager (and also calls the graphics engine and playback manager to keep the playback output of objects being edited up to data).

Figure 29:
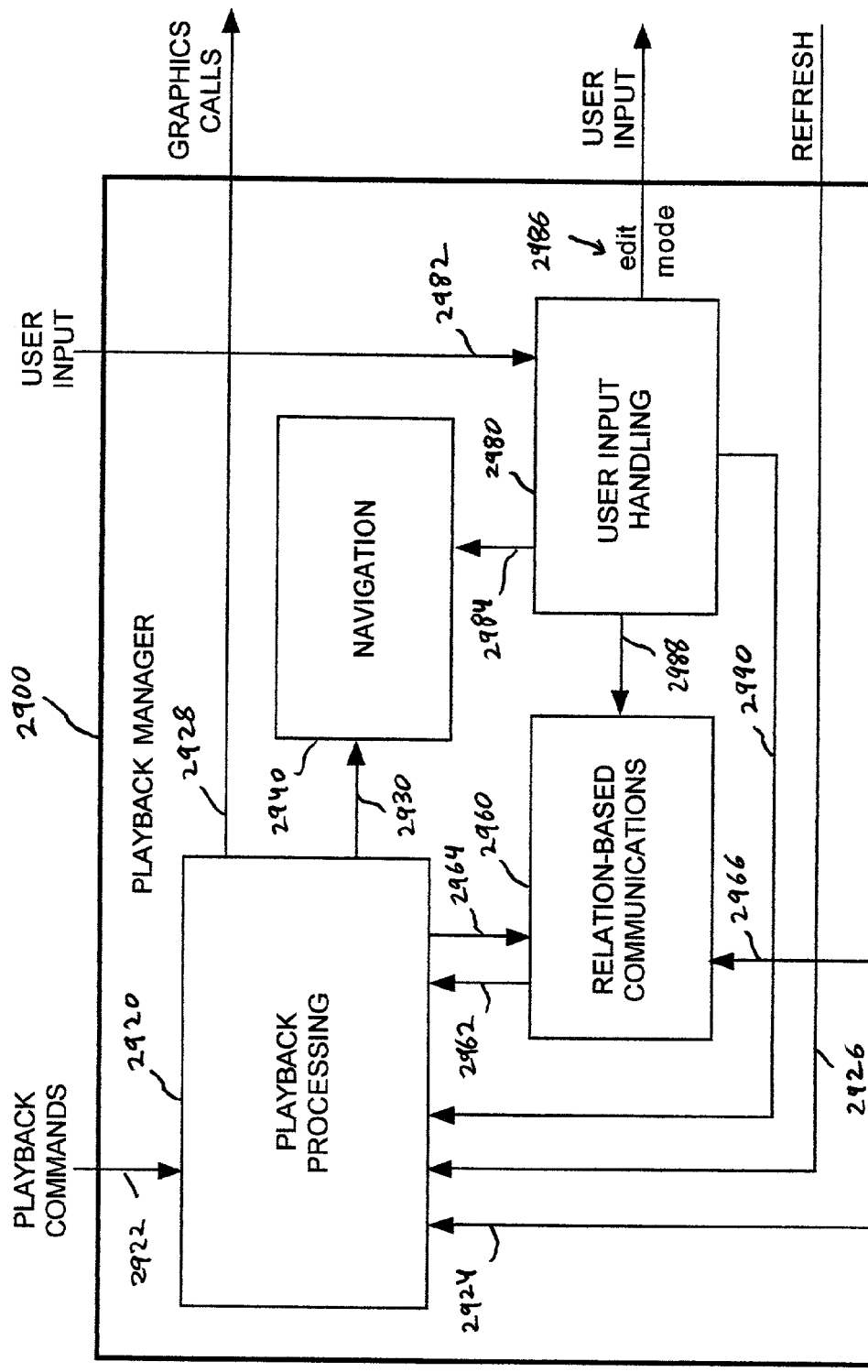

In FIG. 29 we see the internal structure of the playback manager of FIG. 28. Playback manager 2900 includes a user input handling block 2980 which routes user input to any of the other functional blocks: navigation block 2940, relation-based communications block 2960, and playback processing block 2920. The navigation block also receives navigation commands from the playback processing block. The relation-based communications block receives commands 2964 from the playback processing block, and reads presentation data 2966 in order to respond appropriately 2962.

Figure 30:
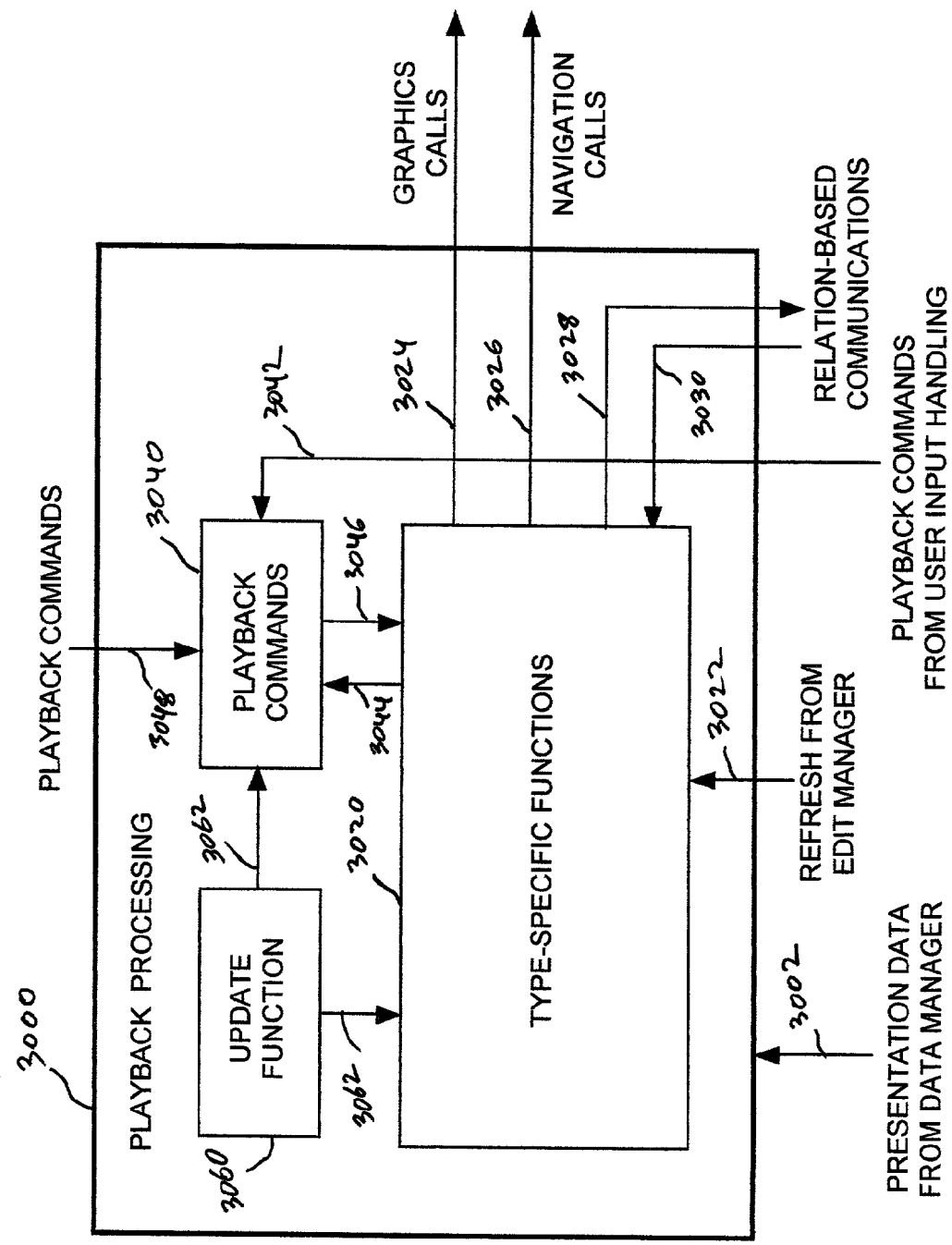

In FIG. 30 we see the internal structure of the playback processing block of FIG. 29. The playback commands block 3040 initiates the playback of objects, employing subroutine calls into the type-specific functions block 3020 for those aspects of object playback which differ according to object type. The update function 3060 is called by the system once per frame, and performs periodic and time-based processing for object playback (also calling type-specific functions as needed).

Figure 40:
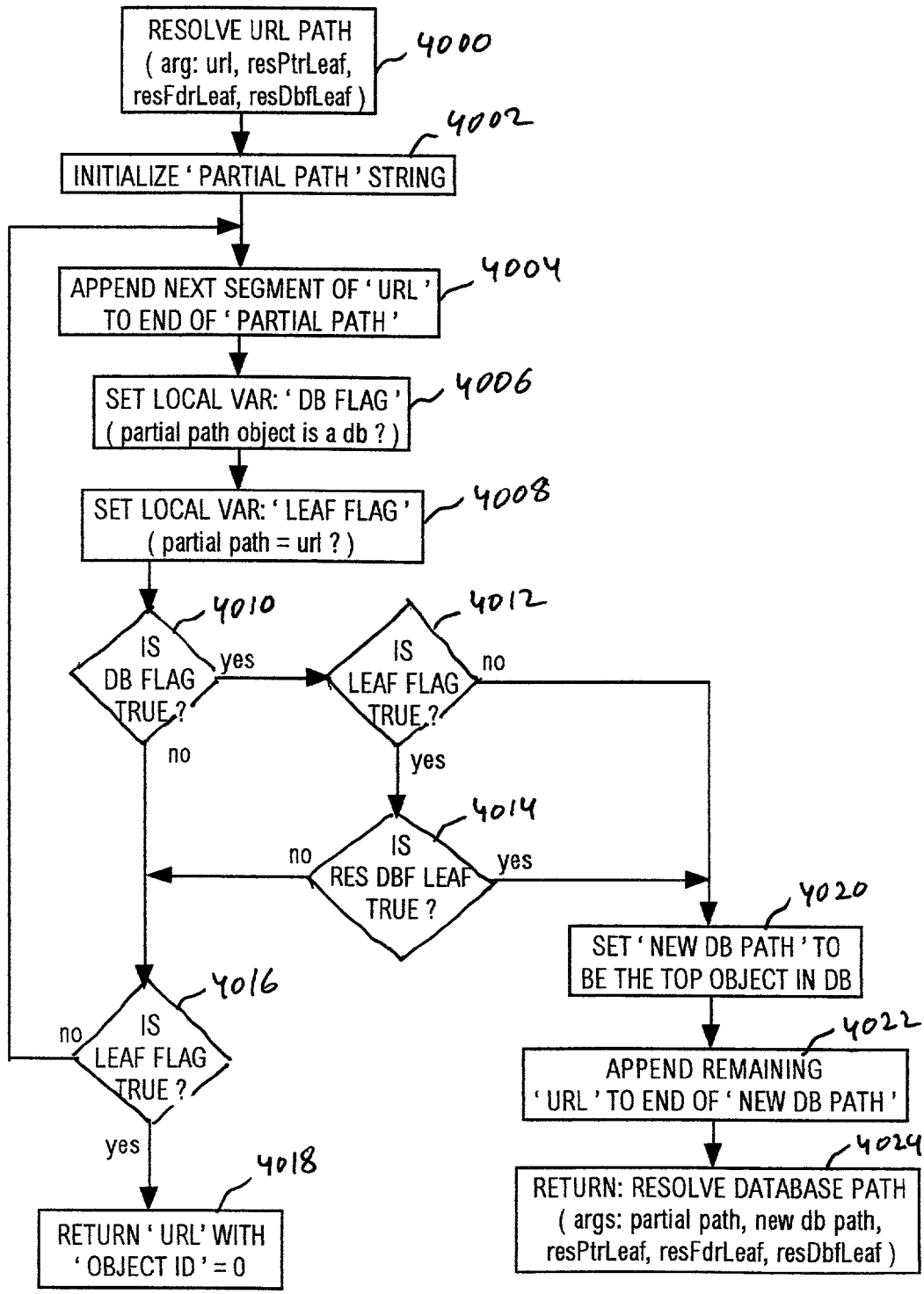

A flow diagram of the function for creating a new presentation is shown in the upper-left side of FIG. 40. In step 3100, we enter the function with a 'master object' path string. In step 3102, a call to the graphics engine is made to create a new canvas. In the present embodiment, a canvas is a data structure that includes an unique canvas ID, a draw list (described in the graphics engine disclosure), a scale factor called 'zoom', and a factor called 'scroll' in the x and y-axes to effect translation of the elements of the draw list in the output bitmap. When the call to the graphics engine in 3102 returns, it returns the canvas ID of the newly created canvas structure. Next, in step 3104, the 'master object' path string from 3100 and the canvas ID from 3102 are stored in the presentation data structure (3108). Finally, in step 3106, the canvas ID is returned to the caller of this function which is used to identify the presentation data structure in subsequent calls to other presentation engine functions.

Figure 31:
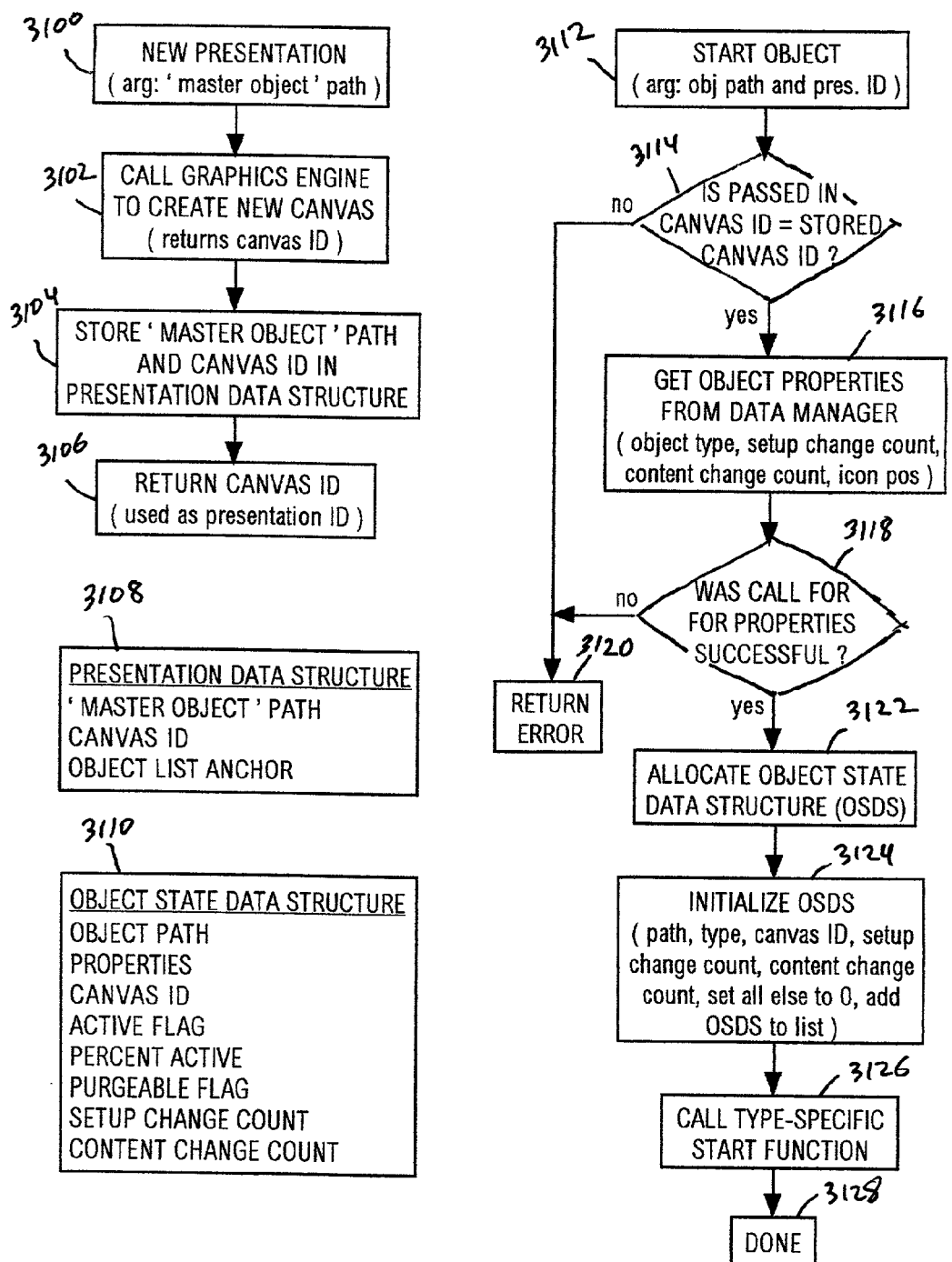
FIGS. 31–33 illustrate software flow diagrams showing procedures of the presentation engine component, according to an embodiment of the present invention.

A flow diagram of the function of starting an object is shown in the right half of FIG. 31. In step 3112, we enter the function with an object path and presentation ID. In the present embodiment, there is only one presentation at a time, so in step 3114, a check is made to see if the presentation ID from 3112 matches the canvas ID stored in the presentation data structure (3108). If they do not match, then return to caller with error code (3120). If there is a match, then in step 3116, query the data manager with the object path from 3112 for the following attributes: object type, presentation data (such as x-position, y-position, scale, etc.), setup change count, content change count. If the data manager in step 3116 returns with a fail code, the object may no longer exist in the data manager, so in this case, go to step 3120 to return from this function with a fail code. Otherwise, in step 3122, using the system memory services, allocate an Object State Data Structure (OSDS), which is specified in 3110. Next, in step 3124, fill the fields of the OSDS (x110) with the object path (from 3112), type (from 3116), presentation data (from 3116), canvas ID (from 3112), setup change count (from 3116), content change count (from 3116) and set all other fields to zero. Once the fields have been initialized, the OSDS is added to the object list in the presentation data structure (3108). Next, in step 3126, each type of object (text, picture, container, etc.) has a start callback function known to the presentation engine and at this step this type-specific start function is called. Note that the container start function calls this function to start its CCO, which then calls this function on zero or more (based upon user-defined rules in the CCO's setup data) of its contained objects, some of which may be containers which would continue this process. Therefore a single call to this function currently being described may cause many presentation objects to start. Once step 3126 has returned, the function is complete 3128.

Figure 32:
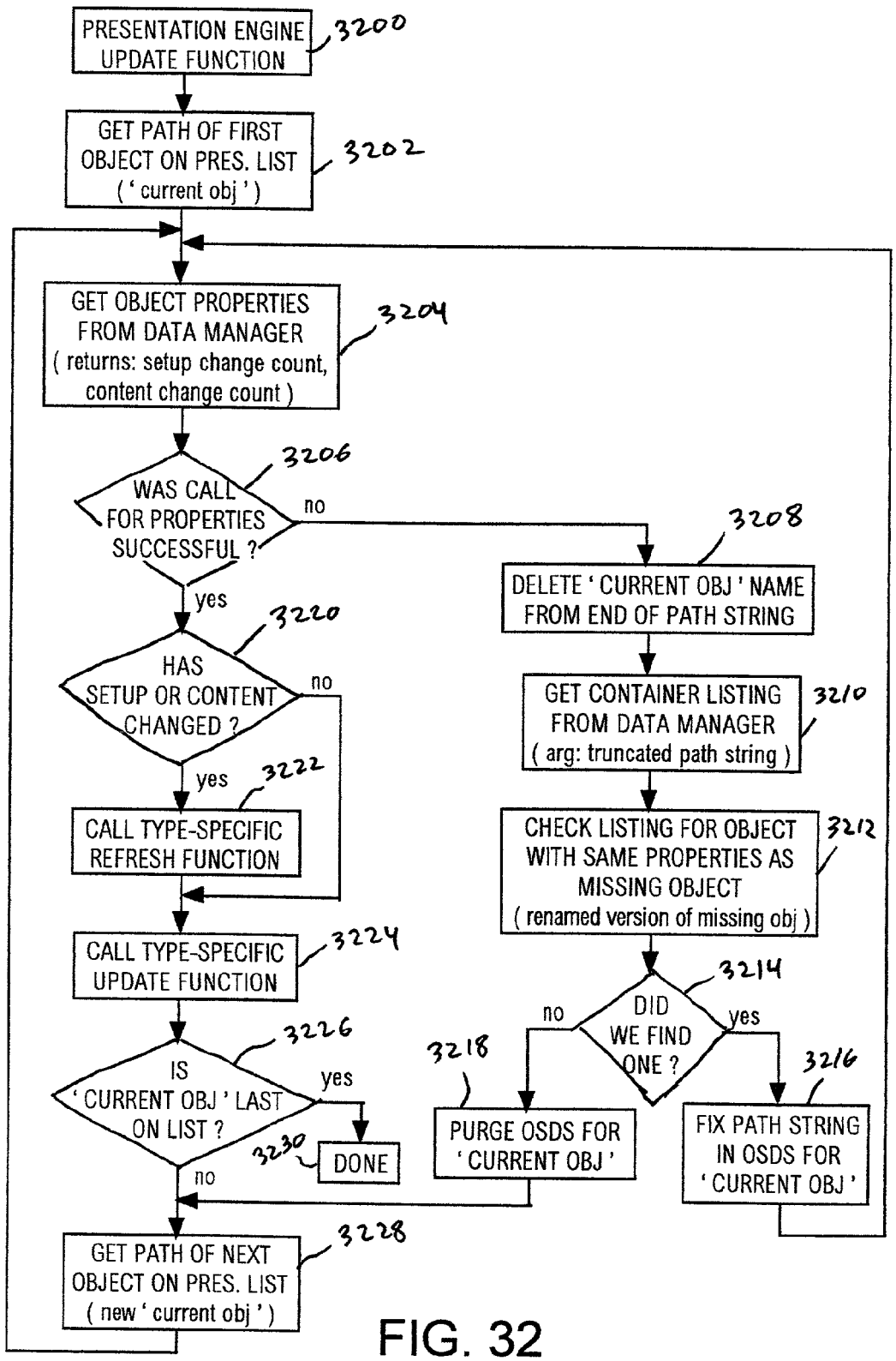

A flow diagram of the function of updating the presentation engine is shown in FIG. 32. Step 3200 is the enty-point of the function. Next, in step 3202, 'current obj' is set to be the first object in the presentation data structure's object list (3108). Then in step 3204, query the data manager with the object path stored in 'current obj' for the following attributes: object type, setup change count, content change count. Next, in step 3206, check the return code from the call to the data manager in 3204. If the return code is a fail code, the object may no longer exist in the data manager or it may have been renamed since the previous call to this function, so go to step 3208 to determine what happened. In step 3208, build a temporary truncated path string by copying the object path from 'current obj' into this string and then removing the last segment off of this path which effectively removes the object name and represents the container path of 'current obj'. With this container path, in step 3210, query the data manager for a list of objects in the container. In step 3212, go through each object in this list, calling the data manager for the presentation data that is stored in the OSDS (3110). If these presentation data just acquired from the data manager match the same in the 'current obj' OSDS, assume that the object has been renamed inside the data manager, and go to step 3214. At step 3214, if we found a match in the previous step (3212), then go to step 3216, otherwise go to step 3218. At step 3216, add the new object name to the temporary truncated path string that was created in step 3208, and store this fixed up string into the 'current obj' OSDS (3110) 'path' field and return to step 3204 to resume the update loop. At step 3218, remove 'current obj' from the presentation data structure (3108) object list, and deallocate the memory it occupies, and go to step 3228. If the check in step 3206 is positive, the data manager recognizes the object path of 'current obj', so go to step 3220. In step 3220, compare the setup change count and content change count acquired in step 3204 against the setup change count and content change counts inside the 'current obj' OSDS (3110). If there is no discrepancy between either the two setup change counts or the two content change counts, go to step 3224, otherwise go to step 3222. In step 3222, each type of object (text, picture, container, CCO, etc) has a refresh callback function known to the presentation engine, which is called during this step. Next, in step 3224, each type of object has an update callback function known to the presentation engine, which is called during this step. Since all objects that need updating are stored in the presentation data structure (3108) object list, container and CCO object update callbacks do not need to pass the update call to their contained objects. Next, in step 3226, compare 'current obj' with the last object in the presentation data structure (3108) object list. If they are the same, then go to step 3230 and the function is complete; otherwise go to step 3228. In step 3228, set 'current obj' to be the next object in the presentation data structure (3108) object list and go to step 3204.

Figure 33:
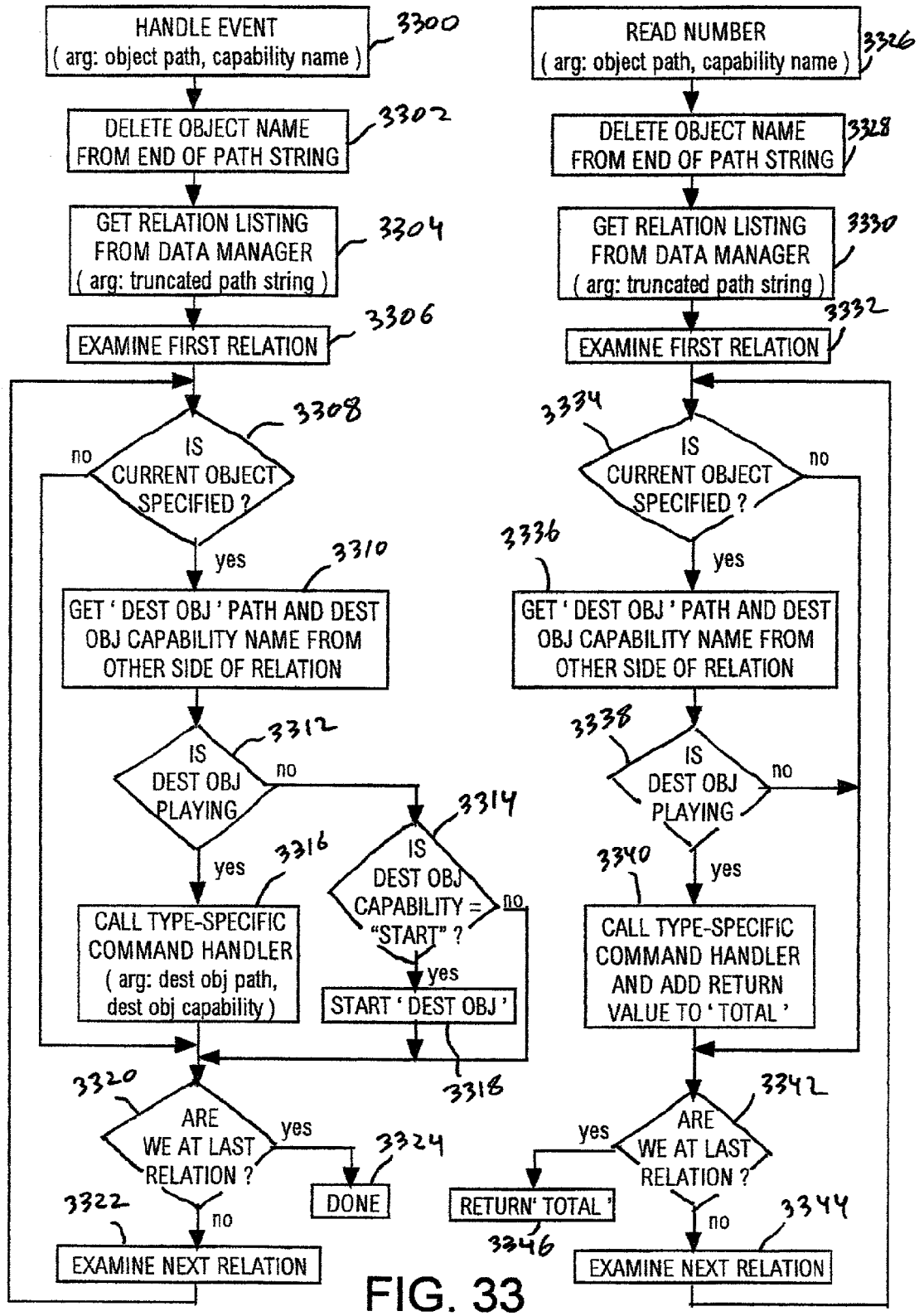

A flow diagram of the function for a presentation object handling an general event is shown in the left half of FIG. 33. In step 3300, we enter the function with an 'object path' string and a 'capability name' string. Next, in step 3302, create a temporary container path string by copying in 'object path' (3200) and removing the last segment of the path. Next, in step 3304, query the data manager for all relations contained within the temporary container path string (3202). In the present and preferred embodiment, the content data of container object stores (among other things) a count of the number of relations, and an array of relation structures. This preferred relation structure relates exactly two objects directly contained by the container, by specifying each object name of the two objects and the capablity of each side of the relation. So, in step 3304, a list of these relations for the parent container of the 'object path' (3200) is returned by the data manager. Next, in step 3306, the first relation in the list is examined. Next, in step 3308, the object name on both sides of the relation are examined with the 'object path' (3200) by temporarily creating a path for each object name that is the temporary container path concatenated with each object name in the relation, and by comparing each of these new temporary paths with 'object path' (3200) and then compare the capability name from each side of the relation with 'capability name' (3200). If neither of these paths match 'object path' (3200) or if one or both paths match but the capability name(s) do not match 'capability name', go to step 3320. Otherwise, go to step 3310. In step 3310, create a temporary destination object path string by concatenating the temporary container path (3202) with the side of the current relation that doesn't match 'object path' (3200) and 'capability name' (3200); also remember this side of the relation when subsequent steps reference the 'destination capability'. Next, in step 3312, call the presentation engine object playback status function with 'temporary destination object' (3210) as a parameter. If the object is playing, then each type of object (text, picture, container, CCO, etc.) has a command handler callback function known to the presentation engine, which is called to process this command (step 3316) using the 'temporary destination path' and 'destination capability' as parameters. If the object is not playing, then in step 3314, if 'destination capability' is the 'start object' command, then go to step 3318, otherwise, go to step 3320. In step 3318, each type of object (text, picture, container, etc.) has a start callback function known to the presentation engine and at this step this type-specific start function is called. In step 3320, a check is made to see if we're at the last relation in the list acquired in step 3304, if so, the function is done, go to step 3324. Otherwise, in step 3322, examine the next relation in the list and jump to step 3308 to continue the loop.

A flow diagram of the function for a presentation object handling a read number event is shown in the right half of FIG. 33. In step 3326, we enter the function with an 'object path' string and a 'capability name' string. Next, in step 3328, create a temporary container path string by copying in 'object path' (3326) and removing the last segment of the path. Next, in step 3330, query the data manager for all relations contained within the temporary container path string (3328), and a list of these relations for the parent container of the 'object path' (3326) is returned by the data manager. Next, in step 3332, the first relation in the list is examined. Next, in step 3334, the object name on both sides of the relation are examined with the 'object path' (3326) by temporarily creating a path for each object name that is the temporary container path concatenated with each object name in the relation, and by comparing each of these new temporary paths with 'object path' (3326) and then compare the capability name from each side of the relation with 'capability name' (3326). If neither of these paths match 'object path' (3326) or if one or both paths match but the capability name(s) do not match 'capability name', go to step 3342. Otherwise, go to step 3336. In step 3336, create a temporary destination object path string by concatenating the temporary container path (3328) with the side of the current relation that doesn't match 'object path' (3326) and 'capability name' (3326); also remember this side of the relation when subsequent steps reference the 'destination capability'. Next, in step 3338, call the presentation engine object playback status function with 'temporary destination object' (3336) as a parameter. If the object is playing, then each type of object (text, picture, container, CCO, etc.) has a read number callback function known to the presentation engine, which is called to process this command (step 3340) using the 'temporary destination path' and 'destination capability' as parameters. If the object is not playing, then in go to step 3342In step 3342, a check is made to see if we're at the last relation in the list acquired in step 3330, if so, the function is done, go to step 3346. Otherwise, in step 3344, examine the next relation in the list and jump to step 3334 to continue the loop.

Each type of object (text, picture, container, CCO, etc) has a set of callback functions known to the presentation engine. We shall call these type-specific functions (TSF). These callbacks include functions for: Starting the object ("start command"), stopping the object ("stop command"), periodic update function("update function"), changed notifier ("refresh function"), communication response function ("CRF"), polling a flag ("flag poll"), number query, text query.

We now look at the type-specific functions (TSF)in the presentation engine. Functionality that is general to most object types is outlined, followed by an explanation of specific deviations by type.

In the start commands for general media types, the TSF callback reads the object's setup and content from the data manager. Then if not in edit mode, the TSF sets up zoom-in and fade-in timers, if needed. Otherwise, with edit mode, there is no zoom-in or fade-in. Then, the TSF adds the media type to the playback display's drawlist, and initializes the draw list item's basic parameters. Then, it contacts any object connected to it's "Starting" relation by sending out a notification pulse.

In the start command for container objects, the container TSF first acquires the its setup data via the data manager. If this container (as determined by the setup data) represents a sub-display in the playback window, then (a) if not in edit mode, set up fade and zoom timers, if needed; (b) create the sub-display item inside of the playback display list. Next, if the CCO doesn't exist, send a start command to CCO. Finally, it contacts any object connected to it's "Starting" relation by sending out a notification pulse.

In the start command for CCO, the CCO TSF acquires the CCO setup data via the data manager. Next, set the background color, and if more than one CCO is active without sub-displays, this color contention is resolved by some ordering of the CCO. Next, count the startable (arbitrary qualification, the rule in present embodiment: not started by other objects) number of items in the container and make a random index from 0 . . . count−1. Then, go though all objects. If a boolean field in the setup data called 'randomStartFlag' is set to true, then send a start command via the presentation engine to the object which is indexed by the random index; otherwise, send start command to all objects not started by other objects.

In the stop commands for media types, first read the setup data to determine whether an exit (fade-out, zoom-out, etc) is needed or just a hard stop will do. Next, if an exit is needed, set up the exit timers, and leave, the update function handles the exit and the stop. If hard stop, then remove media item from playback display draw list and remove object's OSDS from presentation data structure, deallocate its memory and leave.

In the stop command for the container type, first read the setup data to determine whether an exit (fade-out, zoom-out, etc) is needed or just a hard stop will do. Next, if an exit is needed, set up the exit timers, and leave, the update function handles the exit and the stop. If hard stop, send stop command to CCO, remove sub-display item from playback display and deallocate resources.

In the stop command for the CCO type, stop each object in the CCO's container path. In another pass through the contained objects, any non-CCO object that is still playing has its 'ccoHaltedFlag' set. If any objects are exiting and the CCO's 'instantStopFlag' is not set, return with success code to let the CCO gradually exit with the other objects. Nothing is exiting, so stop hard-stop CCO and then hard stop CCO's container object.

In the update function for media and container objects, read system time and update processes as per setup data, which includes automatic modulation of presentation parameters, entrances (zoom-in, fade-in, etc), exits (zoom-out, fade-out, etc), timers, smooth repositioning [whenever a pointer object is stopping and another pointer object with the same base object is starting if the objects in question are graphical the graphic item for the stopping object will not be stopped but will rather be moved smoothly to the screen position indicated by the setup data for the starting object and will thereafter be managed by the starting object]. Next, check for process end; if ended, perform needed actions, initiate object interactions and update OSDS. Next, initiate 'info-sink' object interactions, specifically if relation exists with connector to another object's flag, number or text query, this query happens every update function.

In the update function for CCO objects, go through the list of objects in this CCO's realm, excluding the CCO, if no objects are playing, call the CCO's stop function.

The refresh function is called when setup or content data changed by a TSF update function or edit manager. All TSF refresh functions take on a similar form: call data manager to get updated setup and/or content and update OSDS and graphics engine with new data.

The communication response functions (CRF) respond to relation-based communications. These are handled by execute a defined 'action', and returning a number, flag, or text. For CCO's, propagation of relations across hierarchical boundaries by associating relational capabilities on CCOs with complementary relational capabilities on their enclosing container objects—this effectively "busses" communications to higher levels in the heirarchy.

Finally, for procedural objects, the TSF are less well-defined than standard media objects. The process-defining data is interpreted at runtime, and they can have interactions with other objects via relation-based communications. Specifically, we'll look at vector objects and script objects.

A vector object is basically tracks of numbers arranged in a timeline (it's similar to MIDI seq playing ctrl tracks, and in fact can use Standard MIDI File format (MMA)). The vector data is offered to other objects as continuously updating number output. There can be markers which issue a pulse to objects with relations to the pulse output 'source'.

A script object (which can be java script or other conceivable scripting language) can provide numbers, flags, text, and pulses to object with relations to these sources.

Figure 34:
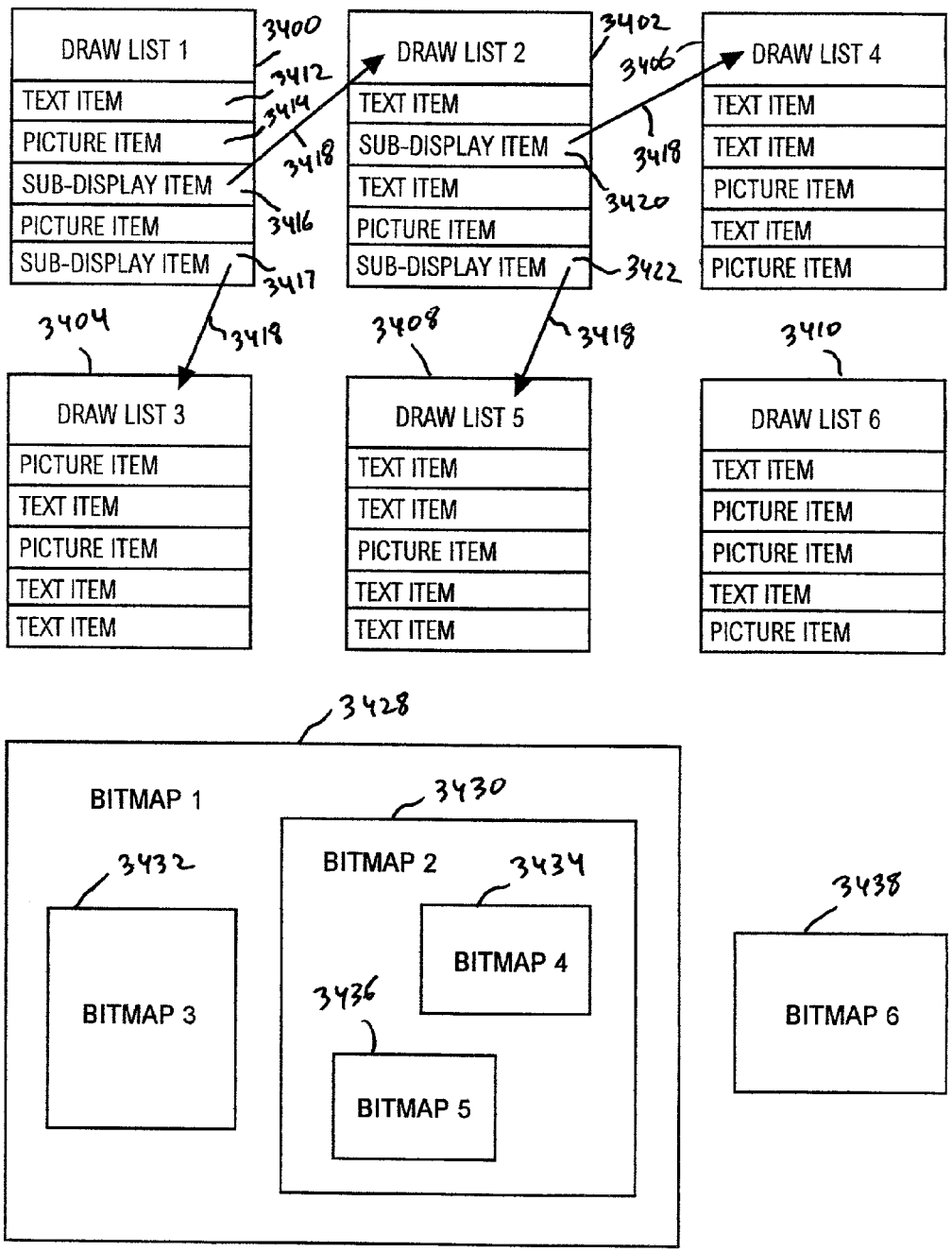
FIG. 34 illustrates a block diagram of the graphics engine component of the systems of FIGS. 22 and 23, according to an embodiment of the present invention.
Figure 35:
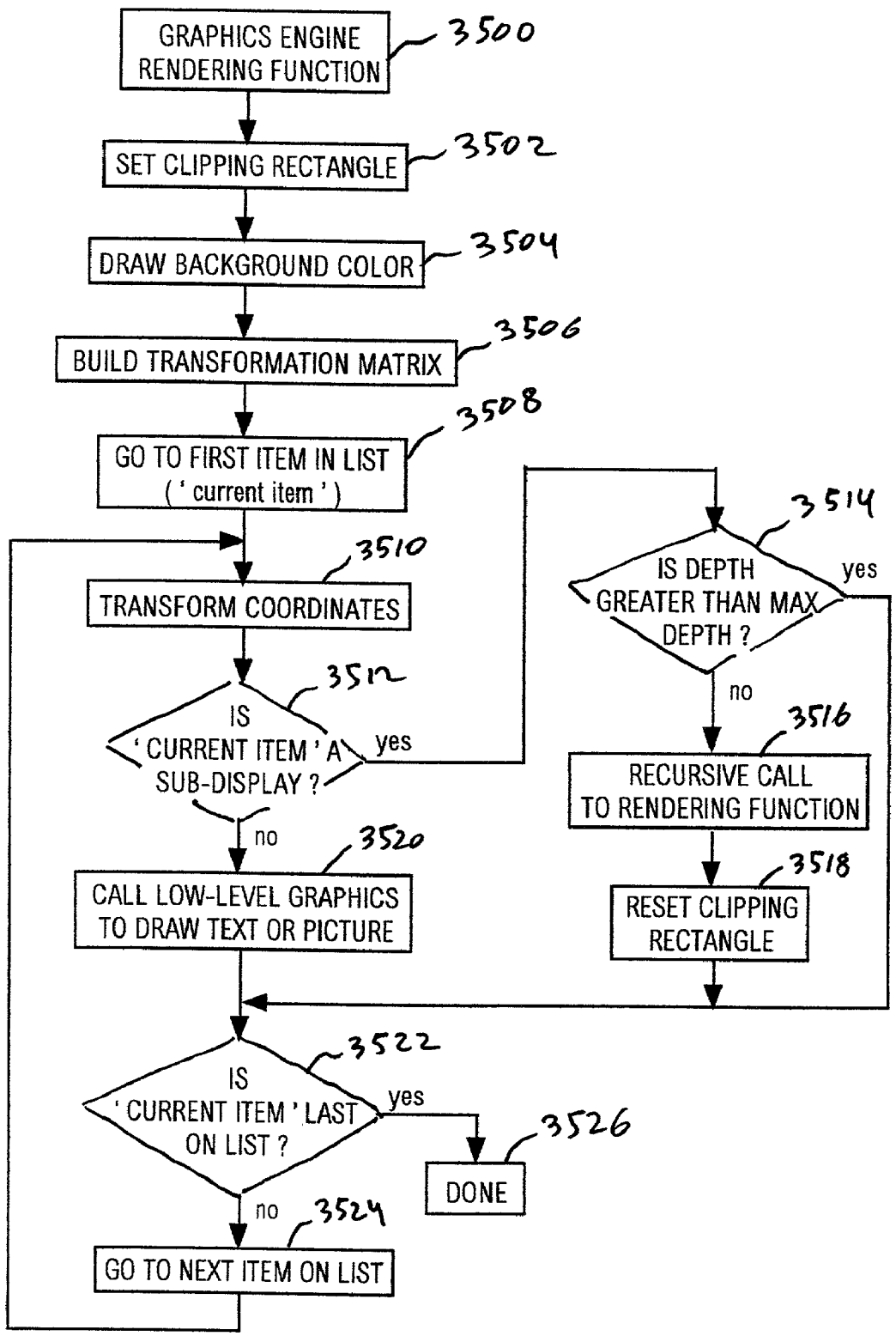
FIG. 35 illustrates a software flow diagram showing procedures of the graphics engine component, according to an embodiment of the present invention.

A conceptual diagram of this embodiment of the graphics engine component is illustrated in FIG. 34, which depicts a representation of draw list hierarchies and their output as nested bitmaps according to embodiments of the present invention. The graphics engine contains exemplary draw lists 1 through 6 (elements 3400, 3402, 3404, 3406, 3408, 3410, respectively). Each draw list may include text items 3412, picture items 3414, and sub-display items 3416, as well as other visual media (not shown) such as geometric shapes, animations, video clips, etc.

As seen in the exemplary draw lists of FIG. 34, the sub-display items 3416 of draw list 1 (3400) are hierarchical links 3418 to draw lists 2 and 3 (3402 and 3404), indicating that the contents of draw lists 2 and 3 (3402 and 3404) are to each be considered as individual and hierarchically subordinate items within draw list 1 (3400). In a similar fashion, the contents of draw lists 4 and 5 (3406 and 3408) are hierachically subordinate items within draw list 2 (3402). Draw list 6 (3410), like draw list 1 (3400), is an independent item within the graphics engine hierarchy; the contents of draw list 6 (3410) is distinguished from the contents of draw lists 2–5 (3402, 3404, 3406, 3408, respectively) in that it is not nested within, and is thereby not inherently linked to, another draw list.

FIG. 34 also illustrates how draw list hierarchies, such as the above, may be rendered within some exemplary system memory structures. In a preferred embodiment, the rendering functionality of the graphics engine, when rendering a draw list into a bitmap, goes through all of the graphic items in the draw list, including those in any hierarchically nested draw lists, and renders them into a bitmap according to the above mentioned display parameters, rendering nested draw lists (such as draw lists 2 through 5 in this example) as bitmaps within bitmaps. In the current example, draw list 1 (3400) is an independent draw list, and is represented by bitmap 1 (3428) located in the lower half of FIG. 5. Bitmap 1 (3428) is an independent bitmap that contains all of its hierarchically subordinate draw lists within it in the form of dependent, nested bitmaps. Thus bitmap 1 (3428) contains bitmaps 2 and 3 (3430 and 3432) directly within it, and bitmaps 4 and 5 (3434 and 3436) indirectly within it as they are nested within bitmap 2 (3430). Similarly, bitmaps 4 and 5 (3434 and 3436) are rendered as bitmaps within bitmap 2 (3430) because draw lists 4 and 5 (3406 and 3408) are hierarchically subordinate to draw list 2 (3402). Finally, FIG. 34 illustrates that independent draw lists, such as draw list 6 (3410), are rendered as independent bitmaps, as seen by independent bitmap 6 (3438) that corresponds to draw list 6 (3410).

A flow diagram of the function for rendering a draw list into a bitmap is shown in FIG. 1. In step 3500, we enter the function with a bitmap buffer, a bitmap width and height (which are passed to the low-level graphics library when drawing), the absolute coordinate of the top-left corner, the bitmap coordinate of the upper-left corner, the logical width and height of the bitmap, and the x and y scale of the bitmap, which are initially set to 100%, and a depth value which is initially set to zero. First, in step 3502, the low-level graphics library's clipping rectangle is set. This rectangle's upper-left corner is defined by the bitmap coordinate of the upper-left corner from step 3500 and the rectangles width and height is calculated from the logical width and logical height from step 3500 scaled by the x and y scale from step 3500, respectively. Next, in step 3504, the entire bitmap area covered by the clipping rect is filled with a background color which is stored in the draw list's data structure.

In step 3506, a transformation matrix is built. When items are to be rendered, this transformation matrix is used to transform from absolute coordinates <glossary> to bitmap-relative coordinates <glossary>. This technique of using transformation matrices to convert between coordinate systems is a standard practice in 2-D and 3-D graphics programming, covered in detail by almost all graphics programming textbooks; Shaum's Outlines Graphics Programming describes the type of matrices used by the current embodiment. Now, 'current item' is set to the first item in the draw list in step 3508. In the preferred embodiment, the draw list is stored in sorted order, bottom to top, so the render loop can employ the standard painter's algorithm <glossary>. Next, in step 3510, the coordinates of the 'current item' are transformed by the transformation matrix from step 3506.

Then, in step 3512, the type of 'current item' is queried to check if it is a sub-display. If positive, then in step 3514, compare depth (from 3500) to a predetermined maximum depth value, or horizon. If incrementing the depth would exceed the maximum depth, then the sub-display is not rendered; otherwise proceed to step 3516. In step 3516, a recursive call is made to render the sub-displays In making the recursive call, the coordinate parameters are scaled by the draw-list zoom and by x and y scale (from 3500) and by 'current item' scale and stretch; the depth parameter is passed as depth+1. Upon return from the recursive call, in step 3518, reset the low-level graphics library clipping rectangle with same values as step 3502. If the query result in step 3512 was negative, then in step 3520 the 'current item' is a text or picture object, so call the low-level graphics library to render that object to the bitmap. In step 3522 check to see if 'current item' is the end of this list. If not, then in step 3524, set 'current item' to the next item in the list and go to the loop top, which is step 3510; otherwise at step 3526, this function is done.

We now turn to a discussion of the data manager (2230, 2330) of the systems of FIGS. 22 and 23. With regard to functionality, the data manager provides other system components with access to presentation data, according to embodiments of the present invention. This functionality may include: the creating, opening and closing of databases; the provision of directories or other information about presentation data; the creation, reading, writing and deletion of presentation data, as well as other functions necessary for the effective management and manipulation of presentation data. Also, due to the practical importance of managing data efficiently, especially over a network, various embodiments involving performance optimization and network functionality form part of the present invention. Finally, in embodiments which make use of pointer objects, the data manager provides functionality that "resolves" the indirection in order to access the appropriate data.

Figure 36:
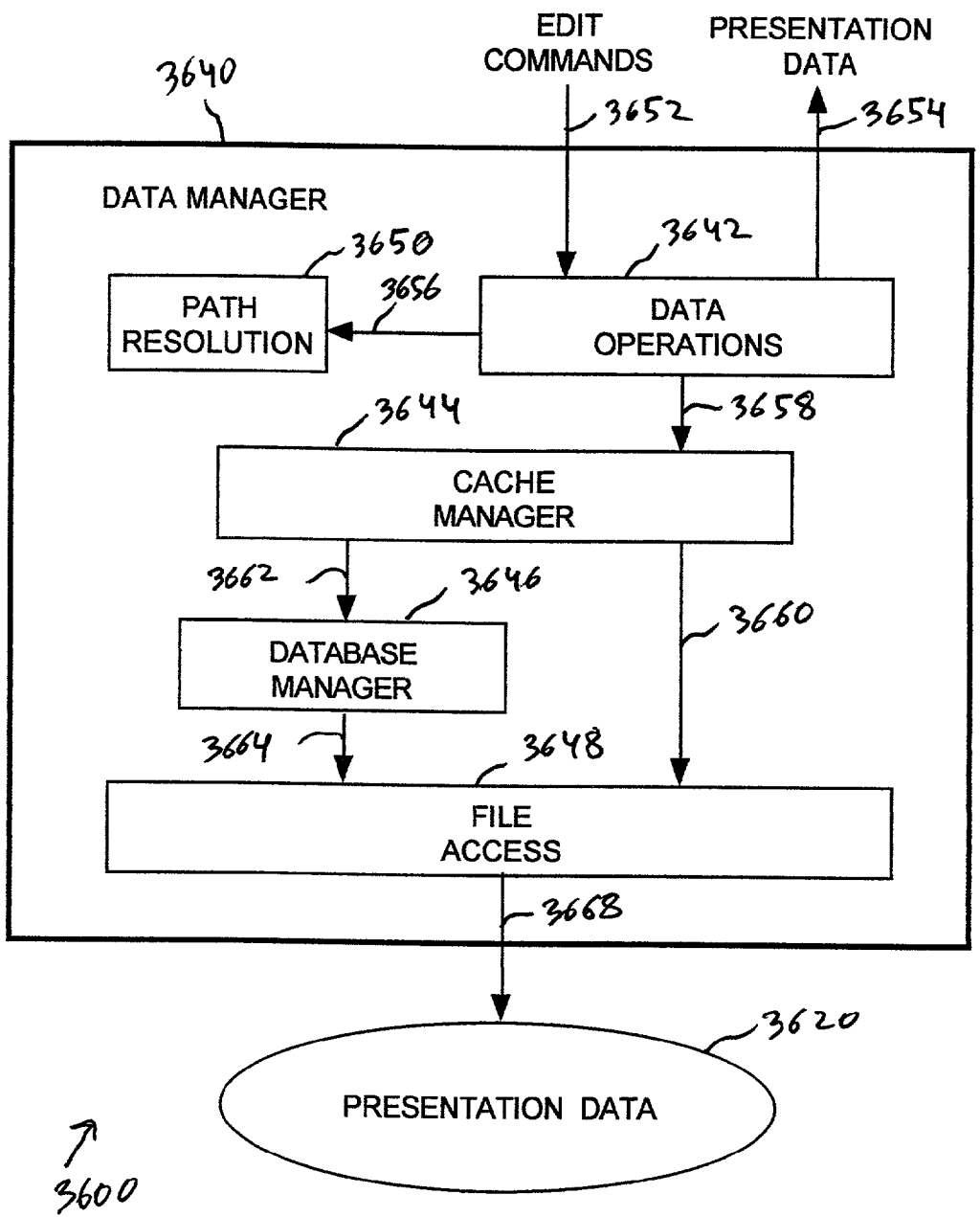
FIG. 36 illustrates a block diagram of the data manager component of the systems of FIGS. 22 and 23, according to an embodiment of the present invention.

Turning to FIG. 36, we see a block diagram of the data manager component of the systems of FIGS. 22 and 23, according to embodiments of the present invention. The data manager representation 3600 of FIG. 36 includes the data manager block 3640 and some exemplary presentation data 3620, which is accessible through the file and network services provided by the system. In the embodiment of FIG. 36, the data manager 3640 makes presentation data available to external system elements by responding to data requests, as represented by data output 3654. Additionally, in embodiments involving presentation authoring or manipulation, the data manager 3640 may also receive edit commands 3652 that can result in the addition, removal or modification of presentation data.

The system of FIG. 36 shows data output 3654 and edit commands 3652 being handled by data operations block 3642, which handles the requests and commands by reading and writing data to the cache manager 3644. The cache manager, in turn, is shown accessing the data either by reading or writing directly to the file access module 3648 in the case of HFX data, or by reading or writing data via the database manager 3646 in the case of database data. In either case, the file manager 3648 performs the requested read or write operation using the file or network services of the system. In addition, depending on the structure of the presentation data 3620 and the way in which it is identified by incoming requests or commands, the data operations block 3642 may employ the path resolution block 3650 to establish the physical location of the relevant data before performing the requested operations.

It should be noted that the presence and ordering of the functional blocks of data manager 3640, as shown in FIG. 36, is merely illustrative of one embodiment of the present invention. The essential role of data manager 3640, which is to provide access to presentation data, may be achieved in a minimum configuration with a much simpler mechanism, such as direct data access. Furthermore, to the degree additional functions and features represented by the functional blocks in FIG. 36 are included in embodiments of the present invention, these functions and features may be distributed within data manager 3640 (and in fact throughout the invention) in a variety of arrangements other than the one presented here. In the following discussion, it is the functions and operations themselves, not their modularization and arrangement, which comprise embodiments of the present invention. The operation of the functional blocks of the data manager 3640 will now be explained in more detail.

The data operations block 3642 provides a function interface to data manager 3640, and depending on the overall system configuration, the complexity of the data involved, etc., this function interface may provide varying levels of service. At minimum, it can receive data requests for presentation data, and can provide the requested data back to the caller via data output 3654. The requested data, in various embodiments, can include any of the data which might be found within presentation data (detailed in FIG. 37, below).

In various preferred embodiments, the functions provided by the data operations block 3642 can include edit operations performed on presentation data in response to edit commands 3652, and these can include creating items, duplicating items, renaming items and deleting items. In addition, various functions for reading and writing setup data, content data, relations (stored as content data for container objects but accessed via separate 'convenience' functions), etc., may be provided. All of these functions are extremely straightforward in system configurations where pointer objects are not supported, and perform their tasks in much the same way such services found in any data management system might. More unusual requirements are added to these functions when pointer objects and path resolution are included, and these are dicussed below after the basics of path resolution are covered.

The data operations block 3642 accesses data via the cache manager 3644, which provides prediction and caching functionality according to embodiments of the present invention. The cache manager pre-loads data from remote hierarchical relational databases and hierarchical file trees into a memory cache according to a predictive method in order to provide more immediate access to object data. The cache manager's predictive method for pre-loading uses the nesting structure of the virtual hierarchy to determine which data to load next, which in a preferred embodiment entails loading data for objects in the same container as and nested below any recently requested objects. Data previously loaded from a remote hierarchical relational database or hierarchical file tree is preserved in the memory cache for a period of time to provide more immediate access if it is needed again.

Figure 37:
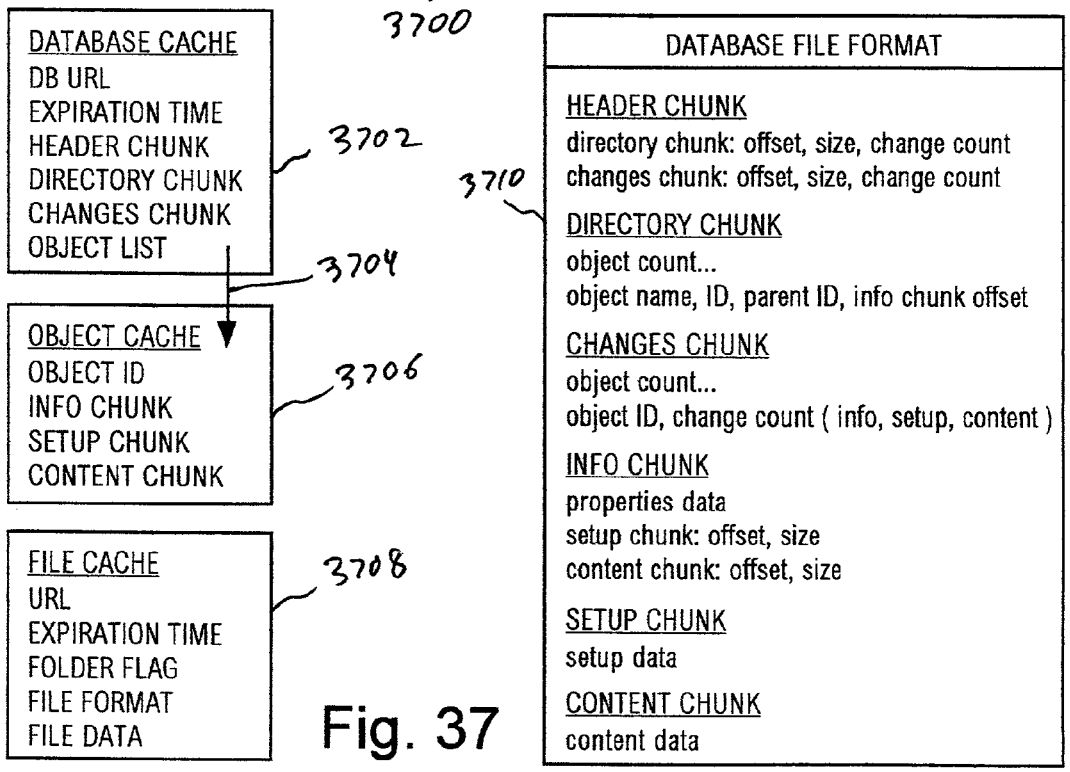
FIG. 37 illustrates the object model and database file format of the data manager component, according to an embodiment of the present invention.

In addition, the cache manager has the ability to detect when previously loaded data has been changed and is no longer valid. The exact mechanism is detailed below, but briefly, the database file format includes a 'change count' directory block that lists for each object in the database the number of changes that have been made to that object since its creation. By polling this block of 'change counts' and comparing it with the previously read version, the cache manger is able to determine on an object by object basis when object data previously loaded into the memory cache has changed and needs to be reloaded. By using a consolidated block of change counts for all the objects in a database file, there is no need to perform a separate polling operation for each object individually, which saves substantial time when operating over a network. Before detailing the operation of the various functional blocks of the data manager, some discussion of the data itself is in order. The data manager deals in a currency of data manager objects, with each object containing three forks of data: properties data, content data, and setup data. The object model of the data manager is represented in FIG. 37 in object model 3700. As can be seen from object model 3700, all of the object types share the same set of properties data, which includes type (picture, text, vector, script, container, CCO), icon position (for icon view in the control display), pointer flag and folder pointer flag. Also, as can be seen in object model 3700, the content and setup for each object type contain different sets of data as appropriate for each type. Of note is that the content data for container objects is the set of relations between the objects contained in that container object. Also of note is that the display settings and playback params for a container object apply only to its sub-display, and are used only if the sub-display flag is set.

FIG. 37 also shows two cache lists that are maintained inside the cache manager 3644, a database cache 3702 and a file cache 3708 (only one instance of each data structure is shown, but in the cache manager there are typically multiple instances maintained on lists). Additionally, inside of each database cache 3702 there is a list 3704 of cached objects 3706. Each item in the database cache represents a partial or full cache of a database file 3710.

The database file 3710 is optimized for minimal reads and has mechanisms for update detection, which is why it isn't stored in the file cache 3708. The database file is broken up into chunks: a header chunk that stores the list of objects for the entire database broken into two functional units: directory entries and change count entries. Each directory entry stores the object name, a non-zero, arbitrary, unique (to this database file) ID number, the ID number of the parent container (which is zero for the top object in the database internal hierarchy). Each changes chunk entry stores the change count for the properties data, setup data and content data, each which gets incremented when the corresponding properties, setup or content data chunk is modified. By comparing at regular intervals the change count for an item on disk with the change count in the cache, it is possible for the data manager to determine when its database objects are externally modified, such as when multiple users are sharing data over a network (as in FIG. 6B).

Figure 38:
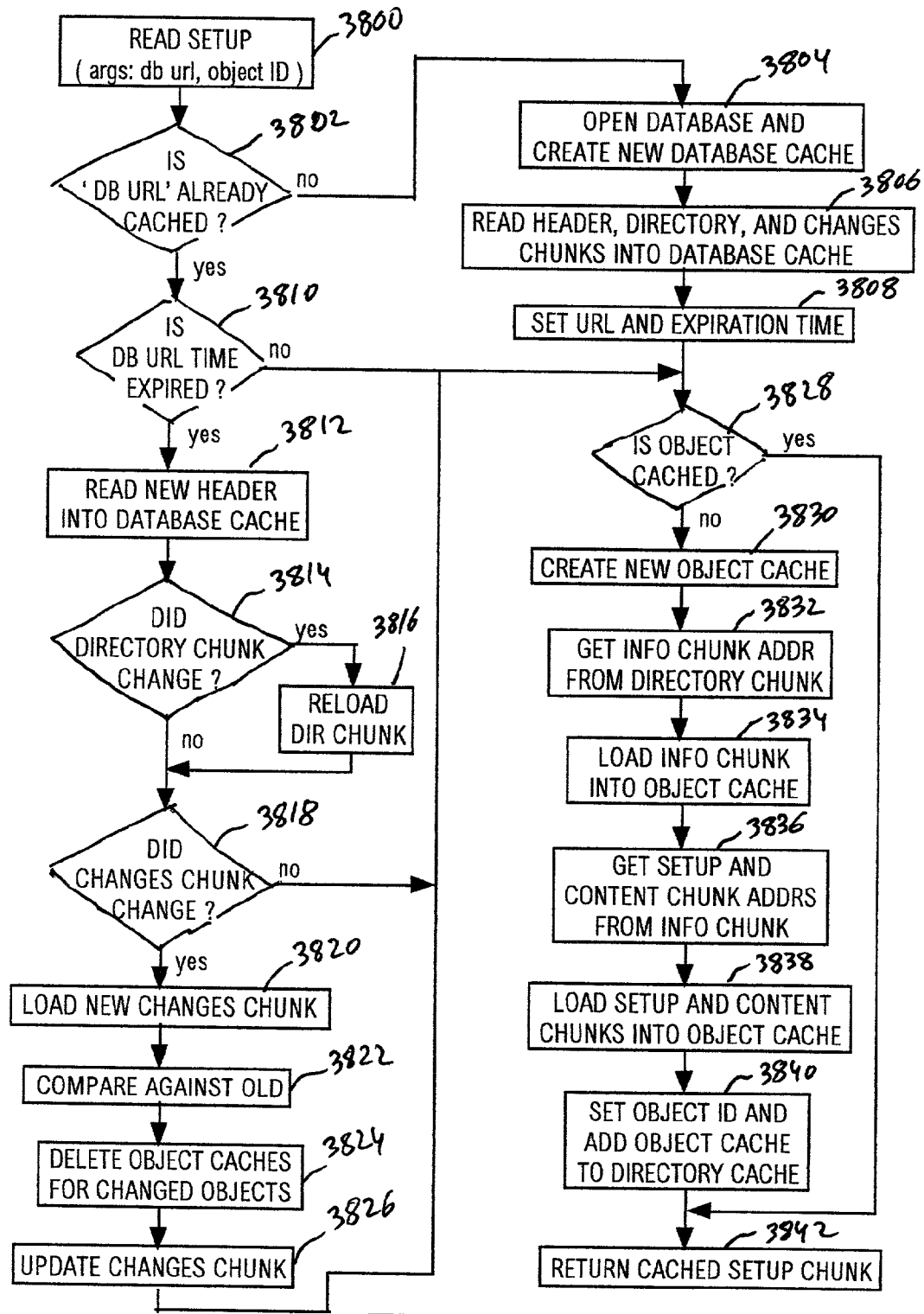
FIGS. 38–40 illustrate software flow diagrams showing procedures of the data manager component, according to an embodiment of the present invention.

A flow diagram of the function for reading the setup of an object is shown in FIG. 38. This function illustrates the way in which the database file format, in conjuction with the cache, is used to minimize data accessing (which improves system performance over a network) In step 3800, a database URL and object ID are passed in. Next, in step 3802, the database URL and object ID from step 3800 are compared with each item in the list of cached databases 3702 until a match for the database URL is made or the list is traversed without a match. If there wasn't a match, in step 3804, open the database file and add it to the database cache 3702. Next, in step 3806, read in its header, and lists of objects (directory chunk, changes chunk) into the cache, and in 3808 store the URL and set the expiration time to be something reasonable (under a minute).

If there was a match in step 3802, check the database cache item's expiration time against the system clock in step 3810. If it has expired, open the database file and read its header chunk into the database cache 3812. Compare the new directory chunk change count (part of the header) against the current directory chunk change count in step 3814. If there is a discrepancy, reload the directory chunk from the database file in step 3816. Next, in step 3818, compare the new changes chunk change count (part of the header) against the current changes chunk change count. If there's a discrepancy, reload the changes count chunk from the databasefile in step 3820 into temporary buffer. Compare each object's change count between the old and new changes count chunks 3822 and delete the obect cache (if any) for all changed objects 3824. Next, copy the temporary buffer from step 3820 into the database's changes count chunk storage.

In step 3828, go through the cached object list of the database. If we find the is object that matches the database URL and objectID from step 3800, return the address of the cached setup chunk (step 3842). Otherwise, create a new object cache entry in the cached database list of cached objects (step 3830). Then, in step 3832, find the object entry in the databases directory chunk, which contains the info (preferences) chunk file offset. Then, load the info chunk into the cached object as step 3834. Next, from the data in the info chunk, get the setup and content chunk file offsets as step 3836. Next, as step 3838, load the setup and object chunks into the cached object. Then, in step 3840, set the object ID into the cached object, and add this item to the cached database list of cached objects. Next in step 3842, return the address of the cached setup chunk (read in as part of step 3838).

The operations of the data manager discussed so far can provide effective management and structuring of data for the system of FIGS. 22 and 23. We now introduce the mechanism of path resolution, which allows objects to be interconnected into a virtual hierarchy. As mentioned above, path resolution occurs when clients make requests of the data manager. Before servicing the request, the data manager calls path resolution block 3650 and converts incoming root paths to physical paths before performing its data operations. Initially the root path is converted into a database path, which is like a root path except that the physical path (URL) of the database to which it applies is specified explicity.

Figure 39:
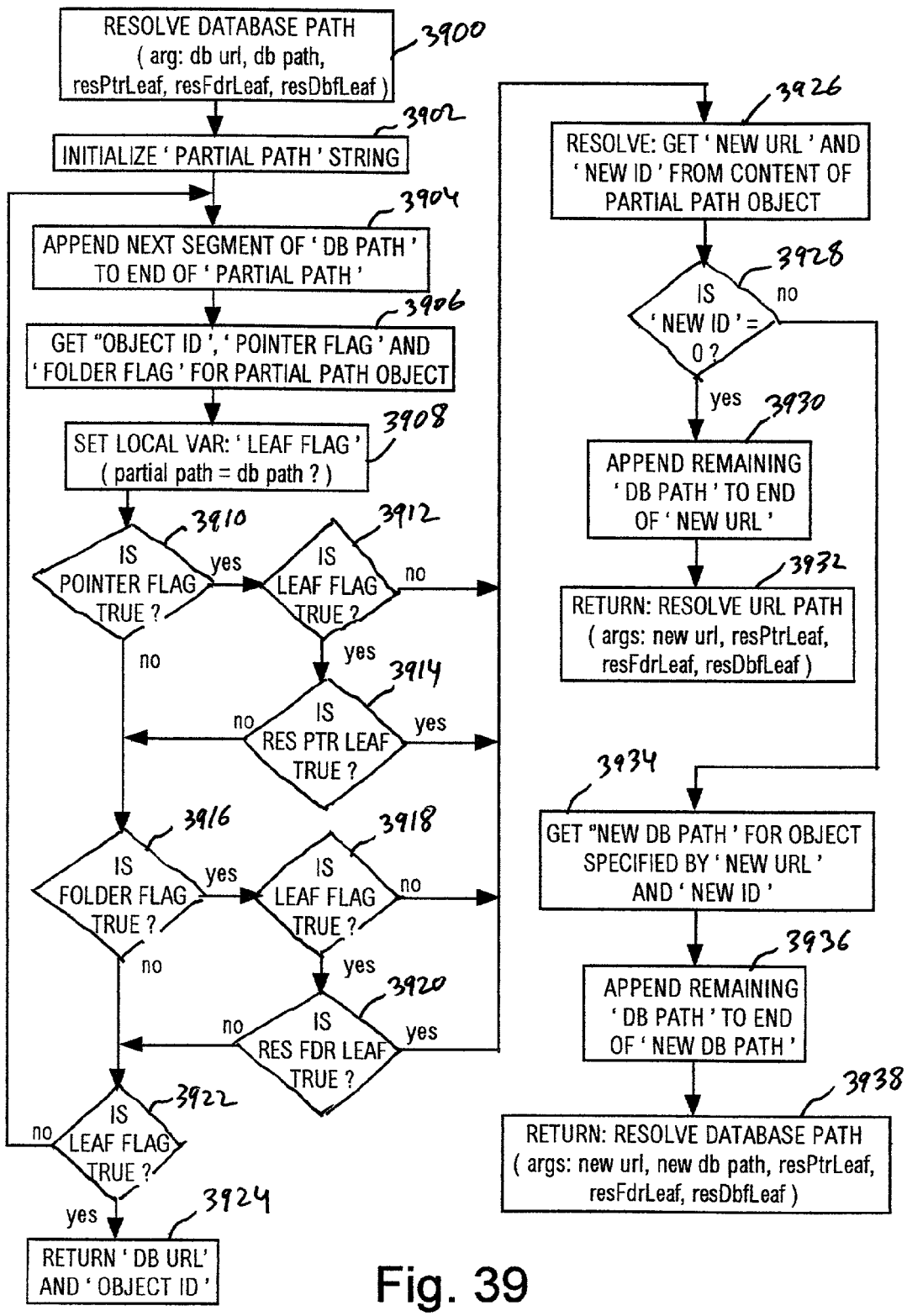

A flow diagram of the function of resolving a database path into a database URL and object ID is shown in FIG. 39. In step 3900, a database URL and a database path are passed in, as well as a 'resolvePointerLeaf', 'resolveFolderLeaf', and 'resolveDatabaseLeaf' flags. Next, in step 3902, a string variable 'partial path' is initialized to be empty. Next, at the top of a loop in step 3904, append the next segment (starting at the beginning) of the database path from 3900 to 'partial path'. Next, in step 3906, query the database for an object that corresponds to 'partial path'. This acquires the objectID for 'partial path' as well as the status flags 'pointer flag' and 'folder flag'. Next, in step 3908 set a local boolean variable 'leaf flag' to indicate if the segment appended in step 3904 is the final (or leaf) segment of the database path from 3900. Next, in step 3910, check if 'pointer flag' is set. If positive, check 'leaf flag' (step 3912). If 'leaf flag' is not set go to step 3926, otherwise go to step 3914.

Next, if 'resolvePointerLeafFlag' (from 3900) is set, go to step 3926, otherwise go to step 3916. Next, check to see if 'folder flag' (from step 3906) is set. If it is, check 'leaf flag' (step 3918). If 'leaf flag' is not set, jump to step 3926, otherwise go to step 3920. Next, in step 3920, check 'resolveFolderLeafFlag' (from 3900). If it is set, go to step 3926, otherwise go to step 3922. At step 3922, check 'leaf flag'. If it's set go to step 3924, and return the database URL (from 3900) and object ID (from 3906); otherwise go to the top of the loop at step 3904. Starting at step 3926, read the content of the object, which is a pointer or folder, and has a specific content type that yields 'new url' and 'new object ID'. Next in step 3928, compare 'new object ID' acquired in step 3926 to zero. If it is zero, proceed to step 3930, where the remaining database path (the last part of the database path that's not in the partial path) is appended to the end of 'new url'. Then in step 3932, call 'Resolve URL Path' (described in FIG. 40). If the 'new object ID' in step 3928 was non-zero, go to step 3934 to handle this case of a pointer to a database object. Next, in step 3934, acquire the database path into 'new database path' of an object from 'new object ID' inside of database 'new url'. Next, in step 3936, the remaining database path (the last part of the database path that's not in the partial path) is appended to the end of 'new database path' (from 3934). Finally, as step 3938, recursively call this function with the arguments 'new url', 'new database path', 'resolvePointerLeaf', 'resolveFolderLeaf', 'resolveDatabaseLeaf'.

A flow diagram of the function of resolving an URL path into a database URL and object ID is shown in FIG. 40. In step 4000, an URL are passed in, as well as a 'resolvePointerLeaf', 'resolveFolderLeaf', and 'resolveDatabaseLeaf' flags. Next, in step 4002, a string variable 'partial path' is initialized to be empty. Next, at the top of a loop in step 4004, append the next segment of the URL (from 4000) to 'partial path'. Next, in step 4006, set a local boolean variable 'database flag' if 'partial path' refers to a database file. Next, in step 4008 set a local boolean variable 'leaf flag' to indicate if the segment appended in step 4004 is the final (or leaf ) segment of the URL path (from 4000).

Next, in step 4010, check the value of 'database flag'. If it is 'true', go to step 4012, otherwise go to step 4016. In step 4012, check the value of 'leaf flag'. If it is 'false', go to step 4020, otherwise go to step 4014. In step 4014, check 'resolveDatabaseLeafFlag' variable. If it is 'true' go to step 4020, otherwise go to step 4016. In 4016, if 'leaf flag' is false, go to step 4004 for another loop iteration, otherwise go to step 4018. At step 4018, return with 'URL' (step 4004), and 'object id' of zero. At step 4020, set 'new database path' to be the top object in the database file specified by 'URL'. Next, in step 4022, the remaining database path (the last part of the database path that's not in the partial path) is appended to the end of 'new database path'. Finally, in step 4024, call 'ResolveDatabasePath' with 'partial path', 'new database path', 'resolvePointerLeaf', 'resolveFolderLeaf', 'resolveDatabaseLeaf'.

Virtual Hierarchy

Figure 41:
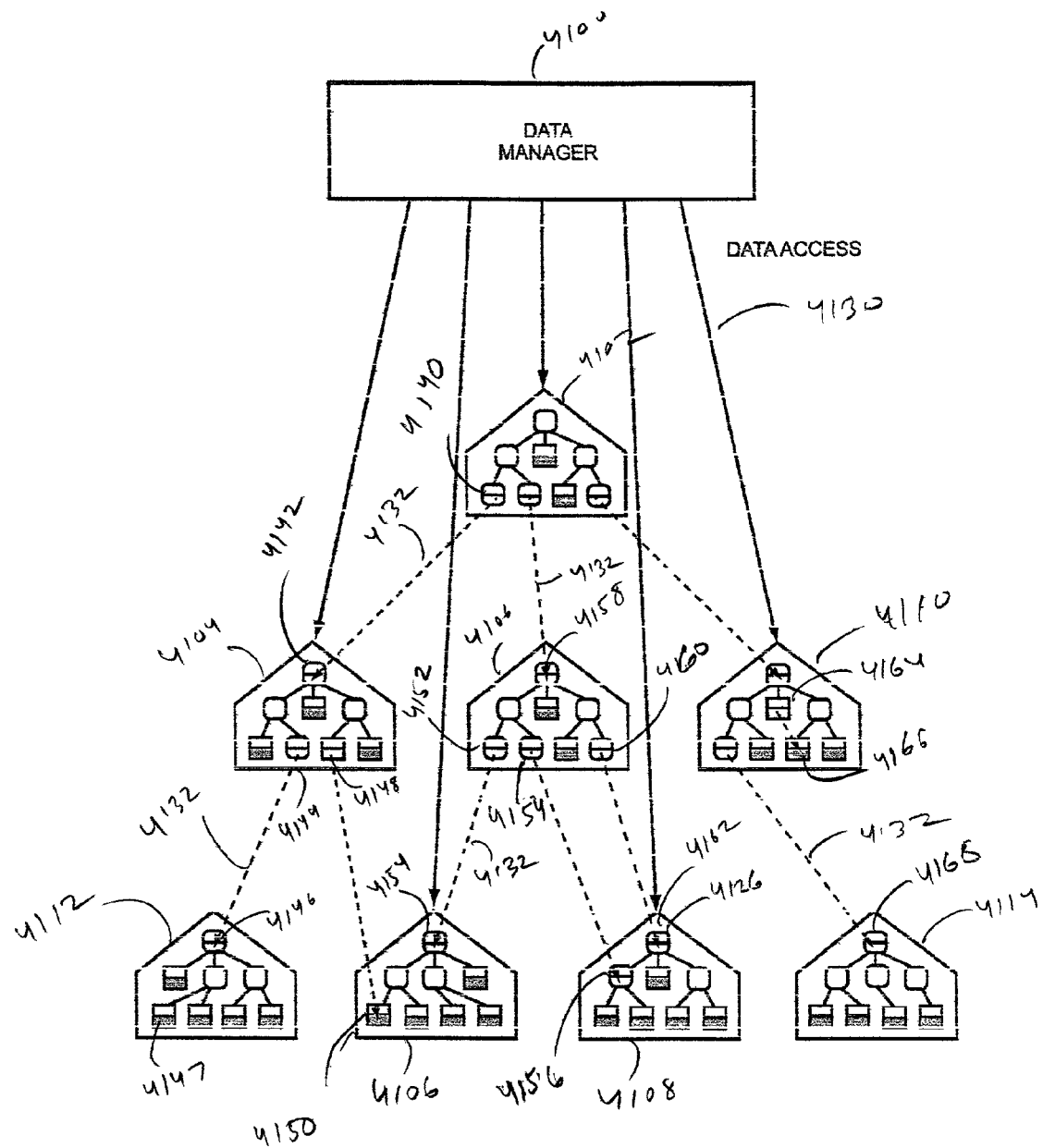
FIG. 41 illustrates an overview of an exemplary data linking scenario, showing hierarchical databases linked together and forming a virtual hierarchy, according to an embodiment of the present invention.

Path Resolution in the Data Manager can be used to organize presentation data distributed over many database files over many machines into a virtual hierarchy, as shown in FIG. 41. Here the database manager 4100 is shown with data access 4130 to a number of database files 4102, 4104 4106, 4108 and 4110, which may be distributed in different locations on a machine, or over different machines on a network. Each of these database files contains numerous container and media objects.

The data manager does not have direct access to database files 4112 and 4114. But the database files themselves contain references 4132 whereby pointers and pointer containers within one database file may refer to base objects in another. For example, pointer container 4144 in database file 4104 references container 4146 in database file 4112. Via these internal references, the database manager, which does have direct access to database file 4104, has indirect data access to the contents of files such as 4112 which it doesn't have direct access to, such as media file 4147. One strength of the virtual hierarchy comes from this power of indirect access so that far-flung data may be viewed coherently from a user perspective in an integrated space.

Figure 42:
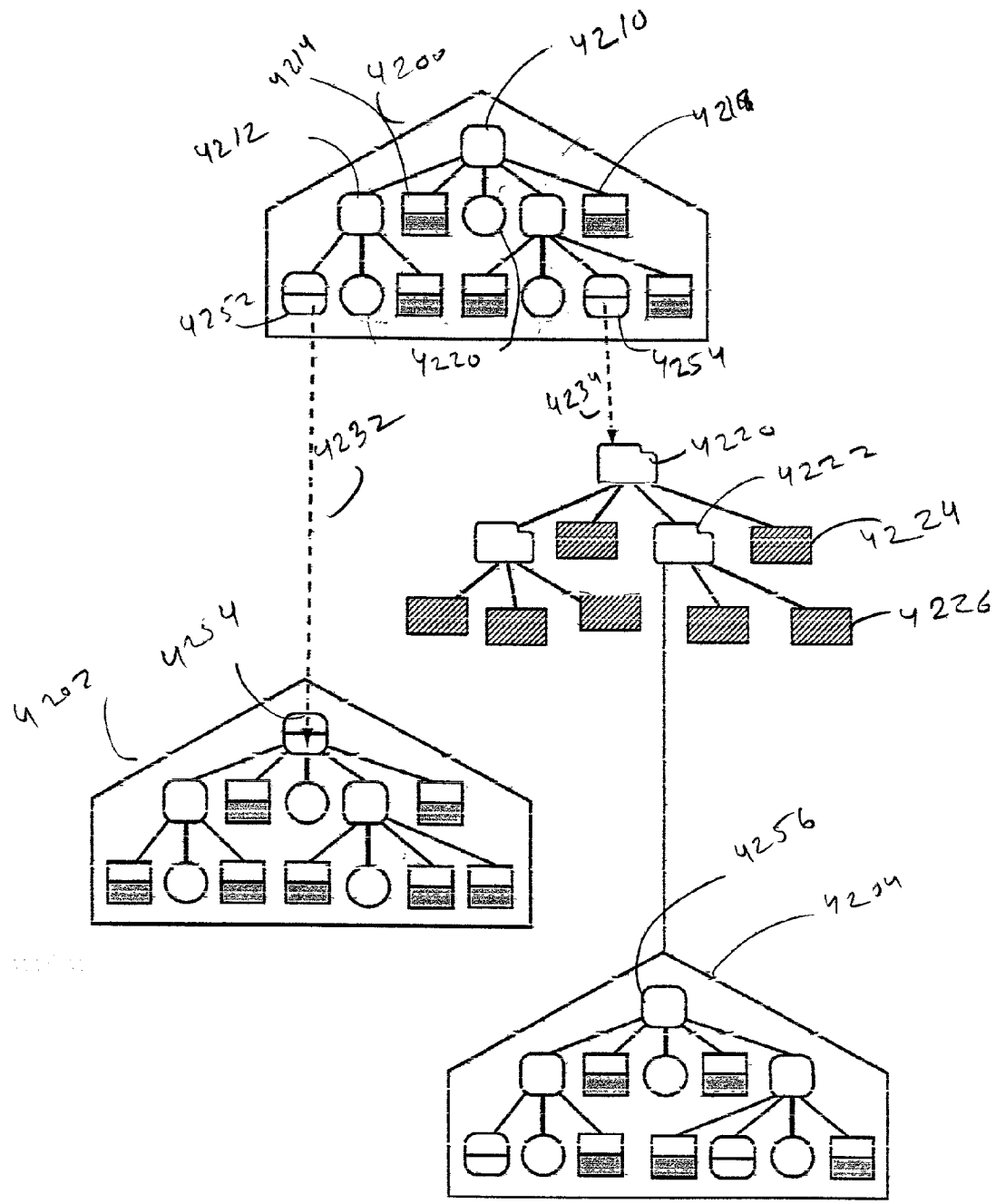
FIG. 42 illustrates a block diagram an exemplary data linking scenario, including hierarchical databases and a hierarchical file system of folders and files, forming a virtual hierarchy according to an embodiment of the present invention.

Within the Virtual Hierarchy there are three kinds of boundary transitions. FIG. 42 shows a closer view of the virtual hierarchy, and in particular, it shows how HFS folders are incorporated into via HFX folder pointers. Database file 4200 is shown containing container 4210, which contains media objects 4214 and 4216 and has container control object 4220, along with other containers and media files. Similarly, the other database files 4202 and 4204 contain containers containing media files and control objects, as well as pointer container objects such as 4252. Pointer container object 4252 references container 4254 in database file 4202, thus providing access to all of the data in database file 4202. File 4200 also contains folder pointer 4254, which references HFS folder 4220 for its content, thereby providing access to all the contents of folders and database files below folder 4220 in the hierarchical file space, such as media file 4224. One of these database files 4204 is shown in folder 4222.

There are three kinds of boundaries crossed by data access channels in FIG. 42. First is the direct database-to-database boundary as exemplified in the access channel provided by pointer container 4252's access to container 4254. The second is database-to-HFS exemplified by folder pointer 4254's relation to HFS folder 4220, and the third is the HFS-to-database boundary, which is crossed when folder when folder pointer 4254 accesses an object within database file 4204 via its reference to folder 4220 (which contains folder 4222 which contains database file 4204).

The ability to traverse these boundaries with ease via path resolution in the data manager is the key to being able to present the user with a fluid, coherent experience in which exploring data hierarchically within files is melded with data exploration distributed over a wider network.

The true value for the virtual hierarchy is that allows remote data to be involved in complex interactions. But mere exploration of data is not the main goal or advantage of the virtual hierarchy. FIG. 43 shows a close up of a database file 4301 containing interacting objects. Some of these objects are container 4300, and its control object 4306, 4302 and its container control object 4317, container 4308 and its container control object 4320, and picture objects 4304, 4310, 4312 4322 and 4324. Some of these objects can communicate and interact with each other, resulting in complex behaviors of presentation media.

For instance, vector object 4316 may control the position of the display output of object 4338 PHOTO via relation 4340 and the size of the display output of 4312 SPLASH via relation 4342 according to a complex periodic function, the result may be interesting and entertaining. But it is even more useful if other objects in remote database files are allowed to refer to container object 4302 ART via the virtual hierarchy. Then the behavior of these objects can be incorporated into some other presentation on another machine and that presentation can be incorporated into another, ad infinitum. The ability to present distributed and disparate data hierarchically, combined with the ability to interconnect the data via references across three kinds of boundaries becomes truly powerfill when that data has the ability to interact via relations.

| Correlation of Terms from Provisional Application to Current Application/Claim Set | |
|---|---|
| Provisional Application | Current Application/Claims |
| Audio-Visual Display= | Playback Display |
| Data Display = | Control Display |
| Hierarchical Relational Database (HRD) = | Database |
| Hierarchical File Tree (HFT) = | Hierarchical File Extension (HFX) |
| World = | Container |
| Planet Object (one type of Container Object) = | 'Folder Pointer' Container Object |
| Lens = | Container Control Object |
| Ghost or Ghost Object (ref. the bodily object) = | Pointer Object (ref. the base object) |
| Move Objects = | Vector Objects |
| show ID = | presentation ID |
| Nested Bitmap = | Nested Sub-Display |
| objects and relations = | presentation data |
| object editor = | edit manager |
| connectors = | relational capabilities |
| pulse = | event/action |
| Player Engine = | Presentation Engine |
| Object Manager = | Data Manager |
| relative path = | root path |
| absolute path = | physical path or URL |
| playback & message passing = | playback manager |
| audio-visual output = | playback output |
| Data Display 'space' = | Control Display 'icon view' |
| Navigation = | Exploration |
| routine object = | script object |
| meta data = | properties data |

What is claimed is:

1. An authoring system comprising:
   presentation data including at least one container object containing at least two media objects containing media data, the media data including at least one of text data or picture data;
   hierarchical structuring of the presentation data by nesting container objects within container objects to form a hierarchical object space;
   a playback display for playing back the presentation data by presenting the media data in the playback display, the playback display being associated with a master container object that contains the set of playing objects whose media data is displayed in the playback display;
   a destination container object which is directly contained within the master container object, and which is associated with a nested sub-display shown within the playback display, and which contains at least two media objects which are playing and whose media data is displayed within the sub-display; and
   user-initiated navigation through the hierarchical object space comprising a preemption of playback for die playing objects contained in the master container object which are not contained within the destination container object, and further comprising a transition whereby the nested sub-display is no longer displayed in the playback display and the media data previously displayed in the nested sub-display becomes displayed in the playback display overall.

2. An authoring system as recited in claim 1, wherein the user initiates navigation by using a pointing device to select in the playback display the sub-display associated with the destination container object.

3. An authoring system as recited in claim 1, wherein a system user using a pointing device can manipulate the sub-display in the playback display to adjust display settings for it which include at least one of size, position, cropping and stretch.

4. An authoring system as recited in claim 1, wherein the transition includes a zooming effect whereby the sub-display grows over time until it fills the playback display.

5. An authoring system as recited in claim 1, wherein the destination container object further contains a nested container object associated with a nested sub-display embedded within the nested sub-display of the destination container object, and wherein the nested container object contains at least two media objects which are playing and whose media data is displayed within its associated sub-display, comprising a sub-display within a sub-display.

6. An authoring system as recited in claim 1, wherein the destination container object is a container pointer object which is a container object that references a base container object for its contained objects.

7. An authoring system as recited in claim 6, wherein the container pointer object references its base container object over a network using a network address.

* * * * *